United States Patent
Zhou et al.

(10) Patent No.: US 11,451,565 B2
(45) Date of Patent: Sep. 20, 2022

(54) MALICIOUS ACTIVITY DETECTION BY CROSS-TRACE ANALYSIS AND DEEP LEARNING

(71) Applicant: Oracle International Corporation, Redwood Shores, CA (US)

(72) Inventors: Guang-Tong Zhou, Seattle, WA (US); Hossein Hajimirsadeghi, Vancouver (CA); Andrew Brownsword, Bowen Island (CA); Stuart Wray, Cambridge (GB); Craig Schelp, Surrey (CA); Rod Reddekopp, Surrey (CA); Felix Schmidt, Niederweningen (CH)

(73) Assignee: Oracle International Corporation, Redwood Shores, CA (US)

( * ) Notice: Subject to any disclaimer, the term of this patent is extended or adjusted under 35 U.S.C. 154(b) by 1051 days.

(21) Appl. No.: 16/122,664

(22) Filed: Sep. 5, 2018

(65) Prior Publication Data

US 2020/0076842 A1    Mar. 5, 2020

(51) Int. Cl.
*G06N 3/04* (2006.01)
*H04L 9/40* (2022.01)
*G06K 9/62* (2022.01)

(52) U.S. Cl.
CPC ........ *H04L 63/1425* (2013.01); *G06K 9/6232* (2013.01); *G06N 3/04* (2013.01)

(58) Field of Classification Search
None
See application file for complete search history.

(56) References Cited

U.S. PATENT DOCUMENTS 9,009,687 B2    4/2015  Caira
10,832,087 B1   11/2020 Wang et al.
(Continued)

FOREIGN PATENT DOCUMENTS

EP    3 101 599 A2    12/2016
EP    3355547 A1 *  8/2018  ........... G06N 3/0454
(Continued)

OTHER PUBLICATIONS

Varadarajan, U.S. Appl. No. 15/914,883, filed Mar. 7, 2018, Office Action, dated Dec. 1, 2020.
(Continued)

*Primary Examiner* — Alan Chen
(74) *Attorney, Agent, or Firm* — Hickman Becker Bingham Ledesma LLP; Brian N. Miller

(57) ABSTRACT

Techniques are provided herein for contextual embedding of features of operational logs or network traffic for anomaly detection based on sequence prediction. In an embodiment, a computer has a predictive recurrent neural network (RNN) that detects an anomalous network flow. In an embodiment, an RNN contextually transcodes sparse feature vectors that represent log messages into dense feature vectors that may be predictive or used to generate predictive vectors. In an embodiment, graph embedding improves feature embedding of log traces. In an embodiment, a computer detects and feature-encodes independent traces from related log messages. These techniques may detect malicious activity by anomaly analysis of context-aware feature embeddings of network packet flows, log messages, and/or log traces.

33 Claims, 25 Drawing Sheets

202 Generate sequence of actual dense feature vectors that corresponds to sequence of network packets 204 Based on sequence of actual dense feature vectors, RNN generates sequence of predicted dense feature vectors that represent sequence of network packets 206 Process sequence of network packets based on sequence of predicted dense feature vectors

(56) References Cited

U.S. PATENT DOCUMENTS

| | | |
|---|---|---|
| 2014/0101117 A1 | 4/2014 | Uzzaman |
| 2014/0344193 A1 | 11/2014 | Bilenko et al. |
| 2016/0155136 A1 | 6/2016 | Zhang et al. |
| 2017/0169360 A1 | 6/2017 | Veeramachaneni et al. |
| 2018/0005676 A1 | 1/2018 | Neil et al. |
| 2018/0060211 A1 | 3/2018 | Allen |
| 2018/0060220 A1 | 3/2018 | Yao |
| 2018/0109589 A1 | 4/2018 | Ozaki et al. |
| 2018/0144029 A1 | 5/2018 | Cruanes |
| 2019/0018614 A1 | 1/2019 | Balko |
| 2019/0036788 A1* | 1/2019 | Gupta .................. H04L 43/087 |
| 2019/0087529 A1 | 3/2019 | Steingrimsson |
| 2019/0095756 A1 | 3/2019 | Agrawal |
| 2019/0095818 A1 | 3/2019 | Varadarajan |
| 2019/0197236 A1 | 6/2019 | Niculescu-Mizil et al. |
| 2019/0197357 A1 | 6/2019 | Anderson |
| 2019/0244139 A1 | 8/2019 | Varadarajan |
| 2019/0370695 A1 | 12/2019 | Chandwani et al. |
| 2020/0045049 A1 | 2/2020 | Apostolopoulos |
| 2020/0076840 A1 | 3/2020 | Peinador |
| 2020/0076841 A1 | 3/2020 | Hajimirsadeghi |
| 2020/0364599 A1 | 11/2020 | Ma |
| 2021/0011832 A1 | 1/2021 | Togawa |

FOREIGN PATENT DOCUMENTS

| | | |
|---|---|---|
| WO | WO 2008/133509 A1 | 11/2008 |
| WO | WO2017/201507 A1 | 11/2017 |

OTHER PUBLICATIONS

Peinador, U.S. Appl. No. 16/122,398, Final Office Action, dated Jan. 28, 2021.
https://www.broadforward.com/, "SS7 Firewall (SS7FW)", https://www.broadforward.com/ss7-firewall-ss7fw/, dated Sep. 21, 2020, 3 pages.
Kolter et al., "Dynamic Weighted Majority: an Ensemble Method for Drifting Concepts", Journal of Machine Learning Research 8, dated 2007, 36 pages.
Knut Anders Hatlen, "Partial Update of JSON Values", MySQL Server Blog, dated Apr. 3, 2018, 6 pages.
Kim et al., "Behavior-based anomaly detection on big data", Edith Cowan University, Research Online, dated 2015, 9 pages.
Jensen, Kristoffer, "Improving SS7 Security Using Machine Learning Techniques", Master's Thesis, dated Jan. 6, 2016, 87 pages.
Jensen et al., "Better Protection of SS7 Networks With Machine Learning", dated 2016 IEEE, 7 pages.
Alexey Tsymbal, "The Problem of Concept Drift: Definitions and Related Work", dated Apr. 29, 2004, 7 pages.
Hu et al., "Anomalous User Activity Detection in Enterprise Multi-Source Logs", dated Nov. 2017, 8 pages.
N.Krishnavardhan, "A Framework To Identify Cybercrime Using Data Analytics", International Journal of Pure and Applied Mathematics, vol. 120, No. 6 dated Jun. 11, 2018, 14 pages.
Golan et al., "Deep Anomaly Detection Using Geometric Transformations", 32nd Conference on Neural Information Processing Systems (NeurIPS dated 2018), Montréal, Canada, 12 pages.
Gama et al., "A Survey on Concept Drift Adaptation", ACM Computing Surveys, vol. 1, No. 1, Article 1, Publication date: Jan. 2013, 44 pages.
Cellusys, "SS7 Vulnerabilities", dated 2015, 53 pages.
Bryan P et al., "JavaScript Object Notation (JSON) Patch; rfc6902. txt", Javascript Object Notation (JSON) Patch, Internet Engineering Task Force, Standard, Internet Society, Apr. 3, 2013, 18 pages.
Bontemps et al., "Collective Anomaly Detection based on Long Short Term Memory Recurrent Neural Network", dated Mar. 2017, 13 pages.
Bach et al., A Bayesian Approach to Concept Drift, dated 2010, 9 pages.
Ioffe et al., "Batch Normalization: Accelerating Deep Network Training by Reducing Internal Covariate Shift", dated Mar. 2, 2015, 11 pages.
Qasim et al., "Detection of Signaling System 7 Attack in Network Function Virtualization using Machine Learning", dated Jan. 2018, 6 pages.
Webb et al., Characterizing Concept Drift, Data Mining and Knowledge Discovery, dated Jul. 2016, 30 pages.
USPTO, "Public Views on Artificial Intelligence and Intellectual Property Policy", dated Oct. 2020, 56 pages.
Ullah et al., "SS7 Vulnerabilities—A Survey and Implementation of Machine Learning vs Rule Based Filtering for Detection of SS7 Network Attacks", IEEE, vol. 22, No. 2, dated Feb. 5, 2020, 35 page.
UFLDL Tutorial, "Autoencoders", http://ufldl.stanford.edu/tutorial/unsupervised/Autoencoders/, dated Sep. 21, 2020, 5 pages.
Srivastava et al., "Dropout: A Simple Way to Prevent Neural Networks from Overfitting", Journal of Machine Learning Research 15, dated Jun. 2014, 30 pages.
Shipmon et al., "Time Series Anomaly Detection", Detection of Anomalous Drops with Limited Features and Sparse Examples in Noisy Highly Periodic Data, dated 2017, 9 pages.
Mourad, Hassan, "The Fall of SS7 How Can the Critical Security Controls Help?", SANS Institute Information Security Reading Room, dated 2015, 29 pages.
Ruber, Sebastian, "An overview of gradient descent optimization algorithms", dated Jan. 19, 2016, https://ruder.io/optimizing-gradient-descent/index.html, 32 pages.
Moustafa et al., "A holistic review of Network Anomaly Detection Systems: A comprehensive survey", Journal of Network and Computer Applications vol. 128, Feb. 15, 2019, pp. 33-55.
Puzankov, Sergey, "Attacks You Can't Combat: Vulnerabilities of Most Robust Mobile Operators", Positive Technologies, dated 2018, 51 pages.
Positive Technologies, "SS7 Vulnerabilities in the Spotlight", dated Mar. 5, 2018, https://positive-tech.com/knowledge-base/research/ss7-vulnerability-2018/, 34 pages.
Positive Technologies, "Primary Security Threats For SS7 Cellular Networks", dated 2016, 16 pages.
P1 Security, "SS7map: SS7 Country Risk Ratings", https://labs.p1sec.com/2014/12/28/ss7map-country-risk-ratings/, dated Dec. 28, 2014, 9 pages.
Naseer et al., "Enhanced Network Anomaly Detection Based on Deep Neural Networks", Journal of Latex Class Files, vol. 14, No. 8, Aug. 2015, 16 pages.
Zhen Hua Liu et al. "JSON Data Management in RDBMS", Emerging Technologies and Applications in Data Processing and Management, dated May 13, 2019, pp. 20-45.
Sabokrou et al., "Real-Time Anomaly Detection and Localization in Crowded Scenes", dated 2015, 7 pages.
Pedregosa, Fabian, "Hyperparameter Optimization with Approximate Gradient", Proceedings of the 33rd International Conference on Machinelearning, New York, vol. 48, dated Jun. 26, 2016, pp. 1-15.
Nelder et al., "A Simplex Method for Function Minimization", The Computer Journal, vol. 7, dated Apr. 1, 1964, pp. 308-313.
Mendes-Moreira et al., "Ensemble Approaches for Regression", ACM Computing Surveys, ACM, New York, NY vol. 45, No. 1, dated Dec. 7, 2012, pp. 1-40.
J.D Wichard, "Model Selection in an Ensemble Framework", The 2013 International Joint Conference on Neural Networks, dated Jan. 1, 2006, pp. 2187-2192.
Gonnet et al., Automatic Problem-Specific Hyperparameter Optimization and Model Selection for Supervised Machine Learning, Technical Report, dated Jan. 1, 2015, 54 pages.
Chen Chi-Ou et al., "Machine Learning-Based Configuration Parameter Tuning on Hadoop System", dated Jun. 27, 2015, IEEE, pp. 386-392.
Caruana et al., "Ensemble Selection From Libraries of Models", Proceedings, Twenty-First International Conference on Machine Learning: dated Jul. 2004, 8 pages.
Aldave et al., "Systematic Ensemble Learning fro Regression" dated Mar. 28, 2014, pp. 1-38.

(56) References Cited

OTHER PUBLICATIONS

Wolfram MathWorld, "Inner Product", https://mathworld.wolfram.com/InnerProduct.html, dated 2004, 2 pages.
Hadi S. Jomaa et al., "Dataset2Vec: Learning Dataset Meta-Features," May 27, 2019, 13 pages.
Varadarajan, U.S. Appl. No. 15/914,883, filed Mar. 7, 2018, Final Office Action, dated Mar. 2, 2021.
Peinador, U.S. Appl. No. 16/122,398, filed Sep. 5, 2018, Notice of Allowance, dated Apr. 29, 2021.
Hajimirsadeghi, U.S. Appl. No. 16/122,505, filed Sep. 5, 2018, Office Action, dated May 13, 2021.
Srivastava et al. "Highway Networks", dated Nov. 2015, 6 pages.
Radford et al., "Network Traffic Anomaly Detection Using Recurrent Neural Networks", dated Mar. 2018, 8 pages.
Piad-Morffis et al., "A Neural Network Component for Knowledge-Based Semantic Representations of Text",Recent Advances in Natural Language Processing, dated Sep. 2019, pp. 904-911.
Nandan et al., "Fast SVM Training Using Approximate Extreme Points", Journal of Machine Learning Research 15 dated 2014, pp. 59-98.
Malhotra et al., "Long Short Term Memory Networks for Anomaly Detection in Time Series", ESANN 2015, dated Apr. 2015, 6 pages.
Luo et al., "A Revisit of Sparse Coding Based Anomaly Detection in Stacked RNN Framework", IEEE, dated 2017, 9 pages.
Huang et al., "Deep Networks with Stochastic Depth", dated 2016, 16 pages.
He et al., "Deep Residual Learning for Image Recognition", IEEE, dated 2016, 9 pages.
Godin et al. Improving Language Modeling using Densely Connected Recurrent Neural Networks, dated Jul. 19, 2017, 5 pages.
Cao et al., "Collective Anomaly Detection Based on Long Short Term Memory Recurrent Neural Network", dated Mar. 2017, 13 pages.
Bishop et al., "Exact Calculation of the Hessian Matrix for the Multi-layer Perceptron", Published in Neural Computation 4 No. 4.dated 1992, 8 pages.
Bengio et al., "Learning Long-Term Dependencies with Gradient Descent is Diffucult", IEEE Transactions on Neural Networks, vol. 5, No. 2, dated Mar. 1994, 10 pages.
Bengio et al., "Conditional Computation in Neural Networks for Faster Models", ICLR 2016, dated Jan. 7, 2016, 12 pages.
Peinador, U.S. Appl. No. 16/122,398, filed Sep. 5, 2018, Office Action, dated Oct. 28, 2020.
Mirza Ali H et al., "Computer Network Intrusion Detection Using Sequwnrial LSTM Neural Networks Autoencoders", dated May 2, 2018, 2018 26th Signal Processing and Communicaitons Applications Con. 4 pgs.
Loganathan Gobinath et al., "Sequence to Sequence Pattern Learning Algorithm for Real-Time Anomaly Detection in Network Traffic", dated 2018 IEEE, dated May 13, 2018, pp. 1-4.
Maglaras et al. "A real time OSCVM Intrusion Detection module with low overhead for SCADA systems", International Journal of Advanced Research in Artificial Intelligence, vol. 3, No. 10, 2014, 9 pgs.
Ding et al., "PCA-Based Network Traffic Anomaly Detection" Tsinghua Science and Technology, vol. 21, No. 5, Oct. 2016, 10 pages.
Garcia-Duran et al. "Learning Graph Representations with Embedding Propagation", 31st Conference on Neural Information Processing Systems (NIPS 2017), 12 pages.
Gibert et al., "Graph Embedding in Vector Spaces", GbR'2011 Mini-tutorial, dated 2011, 66 pages.
Grover et al., "node2vec: Scalable Feature Learning for Networks", KDD '16, Aug. 13-17, 2016, San Francisco, CA, USA, 10 pages.
Hamilton et al., "Inductive Representation Learning on Large Graphs", 31st Conference on Neural Information Processing Systems (NIPS 2017), Long Beach, CA, USA, 11 pages.
Hamilton et al., "Representation Learning on Graphs: Methods and Applications", Copyright 2017 IEEE, 24 pages.
Bengio et al., "Learning Deep Architectures for AI", dated 2009, 71 pages.
Liu et al., "Isolation Forest", dated 2008, 10 pages.
Zhang et al., "Automated IT System Failure Prediction: A Deep Learning Approach", dated 2016, 11 pages.
Perozzi et al., "DeepWalk: Online Learning of Social Representations", dated 2014, 10 pages.
Scholkopf et al. "Estimating the Support of a High-Dimensional Distribution", dated Nov. 27, 1999, 28 pages.
Wei et al., "Graph embedding based feature selection", Neurocomputing 93 dated May 17, 2012, 11 pages.
Xu et al. "Detecting Large-Scale System Problemd by Mining Console Logs", SOSP'09, Oct. 11-14, 2009, 15 pages.
Yamanishi et al., "Dynamic Syslog Mining for Network Failure Monitoring", KDD'05 Aug. 21-24, 2005, Chicago, Illinois, USA, 10 pages.
Yen et al., "Beehive: Large-Scale Log Analysis for Detecting Suspicious Activity in Enterprise Networks", ACSAC '13 dated Dec. 9-13, 2013, New Orleans, Louisiana, USA, 10 pages.
Zhang et al., "Network Anomaly Detection Using One Class Support Vector Machine", Proceedings of the International MultiConference of Engineers and Computer Scientists 2008 vol. I, Mar. 19, 2008, 5 pages.
Huang et al., "Online System Problem Detection by Mining Patterns of Console Logs", dated Dec. 2009, 11 pages.
Doan et al., "Selecting Machine Learning Algorithms using Regression Models", https://www.researchgate.net/publication/304298580, dated Nov. 2015, 8 pages.
Aggarwal et al., "Analysis of KDD Dataset Attributes—Class wise For Intrusion Detection", 3rd International Conference on Recent Trends in Computing 2015, 10 pages.
Karpathy et al., "Deep Visual-Semantic Alignments for Generating Image Descriptions", dated 2015, 10 pages.
Hochreiter, Sepp, "Long Short Term Memory", Nural Computation, dated Nov. 15, 1997, 46 pages.
Hinton et al., Neural Networks for Machine Learning, Lecture 6a, Overview of mini-batch gradient descent, dated 2012, 31 pages.
Hill et al., "Learning Distributed Representations of Sentences from Unlabelled Data", dated Feb. 10, 2016, 11 pages.
Haider et al., "Generating Realistic Intrusion Detection System Dataset Based on Fuzzy Qualitative Modeling", Journal of Network and Computer Applications 87 (2017) 8 pages.
HaddadPajouh et al, "A Two-layer Dimension Reduction and Two-tier Classification Model for Anomaly-Based Intrusion Detection in IoT Backbone Networks", dated 2016, 12 pages,.
Graves et al., "Speech Recognition With Deep Recurrent Neural Networks", dated Mar. 22, 2013, 5 pages.
Gonzalez et al., "Batch Bayesian Optimization via Local Penalization", Proceedings of the 19th International Conference on Artificial Intelligence and Stats JMLR: W&CP vol. 41, dated 2016, 10 pages.
Gogoi, et al., "Packet and Flow Based Network Intrusion Dataset", dated 2012, 12 pages.
Ghosh et al., "Detecting Anomalous and Unknown Intrusions Against Programs", dated 1998, 9 pages.
Feurer et al., "Initializing Bayesian Hyperparameter Optimization via Meta-Learning", Proceedings of the Twenty-Ninth AAAI Conference on Artificial Intelligence, dated Jan. 2015, 8 pages.
Kingma et al., "ADAM: A Method for Stochastic Optimization", Published as a conference paper at ICLR 2015, dated Jan. 1, 2017, 15 pages.
Du et al. DeepLog: Anomaly Detection and Diagnosis from System Logs through Deep Learning, CCS'17, Oct. 30-Nov. 3, 2017, 14 pages.
Kiros et al., "Skip-Thought Vectors", dated 2015, 9 pages.
Doan et al., "Algorithm Selection Using Performance and Run Time Behavior", Chapter, Artificial Intelligence: Methodology, Systems and Applicationsm AIMSA dated Sep. 2016, pp. 3-13.
Dai et al., "Semi-supervised Sequence Learning", dated 2015, 9 pages.
Conneau et al. "Supervised Learning of Universal Sentence Representations from Natural Language Inference Data", Dated Jul. 21, 2017, 12 pages.

(56) References Cited

OTHER PUBLICATIONS

Buczak et al., "A Survey of Data Mining and Machine Learning Methods for Cyber Security Intrusion Detection", IEEE Communications Surveys & Tutorials, vol. 18, No. 2, Second Quarter 2016, 24 pages.
Bontemps et al., "Collective Anomaly Detection based on Long Short Term Memory Recurrent Neural Network", dated 2016, 12 pages.
Berlin et al., "Malicious Behavior Detection using Windows Audit Logs", dated Aug. 25, 2015, 10 pages.
Bergstra et al., "Random Search for Hyper-Parameter Optimization", Journal of Machine Learning Research 13 (2012) 281-305, dated Feb. 2012, 25 pages.
Bergstra et al., "Making a Science of Model Search: Hyperparameter Optimization in Hundreds of Dimensions for Vision Architectures", JMLR: W &CP, vol. 28, dated 2013, 9 pages.
Bergstra et al., "Hyperparameter Optimization and Boosting for Classifying Facial Expressions: How good can a "Null" Model be?", ICML Workshop on Representation and Learning, dated 2013, 7 pages.
Bergstra et al., "Hyperopt: A Python Library for Optimizing the Hyperparameters of Machine Learning Algorithms", Proc. of The 12th Python in Science Conf. (SCIPY 2013), dated 2013, 8 pages.
Bengio et al., "A Neural Probabilistic Language Model", Journal of Machine Learning Research 3, dated Feb. 2003, 19 pages.
Andrychowicz et al., "Learning to learn by gradient descent by gradient descent", 30th Conference on Neural Information Processing Systems dated (NIPS 2016), Barcelona, Spain, 9 pages.
Feurer et al., "Efficient and Robust Automated Machine Learning", dated 2015, 9 pages.
Mikolov, Tomas, "Recurrent Neural Network Based Language Model", dated Jul. 20, 2010, 24 pages.
Yousefi-Azar et al., "Autoencoder-based Feature Learning for Cyber Security Applications", dated 2017, 8 pages.
Weinberger et al., "Unsupervised learning of image manifolds by semidefinite programming", IEEE, dated Jun. 27, 2004, 10 pages.
Usama et al., "Unsupervised Machine Learning for Networking: Techniques, Applications and Research Challenges", dated Sep. 19, 2017, 37 pages.
Tuor et al., "Deep Learning for Unsupervised Insider Threat Detection in Structured Cybersecurity Data Streams", dated Dec. 15, 2017, 9 pages.
Sutskever et al., "Sequence to Sequence Learning with Neural Networks", dated 2014, 9 pages.
Snoek, "Practical Bayesian Optimization of Machine Learning Algorithms", dated 2012, 9 pages.
Simpson et al., "Automatic Algorithm Selection in Computational Software Using Machine Learning", dated 2016, 10 pages.
Shiravi et al., "Toward Developing a Systematic Approach to Generate Benchmark Datasets for Intrusion Detection", dated Feb. 28, 2011, 18 pages.
Seleznyov et al., "Anomaly Intrusion Detection Systems: Handling Temporal Relations between Events", dated 1999, 12 pages.
Scikit Learn, "3.2 Tuning the hyper-parameters of an estimator", http://scikit-learn.org/stable/modules/grid_search.html, last viewed on Mar. 13, 2018, 5 pages.
Ruder, Sebastian, "An Overview of Gradient Descent Optimization Algorithms", dated Jun. 15, 2017, 14 pages.
Kim, Yongjoon, "Chapter 10, Sequence Modeling: Recurrent and Recursive Nets", dated Apr. 1, 2016, 50 pages.
Mnih et al., "A Scalable Hierarchical Distributed Language Model", dated 2009, 8 pages.
YuanZhong, Zhu, "Intrusion Detection Method based on Improved BP Neural Network Research", International Journal of Security and Its Applications vol. 10, No. 5 (2016) pp. 193-202.
Mikolov et al., "Efficient Estimation of Word Representations in Vector Space", dated Sep. 7, 2013, 12 pages.
Mikolov et al., "Distributed Representations of Words and Phrases and their Compositionality", dated 2013, 9 pages.
Malhotra et al., "LSTM-based Encoder-Decoder for Multi-sensor Anomaly Detection", Presented at ICML 2016 Anomaly Detection Workshop, New York, NY, USA, 2016. Copyright 2016—5 pages.
Malhotra et al., "Long Short Term Memory Networks for Anomaly Detection in Time Series", ESANN dated Apr. 22, 2015 proceedings, European Symposium on Artificial Neural Networks, 6 pages.
Maclaurin et al., "Gradient-based Hyperparameter Optimization through Reversible Learning", Proceedings of the 32nd International Conference on Machine Learning, Lille, France, dated 2015, 10 pages.
Luo et al., "A Revisit of Sparse Coding Based Anomaly Detection in Stacked RNN Framework", dated Oct. 2017, 9 pages.
Liu et al., "Detecting and Preventing Cyber Insider Threats: A Survey", IEEE Communications Survey & Tutorials, dated 2018, 21 pages.
Le et al., "Distributed Representations of Sentences and Documents", Proceedings of the 31 st International Conference on Machine Learning, Beijing, China, dated 2014, 9 pages.
Kuck et al, "Meta-learning with neural networks and landmarking for forecasting model selection an empirical evaluation of different feature sets applied to industry data", dated Jul. 24-29, 2016, 8pgs.
Kolosnjaji et al., "Deep Learning for Classification of Malware System Call Sequences", dated 2016, 12 pages.
Klapper-Rybicka et al., "Unupervised Learning in LSTM Recurrent Neural Networks", dated 2001, 8 pages.
Klapper-Rybicka et al., "Unsupervised Learning in Recurrent Neural Networks", dated May 1, 2001, 11 pages.
Pinter, Janos, "Calibrating Artificial Neural Networks by Global Optimization", Technical Report, Özyeğin University, Istanbul Submitted for publication: Jul. 2010, 17 pages.
An et al., "Variational Autoencoder based Anomaly Detection Using Reconstruction Probability", 2015—2 Special Lecture on IE, dated Dec. 27, 2015, 18 pages.

* cited by examiner

FIG. 23

LOG 2300

| Trace | Offset | Host Field | Field V | Timestamp Field | Field X | Field Y | Field Z |
|---|---|---|---|---|---|---|---|
| A | 0 | node="host1" | type=TEST | msg=audit(0001.000:00001); | exclude=1 | | |
| A | 1 | node="host1" | type=TEST | msg=audit(0002.000:00002); | exclude=2 | | |
| A | 2 | node="host1" | type=TEST | msg=audit(0003.000:00003); | exclude=3 | | |
| B | 3 | node="host1" | type=TEST | msg=audit(0004.000:00004); | unmatch=1 | | |
| B | 4 | node="host1" | type=TEST | msg=audit(0005.000:00005); | uid=1001 | pid=20 | |
| B | 5 | node="host1" | type=TEST | msg=audit(0006.000:00006); | uid=1001 | pid=10 | |
| B | 6 | node="host1" | type=TEST | msg=audit(0007.000:00007); | uid=1001 | pid=10 | |
| B | 7 | node="host1" | type=TEST | msg=audit(0008.000:00008); | unmatch=2 | | |
| B | 8 | node="host1" | type=TEST | msg=audit(0009.000:00009); | uid=1001 | pid=20 | spid=10 |
| B | 9 | node="host1" | type=TEST | msg=audit(0010.000:00010); | uid=1001 | pid=30 | spid=20 |
| B | 10 | node="host1" | type=TEST | msg=audit(0011.000:00011); | uid=1001 | pid=30 | |
| C | 11 | node="host2" | type=TEST | msg=audit(0100.000:00012); | exclude=4 | | |
| D | 12 | node="host2" | type=TEST | msg=audit(0101.000:00013); | unmatch=3 | | |
| C | 13 | node="host2" | type=TEST | msg=audit(0102.000:00014); | exclude=5 | | |
| D | 14 | node="host2" | type=TEST | msg=audit(0103.000:00015); | unmatch=4 | | |
| D | 15 | node="host2" | type=TEST | msg=audit(0104.000:00016); | uid=1001 | pid=20 | |
| D | 16 | node="host2" | type=TEST | msg=audit(0105.000:00017); | unmatch=5 | | |
| C | 17 | node="host2" | type=TEST | msg=audit(0106.000:00018); | exclude=6 | | |
| E | 18 | node="host1" | type=TEST | msg=audit(0200.000:00019); | exclude=7 | | |
| F | 19 | node="host1" | type=TEST | msg=audit(0201.000:00020); | uid=1001 | pid=20 | |
| E | 20 | node="host2" | type=TEST | msg=audit(0202.000:00021); | uid=1001 | pid=10 | |
| E | 21 | node="host2" | type=TEST | msg=audit(0203.000:00022); | uid=1001 | pid=10 | |
| E | 22 | node="host2" | type=TEST | msg=audit(0204.000:00023); | uid=1001 | | |
| G | 23 | node="host2" | type=TEST | msg=audit(1000.000:00024); | unmatch=7 | | |
| H | 24 | node="host2" | type=TEST | msg=audit(2001.000:00025); | uid=1001 | pid=10 | |
| H | 25 | node="host2" | type=TEST | msg=audit(2002.000:00026); | unmatch=8 | | |
| H | 26 | node="host2" | type=TEST | msg=audit(2003.000:00027); | uid=1001 | pid=20 | |
| H | 27 | node="host2" | type=TEST | msg=audit(2004.000:00028); | unmatch=9 | | |
| H | 28 | node="host2" | type=TEST | msg=audit(2005.000:00029); | uid=1001 | pid=30 | |
| H | 29 | node="host2" | type=TEST | msg=audit(2006.000:00030); | unmatch=10 | | |
| I | 30 | node="host1" | type=TEST | msg=audit(2007.000:00031); | exclude=8 | | |
| I | 31 | node="host1" | type=TEST | msg=audit(2008.000:00032); | exclude=9 | | |

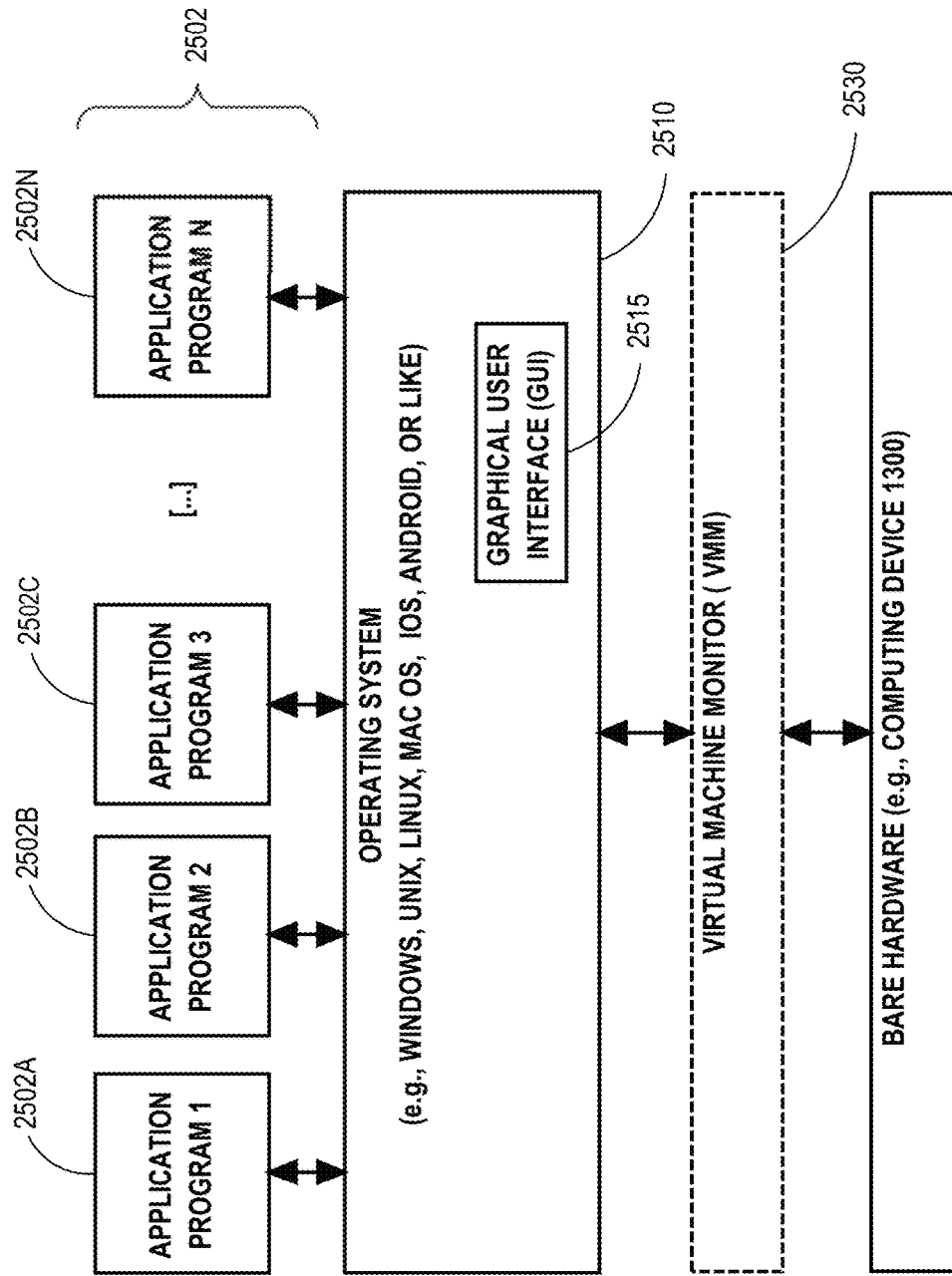

MALICIOUS ACTIVITY DETECTION BY CROSS-TRACE ANALYSIS AND DEEP LEARNING

CROSS-REFERENCE TO RELATED APPLICATIONS

The entire contents of the following related references are incorporated by reference:

U.S. patent application Ser. No. 16/122,505, entitled "CONTEXT-AWARE FEATURE EMBEDDING AND ANOMALY DETECTION OF SEQUENTIAL LOG DATA USING DEEP RECURRENT NEURAL NETWORKS", filed by Hossein Hajimirsadeghi, et al. on Sep. 5, 2018.

U.S. patent application Ser. No. 16/122,398, entitled "MALICIOUS ACTIVITY DETECTION BY CROSS-TRACE ANALYSIS AND DEEP LEARNING", filed by Juan Fernandez Peinador, et al. on Sep. 5, 2018.

W.I.P.O. Patent Application No. PCT/US2017/033698, entitled "MEMORY-EFFICIENT BACKPROPAGATION THROUGH TIME", filed by Marc Lanctot, et al. on May 19, 2017;

U.S. patent application Ser. No. 15/347,501, entitled "MEMORY CELL UNIT AND RECURRENT NEURAL NETWORK INCLUDING MULTIPLE MEMORY CELL UNITS", filed by Daniel Neil et al. on Nov. 9, 2016;

U.S. patent application Ser. No. 14/558,700, entitled "AUTO-ENCODER ENHANCED SELF-DIAGNOSTIC COMPONENTS FOR MODEL MONITORING", filed by Jun Zhang et al. on Dec. 2, 2014; and "EXACT CALCULATION OF THE HESSIAN MATRIX FOR THE MULTI-LAYER PERCEPTRON," by Christopher M. Bishop, published in Neural Computation 4 No. 4 (1992) pages 494501.

FIELD OF THE DISCLOSURE

This disclosure relates to sequence anomaly detection. Presented herein are techniques for contextual embedding of features of operational logs or network traffic for anomaly detection based on sequence prediction.

BACKGROUND

Network security is a major challenge for network-based systems such as enterprise and cloud datacenters. These systems are complex and dynamic and run in evolving network environments. Analyzing the massive volumes of data flowing between hosts, and the distributed processing that accompanies that traffic, although increasingly crucial from a network security perspective, exceeds the workload capacity of a human security expert. In some ways, traffic and activity analysis is more or less unmanageable with some techniques.

A fundamental representation of network data is the raw network traffic carried as network packets. Most malicious activities happen in the application layer of the TCP/IP network model, where an application passes a flow of network packets between hosts. Evidence of malicious activity may be more or less hidden within network flows of packets.

Most existing industrial solutions leverage rule- or signature-based techniques for malicious activity detection in network flows. Some techniques ask security experts to fully inspect known malicious flows so as to extract rules or signatures out of them. A new flow is detected as malicious if it matches with any existing rule or signature. The rule- or signature-based techniques have three obvious drawbacks: (i) they can only detect known malicious activities, (ii) the patterns and rules are often very difficult to generalize and therefore frequently miss slightly changed malicious activities, and (iii) there is a significant requirement for human security experts to be involved.

Fortunately, most network devices (such as servers, routers and firewalls) summarize the activities and events occurred on the devices in textual log messages. For example, on Linux servers, the operating systems write auditd (audit demon) logs for security-related activities like login, logout, file access, etc. Evidence of malicious activity may be more or less hidden within these operational logs.

Log analysis involves large volumes of log data coming from a variety of sources even for small companies and especially for a large enterprise having multiple domain silos, multiple external interfaces, multiple middleware tiers, and a potentially confusing mix of scheduled and ad hoc activity. Consequently, manual log analysis may be a futile effort. Most entries of log data are uninteresting which makes reading through them like searching for a needle in a haystack. Furthermore, manual log analysis depends on the expertise of the human operator doing the analysis.

Rule based log filtration and analysis requires a hand crafted and human-error prone rule for each known type of malicious behavior. The rule set is limited to known attacks and may be difficult to manually maintain evolution over time to adapt to new types of malicious behavior.

Even when assisted by machine learning, manual chores may remain. Choosing informative, discriminative and independent features is a crucial step for building an effective classification machine learning model. Often features are extracted from individual log messages, thus ignoring all possible inter-relationships between them and losing contextual information. Thus, the effectiveness of the machine learning model can be seriously hampered. Training a model on individual log messages may mislead the model to attempt to detect independently anomalous log messages rather than anomalous activities that span multiple log messages or network packets.

Tools such as Splunk may provide search and exploration capabilities for Windows and Linux logs, such as audit logs. Splunk may predict numeric fields (linear regression), predict categorical fields (logistic regression), detect numeric outliers (distribution statistics), detect categorical outliers (probabilistic measures), forecast time series and cluster numeric events. Effective use of such a tool requires in-depth knowledge of the context, given that the user can only select a limited number of log message fields for every search query. However, log message parsing is static and tailored for dash-boarding tools rather than security tools. As a result, Splunk cannot discover relationships among different log message fields or even log messages.

Elastic (ELK) Stack is a log collection, transformation, normalization and visualization framework that includes time-series analysis over a set of user-selected log message fields. Effective use of ELK necessitates in-depth knowledge of the problem and application context, as the ELK user is tasked with setting up the time-series analysis pipeline and analyzing the results. Unfortunately, tools such as ELK are prone to false positives, which must be filtered by a domain-expert user.

Overall, both Splunk and ELK are shipped with detection tools that are static and have few or no learning capabilities. Therefore, the applicability of Splunk and ELK is limited because any fresh data triggers a re-analysis over the entire dataset (Splunk) or the last analysis window (ELK). As a result, both tools fall short of correlating log messages into meaningful groups and hence lose the context and opportunity of detecting a malicious event.

Structured logs are mostly constructed from key-value pairs, such as for categorical fields. In typical machine learning, categorical/state variables are usually vectorized via one-hot encoding. As a result, depending on the total number of categorical fields and their associated values in the log messages, the resulting feature vector can be very large but at the same time sparse. On the other hand, there is not much semantic or contextual information encoded in the resulting vector. For example, in the one-hot encoded vector space, two states (e.g. field values) which have more in common are as equally distant as two states which are totally independent.

An embedding model is needed that provides not only a dense and reduced feature vector but also an optimized vector that has more semantics. There is a need for new techniques that depart from the basic models that work on individual log messages or simply aggregate the information in log messages by summing or averaging the features. On one hand, individual log message analysis is extremely weak for many cyber-attack scenarios where the interrelation between log messages matters. On the other hand, heuristic methods such as averaging ignore some important information in the sequential data such as an ordering of log messages.

BRIEF DESCRIPTION OF THE DRAWINGS

In the drawings:

FIG. 23 is a tabular diagram that depicts an example log that contains semi-structured operational (e.g. diagnostic) data from which log messages and their features may be parsed and extracted, in an embodiment;

FIG. 25 is a block diagram that illustrates a basic software system that may be employed for controlling the operation of a computing system.

DETAILED DESCRIPTION

Figure 1:
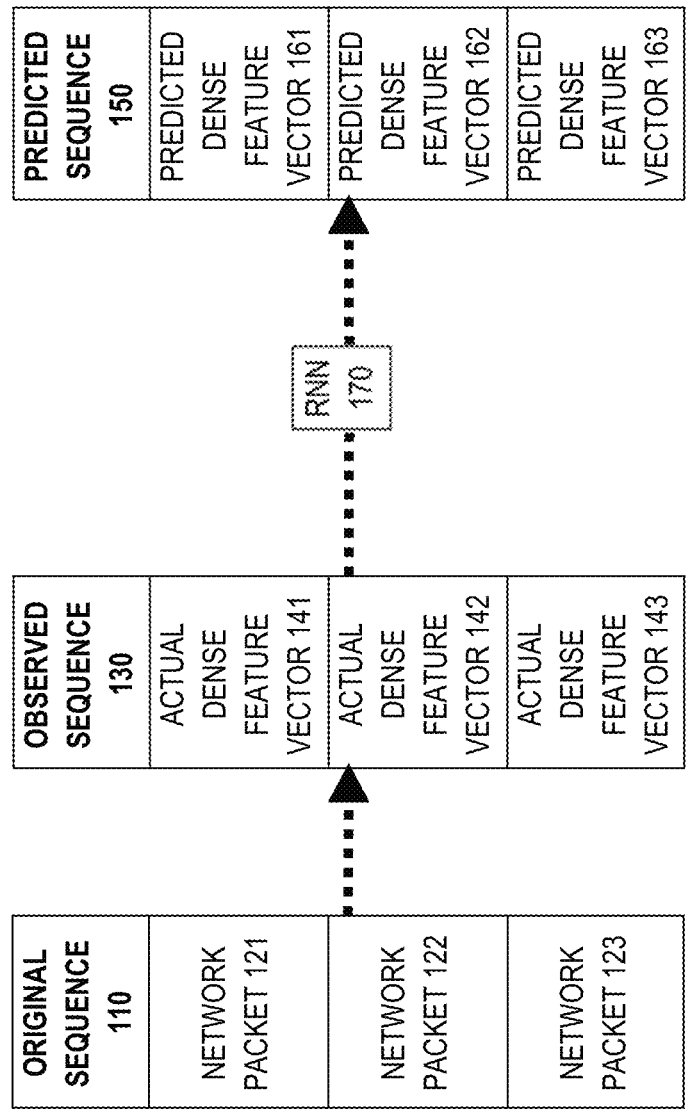
FIG. 1 is a block diagram that depicts an example computer that has a predictive recurrent neural network (RNN) that detects an anomalous network flow, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Example Computer
2.1 Network Packet
2.2 Feature Extraction and Encoding
2.3 Recurrent Neural Network
3.0 Anomaly Detection Process
4.0 Contextual Encoding
4.1 Benefits of Feature Embedding
4.2 Unsupervised Training
5.0 Contextual Encoding Process
6.0 Network Flow Alerting
6.1 Anomaly Score
6.2 Future Proof
7.0 Alerting Process
8.0 Sequence Prediction
8.1 Packet Anomaly Score
9.0 Sequence Prediction Process
10.0 Packet Anatomy
10.1 Network Flow Demultiplexing
11.0 Training
12.0 Embedding Logged Features
13.0 Log Feature Embedding Process
14.0 Contextual Encoding Implications
15.0 Training Harness
15.1 Decoding for Reconstruction
15.2 Measured Error
16.0 Training with Reconstruction
17.0 Activity Graph
18.0 Graph Embedding
18.1 Pruning
18.2 Log Trace
19.0 Graph Embedding Process
20.0 Trace Aggregation
21.0 Trainable Anomaly Detection
22.0 Trace Composition
22.1 Composition Criteria
23.0 Trace Detection Process
24.0 Declarative Trace Detection
24.1 Declarative Rules
24.2 Example Operation
25.0 Machine Learning Model
25.1 Artificial Neural Networks
25.2 Illustrative Data Structures for Neural Network
25.3 Backpropagation
25.4 Deep Context Overview
26.0 Hardware Overview
27.0 Software Overview
28.0 Cloud Computing 1.0 General Overview Techniques are provided herein for contextual embedding of features of operational logs or network traffic for anomaly detection based on sequence prediction. These techniques may detect malicious activity by anomaly analysis of context-aware feature embeddings of network packet flows, log messages, and/or log traces.

In an embodiment, a computer has a predictive recurrent neural network (RNN) that detects an anomalous network flow. The computer generates a sequence of actual dense feature vectors that corresponds to a sequence of network packets. Each feature vector of the sequence of actual dense feature vectors represents a respective network packet of the sequence of network packets. The RNN generates, based on the sequence of actual dense feature vectors, a sequence of predicted dense feature vectors that represent the sequence of network packets. The sequence of network packets is processed based on the sequence of predicted dense feature vectors.

In an embodiment, an RNN contextually transcodes sparse feature vectors that represent log messages into dense feature vectors that may be predictive or used to generate predictive vectors. A computer processes each log message in a sequence of related log messages as follows. Features are extracted from the log message to generate a sparse feature vector that represents the features. The sparse feature vector is applied as stimulus input into a respective step of an encoder RNN. From the encoder RNN, a respective embedded feature vector is outputted that is based on the features and one or more log messages that occurred earlier in the sequence of related log messages. One or more embedded feature vectors outputted from the encoder RNN are processed to determine a predicted next related log message that should occur in the sequence of related log messages.

In an embodiment, graph embedding improves feature embedding of log traces. A computer receives independent feature vectors. Each independent feature vector contextually occurs as follows. The independent feature vector represents a respective log trace. The respective log trace represents a respective single action. The respective log trace is based on one or more log messages that were generated by the respective single action. The respective log trace indicates one or more network identities.

Graph embedding entails generating one or more edges of a connected graph that contains a particular vertex that was generated from a particular log trace that is represented by a particular independent feature vector. Each edge connects two vertices of the connected graph that were generated from two respective log traces that are represented by two respective independent feature vectors. The two respective log traces indicate a same network identity. An embedded feature vector is generated based on the independent feature vectors that represent log traces from which vertices of the connected graph were generated. Based on the embedded feature vector, the particular log trace is indicated as anomalous.

In an embodiment, a computer detects and feature-encodes independent traces from related log messages. Key value pairs are extracted from each log message. A trace that represents a single action is detected based on a subset of log messages whose key value pairs satisfy grouping criteria. A suspect feature vector that represents the trace is generated based on the key value pairs from the subset of log messages. Based on one or more feature vectors that include the suspect feature vector, an anomaly detector indicates that the suspect feature vector is anomalous.

2.0 Example Computer

FIG. 1 is a block diagram that depicts an example computer 100, in an embodiment. Computer 100 has a predictive recurrent neural network (RNN) that detects an anomalous network flow. Computer 100 may be one or more computers such as an embedded computer, a personal computer, a rack server such as a blade, a mainframe, a virtual machine, or any computing device that is capable of executing an artificial neural network (ANN) such as with hyperbolic functions, differential equations, and matrix operations such as multiplication. Example ANN implementations and techniques are discussed below in section "Artificial Neural Network Overview."

FIG. 1 shows a data flowing from left to right, with data transformations occurring at each stage of the workflow. Sequences 110, 130, and 150 may reside as data structures within random access memory (RAM) of computer 100. Original sequence 110 contains network packets 121-123 that occur sequentially in a network flow. The network flow may form a conversation or other stream between two computers (not shown).

2.1 Network Packet

A network packet is a smallest unit of transmission, such as a protocol data unit (PDU) of a network layer, such as an internet protocol (IP) datagram, or a data frame of a data link layer, such as an Ethernet frame. Each of packets 121-123 is or was a live packet that traverses a network link (not shown) that is monitored by a network element. In an embodiment, computer 100 is a network element within a live network route through which packets 121-123 ordinarily flow. For example, computer 100 may be a switch, a router, a bridge, a relay, or a proxy.

In an embodiment, computer 100 is a live network element that is outside of the route of packets 121-123. For example, the network flow may be forked/split/tee to feed copies of packets 121-123 in more or less real time to computer 100, while the original packets are further transmitted down an opposite fork of the split. In an embodiment, computer 100 is offline such that live network flows are unavailable, and original sequence 110 was previously recorded for delayed (e.g. scheduled) analysis. For example, original sequence 110 may be durably spooled into a file or database.

In an embodiment, the network flow occurs within network traffic that simultaneously contains multiple flows. For example, a data link may be multiplexed (e.g. temporally, such as with timeslots). For example, packets 121-123 appear contiguous within original sequence 110, although they may have been interleaved with other packets (not shown) of other flows during live transmission.

In an embodiment, computer 100 receives commingled flows and untangles (i.e. demultiplexes) them into individual flows for recording and/or analysis. For example, each packet may bear an identifier of a sender and an identifier of a recipient, which together may identify a flow. Each packet may bear additional identifiers, such as for a session, an application, an account, or a principal (e.g. end user), that may also be needed to identify a flow. Thus, individual packets may be correlated with a same or different flow. In an embodiment, computer 100 receives untangled (i.e. separated) flows or only one flow. In any case, original sequence 110 and packets 121-123 are part of a same (e.g. untangled) flow.

2.2 Feature Extraction and Encoding

In operation, computer 100 converts original sequence 110 directly or indirectly into observed sequence 130, which represents packets 121-123 in a format that recurrent neural network (RNN) 170 accepts as input stimulus. Each of packets 121-123 may be individually converted into respective feature vectors 141-143. In the shown embodiment, feature vectors 141-143 are densely encoded, such that most or all bits of a feature vector represent meaningful attributes a network packet. However, a dense encoding need not be discrete, such that particular bits always represent a particular feature.

In an embodiment, feature extraction and encoding is used to directly generate observed sequence 130 from original sequence 110, such as with a predefined semantic mapping. In an embodiment, an intermediate encoding (not shown) occurs between original sequence 110 and observed sequence 130, such as a sparse feature encoding. Sparse encoding and subsequent dense transcoding are discussed later herein.

2.3 Recurrent Neural Network

In operation, observed sequence 130 that specially encodes the network flow, and RNN 170 consumes observed sequence 130. Unlike conventional ANNs, an RNN is stateful. An RNN is naturally suited to analyzing a sequence of related items, including recognizing interesting orderings of items within the sequence. Thus, an RNN naturally achieves contextual analysis, which may be crucial to identifying an anomaly. For example, a network flow may be anomalous, even when all of the packets of the flow seem normal individually. For example, one ordering of packets may be anomalous, while another ordering of the same packets may be normal, which is something that RNN 170 can be trained to facilitate detection of.

In operation, RNN 170 outputs a predicted next feature vector of predicted sequence 150 that is expected to match a feature vector observed sequence 130 of a next packet in original sequence 110. For an observed sequence, such as 130, RNN 170 outputs a corresponding predicted sequence 150. Computer 100 may compare feature vector sequences 130 and 150 to each other to detect whether or not they match (e.g. bitwise), thereby achieving contextual sensitivity such as incorporating information about surrounding (i.e. temporally or semantically related) packets and not merely a current packet in isolation.

For example when activated with actual feature vector 141 of packet 121, RNN 170 may generate predicted feature vector 162 as a predicted next feature vector for next packet 122 that is represented by actual feature vector 142. Thus, packet 122 may be predicted based on a previous sequence of packet(s) (e.g. 121). Computer 100 may detect that feature vectors 142 and 162 do not match and thereby recognize that the network flow is anomalous because a packet occurred that was different from an expected packet. Operation of an RNN is discussed further later herein. Example RNN implementations and techniques are discussed below in section "Deep Context Overview."

RNN 170 may have various internal architectures based on neuronal layering and units of repetition (i.e. cells), with each cell consisting of a few specialized and specially arranged neurons, such as with long short-term memory (LSTM) network. In a Python embodiment, a third party library such as Keras may provide an RNN with or without LSTM. In a Java embodiment, deeplearning4j may be used as the third party library. In a C++ embodiment, TensorFlow may be used. In an embodiment, graphical processing units (GPUs) or other single instruction multiple data (SIMD) infrastructure such as a vector processor may provide hardware acceleration of the training and/or production use of RNN 170.

3.0 Anomaly Detection Process

Figure 2:
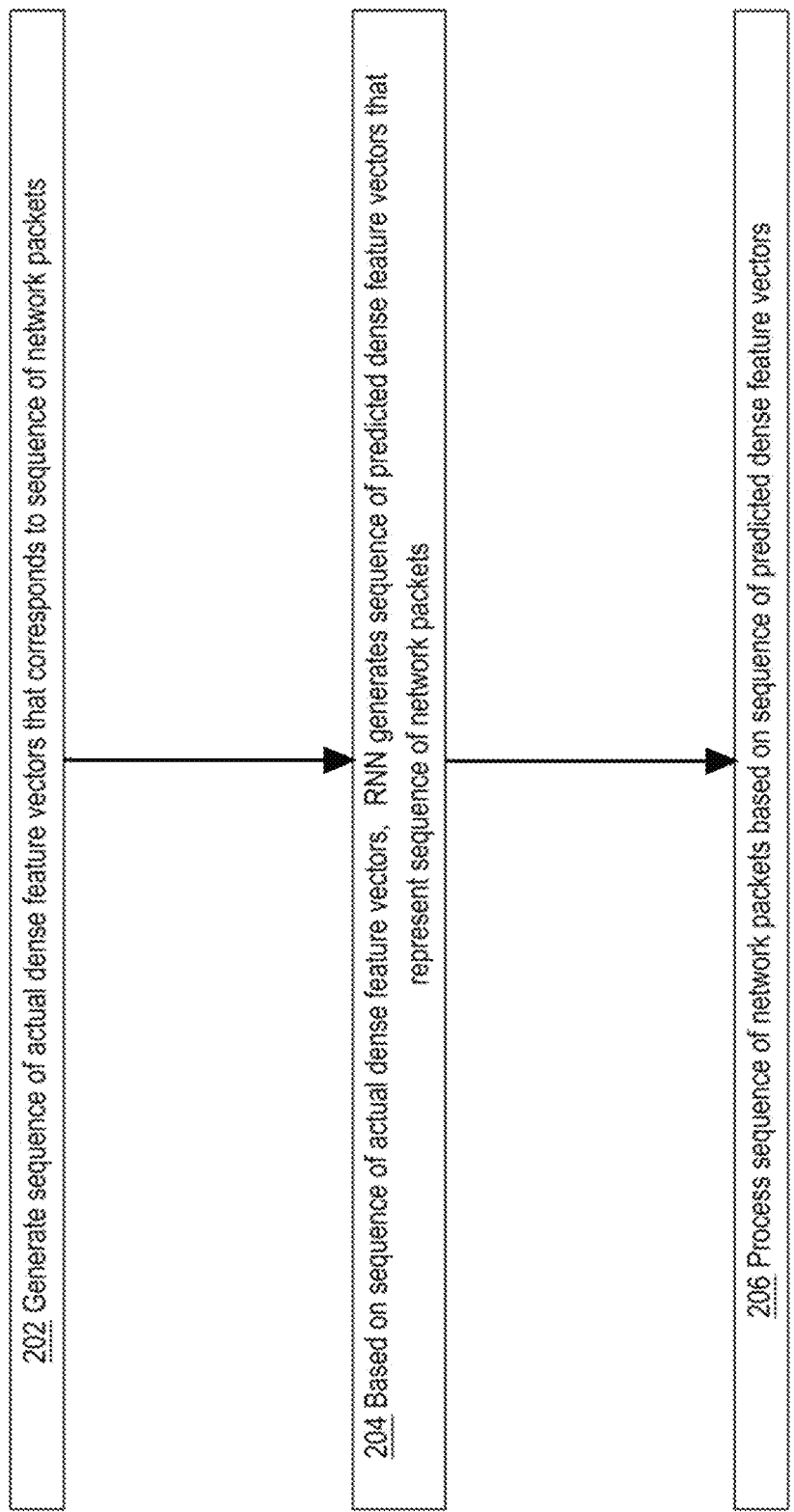
FIG. 2 is a flow diagram that depicts an example process for using a predictive RNN to detect an anomalous network flow, in an embodiment.

FIG. 2 is a flow diagram that depicts computer 100 using a predictive RNN to detect an anomalous network flow, in an embodiment. FIG. 2 is discussed with reference to FIG. 1.

Step 202 generates a sequence of actual dense feature vectors that corresponds to a sequence of network packets. For example, computer 100 originally receives (or obtains a copy of) original sequence 110 of network packets 121-123. Network packets 121-123 may be obtained in bulk, or packets naturally may individually arrive with various latencies. Original sequence 110 is directly or indirectly converted into observed sequence 130 of actual dense feature vectors 141-143 that represent packets 121-123 in a format that RNN 170 accepts as input stimulus. In an embodiment, each network packet is individually translated into a respective actual dense feature vector.

In step 204, based on the sequence of actual dense feature vectors, the RNN generates a sequence of predicted dense feature vectors that represent the sequence of network packets. For example, RNN 170 outputs predicted sequence 150 of predicted dense feature vectors 161-163. Advantages of densely encoded feature vectors include acceleration and size reduction of an ANN as discussed below in section "Benefits of Feature Embedding."

In step 206, the sequence of network packets is processed based on the sequence of predicted dense feature vectors. For example, predicted sequence 150 may be compared to observed sequence 130. Each of predicted dense feature vectors 161-163 may be individually compared to respective actual dense feature vectors 141-143. Any individual mismatch or multiple mismatches of dense feature vectors within a sequence may indicate an anomaly. Thus, an anomaly may be detected based on an initial subsequence of dense feature vectors within a sequence. For example, an anomalous mismatch between dense feature vectors 142 and 162 may be detected before network packet 123 is received.

Original sequence 110 may be further processed based on whether or not predicted sequence 150 is anomalous. For example, computer 100 may raise an alert, perform further analysis of original sequence 110 and/or monitoring, quarantine original sequence 110, terminate a network connection, or lock an account. If predicted sequence 150 is not anomalous, then original sequence 110 may be relayed to an originally intended recipient.

4.0 Contextual Encoding

Figure 3:
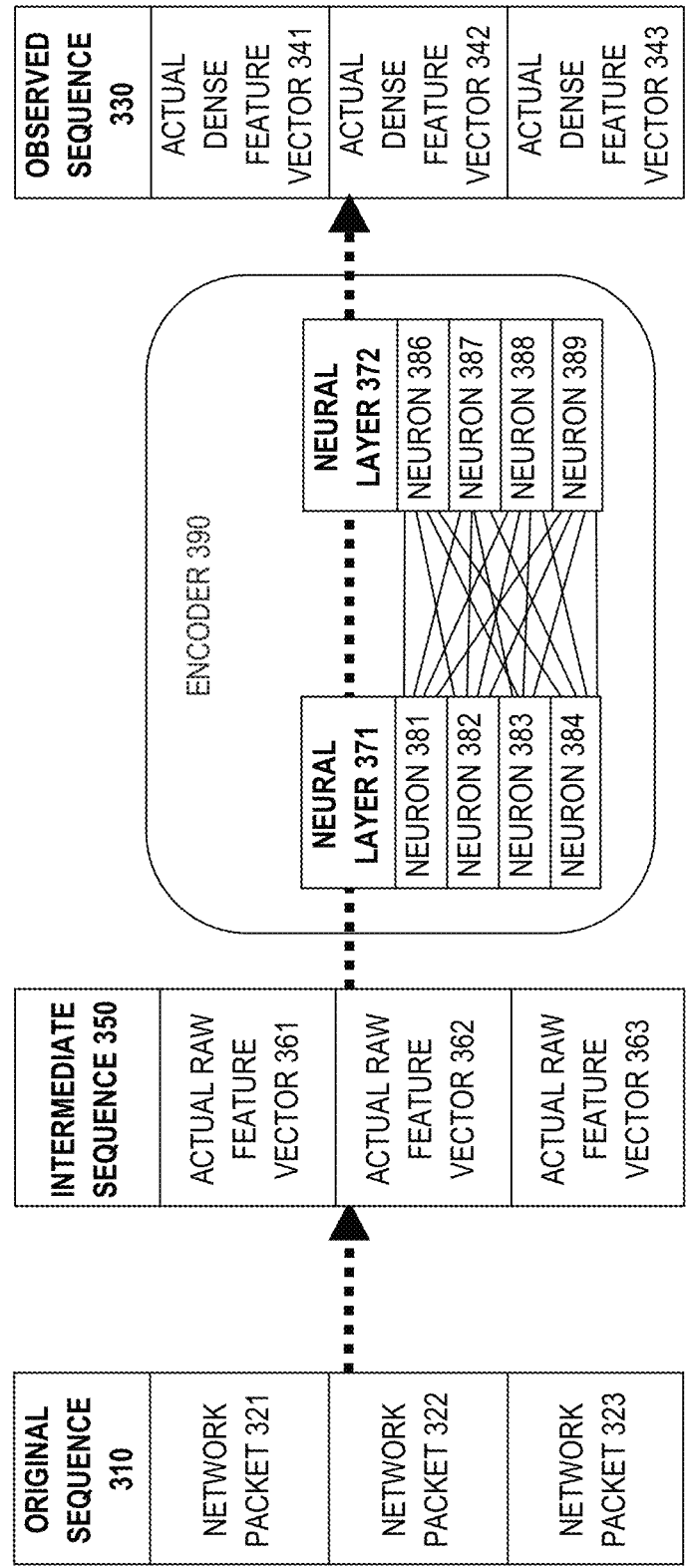
FIG. 3 is a block diagram that depicts an example computer that generates dense feature vectors by transcoding raw feature vectors that are sparse, in an embodiment.

FIG. 3 is a block diagram that depicts an example computer 300, in an embodiment. Computer 300 generates dense feature vectors by transcoding raw feature vectors that are sparse. Computer 300 may be an implementation of computer 100.

Feature encoding may affect the accuracy of regressions such as anomaly detection. A naïve, simple, or straightforward encoding, such as a sparse feature encoding, tends to treat all features as equally important, which does not eliminate noise from raw data such as network packets and flows. For example, some features may simply be distracting, which may implicate the so-called "curse of dimensionality," which may cause overfitting.

Raw feature vectors 361-363 of intermediate sequence 350 are sparse direct encodings of respective network packets 321-323. Sparse encoding has advantages that justify starting with a sparse encoding before transcoding into a dense encoding for downstream deep analysis, such as by an RNN (not shown). The primary advantage of sparse encoding is that it is amenable to transcoding and need not entail intensive (e.g. skilled) design. For example, sparse encoding needs no awareness of natural (and possibly counter-intuitive) relationships between features. Indeed, advanced techniques such as feature selection may be more or less avoided during sparse encoding. Techniques and mechanics of sparse encoding are discussed later herein for FIG. 9.

4.1 Benefits of Feature Embedding

Encoding into a reduced (i.e. denser) space may be lossy, which may actually be advantageous, such as with dimensionality reduction. If noisy features are deemphasized (e.g. lost), and important features are emphasized (e.g. amplified or at least preserved), then a lossy denser encoding may actually increase the accuracy of anomaly detection. For example, raw feature vector 361 may contain thousands of features. Whereas, dense feature vector 341 may contain only a few hundred most interesting features. Thus, transcoding from a readily available sparse intermediate sequence 350 to an optimized dense observed sequence 330 may improve the accuracy of an RNN (not shown) that consumes observed sequence 330. Such transcoding is performed by encoder 390.

Encoder 390 transcodes each raw feature vector 361-363 individually (i.e. one at a time) into respective dense feature vector 341-343. Because transcoding need not consider temporal context (i.e. relationships between multiple packets of a flow), encoder 390 may be stateless. In an embodiment, encoder 390 comprises an artificial neural network (ANN), such as a multi-layer perceptron (MLP) for deep learning. In the shown embodiment, encoder 390 has a stack of at least neural layers 371-372, with neurons of adjacent layers fully connected for deep learning. More layers and connections helps an MLP to recognize more patterns and subtler distinctions between patterns. In that sense, deep implies many layers (not shown).

Dense encoding of observed sequence 330 may achieve a variety of performance improvements over sparse encoding of intermediate sequence 350. Dense encoding may emphasize semantic context, such as relationships between features, that may be as important or more than discrete (i.e. separate) features. Dense encoding may emphasize feature selection, such as deemphasizing (e.g. discarding) noisy features.

Context and feature selection may intersect, such as when a particular feature is relevant or irrelevant depending on context such as combinations of features. Thus, dense encoding may have an optimal vocabulary of labels (i.e. symbols representing combinations of features and values) that, although dense (i.e. reduced), is actually based on complicated and/or numerous heuristics that are implied in the static connection weights of an ANN.

4.2 Unsupervised Training

A (neural or not) trainable encoder 390 may be given predefined labels during supervised training. Unfortunately, labels are domain and application specific. Thus, defining labels may be an expensive design chore in terms of research and development (R&D) time and expertise. In theory, there may be infinite variations and/or kinds of possible anomalies, including anomalies unknown during training. Labeling all possible anomalies may be impossible. Fortunately, a priori labeling can be avoided with unsupervised training of encoder 390. All of the machine learning models discussed herein are suitable for unsupervised training.

In an embodiment, encoder 390 is an autoencoder, which is an unsupervised deep learning MLP (or stack of multiple specialized MLPs) that is trained to be a coder/decoder (codec). The codec stacks an MLP decoder downstream of an MLP encoder. In an embodiment, encoder 390 is only the MLP encoder layers of the autoencoder. For example, the autoencoder may be trained or retrained as a full stack of MLPs, then dissected into subsets of layer to isolate the encoder MLP for production deployment as encoder 390. In an embodiment discussed later herein, the autoencoder is split into encoder 390 and a decoder, and a predictive RNN is then stacked (i.e. inserted) downstream of encoder 390 and upstream of the decoder.

During unsupervised training of an autoencoder, vocabulary for a dense encoding spontaneously emerges and is learned. Due to the feedback loop that a codec may be configured for, especially for training, the autoencoder learns a vocabulary that is dense (i.e. more or less free of noise and padding), but not necessarily maximally dense. For an autoencoder, optimality is based on accuracy, of which density may be an important factor, but not exclusively so. Dense coding, transcoding, and autoencoding are discussed further later herein. Example implementations and techniques, including training, for autoencoders are discussed below in section "Deep Training Overview."

5.0 Contextual Encoding Process

Figure 4:
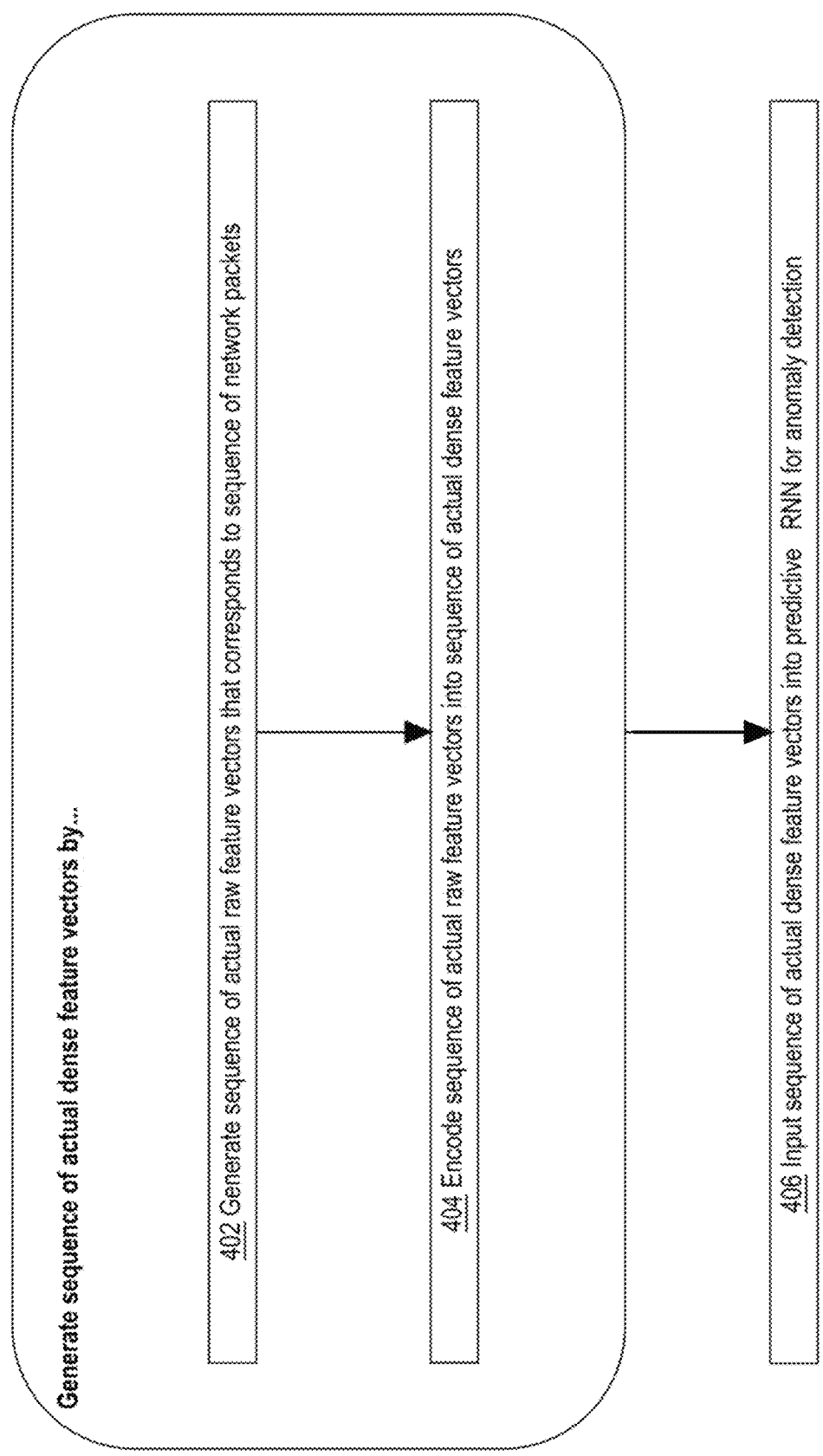
FIG. 4 is a flow diagram that depicts an example process for generating dense feature vectors by transcoding raw feature vectors that are sparse, in an embodiment.

FIG. 4 is a flow diagram that depicts computer 300 generating dense feature vectors by transcoding raw feature vectors that are sparse, in an embodiment. FIG. 4 is discussed with reference to FIG. 3.

Original sequence 310 of network packets 321-323 is received before or during step 402. Step 402 generates a sequence of actual raw feature vectors that corresponds to a sequence of network packets. For example, network packets 321-323 are directly encoded into respective sparse raw feature vectors 361-363 of intermediate sequence 350. Techniques and mechanics of sparse encoding are discussed later herein for FIG. 9.

Step 404 encodes the sequence of actual raw feature vectors into a sequence of actual dense feature vectors. For example, encoder 390 may be an autoencoder (as discussed later herein) or other MLP that transcodes each raw feature vector 361-363 individually (i.e. one at a time) into respective dense feature vector 341-343.

Step 406 is exemplary. Other embodiments may instead perform an alternate action than the one depicted in step 406. Step 406 applies the sequence of actual dense feature vectors as input stimulus into a predictive RNN, such as for anomaly detection. For example, observed sequence 330 may also be observed sequence 130 that is applied to RNN 170 in FIG. 1 to generate predicted sequence 150 that may be compared to observed sequence 130/330 for anomaly detection.

6.0 Network Flow Alerting

Figure 5:
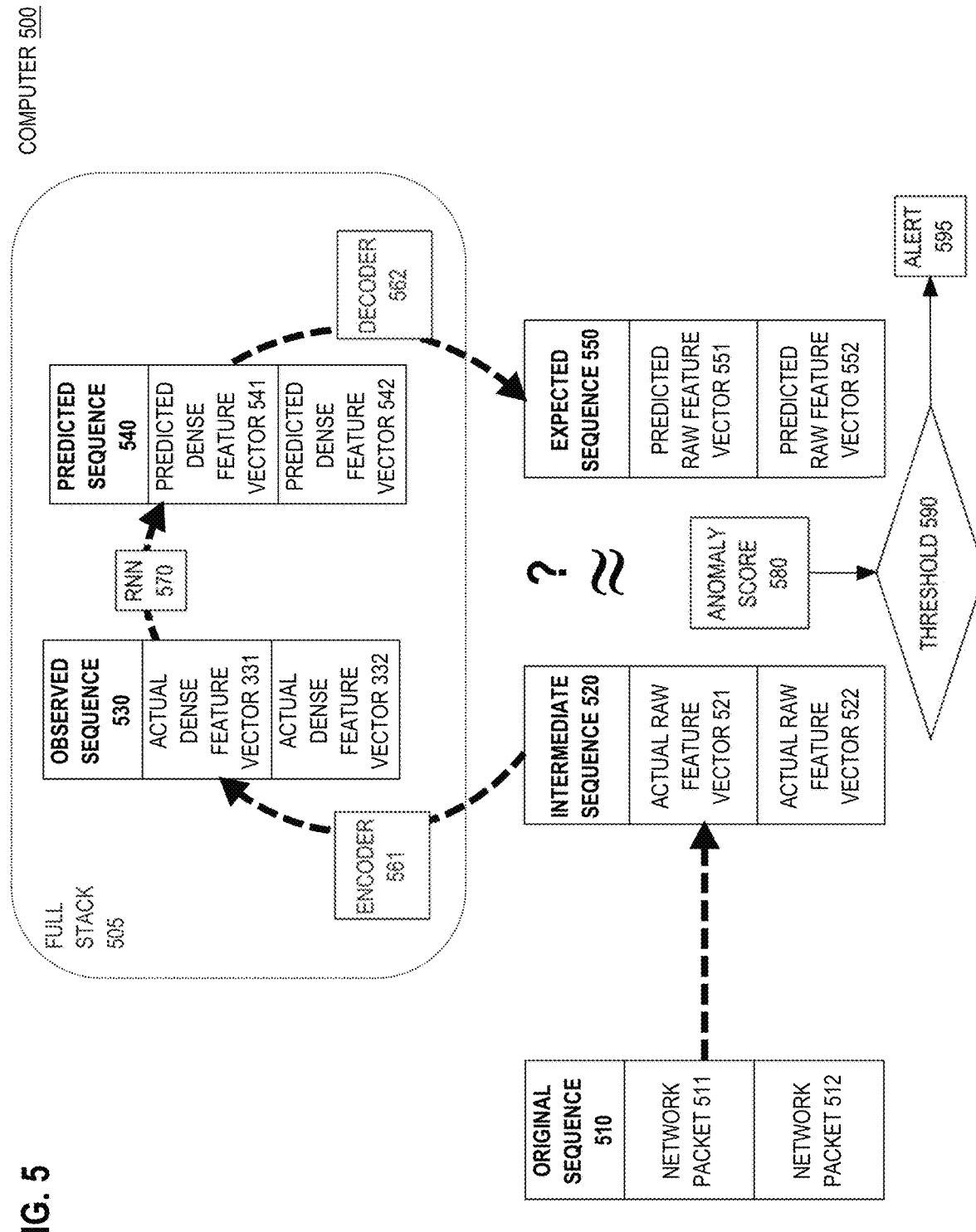
FIG. 5 is a block diagram that depicts an example computer that alerts an anomalous network flow, in an embodiment.

FIG. 5 is a block diagram that depicts an example computer 500, in an embodiment. Computer 500 alerts an anomalous network flow. Computer 500 may be an implementation of computer 100.

Computer 500 contains full stack 505 of specialized MLPs. Although full stack 505 does not actually detect anomalies, it does make sequence predictions that may facilitate downstream anomaly detection as follows.

Full stack 505 consists essentially of transcoders 561-562 and RNN 570 in between them. Transcoders 561-562 function together in series as a codec to mediate between full stack 505 that internally uses dense encoding and the rest of computer 500 that provides and expects raw (i.e. sparse) encoding. Data flows into and out of full stack 505 as follows.

Computer 500 sparsely encodes original sequence 510 of network packets 511-512 into intermediate sequence 520 of actual raw feature vectors 521-522, that encoder 561 transcodes into observed sequence 530 of actual dense feature vectors 331-332. Observed sequence 530 is consumed by RNN 570 that responsively generates predicted sequence 540 of predicted dense feature vectors 541-542 that decoder 562 reverse transcodes back into expected sequence 550 of predicted raw (i.e. sparse) feature vectors 551-552.

In an embodiment, original sequence 510 is buffered or otherwise recorded such that data may be transformed and transferred as a batch of vectors from original sequence 510, along the circuitous path shown, to expected sequence 550. In an (e.g. streaming) embodiment, each individual network packet or corresponding feature vector is individually transformed and transferred along the shown data path. For example, packet 511 may traverse the shown data path to output, into expected sequence 550, a predicted feature vector of an anticipated next packet before the next packet actually exists (i.e. generated and outputted by a source network element). For each packet arriving at computer 500 in real time, full stack 505 may already have made a prediction of that packet (i.e. raw feature vector), which may be used to evaluate, by comparison, how suspicious is the actually received packet.

6.1 Anomaly Score

Anomaly detection may occur as follows. Computer 500 may compare expected sequence 550, as predicted, to intermediate sequence 520 as actually received. The difference in content between sequences 520 and 550 may be measured as anomaly score 580. Later herein are embodiments that individually compare each predicted raw feature vector to a corresponding actual raw feature vector, and that use techniques such as mean-squared error to calculate anomaly score 580.

If anomaly score 580 exceeds threshold 590, then an anomaly is detected and alert 595 may be raised. Alert 595 may be recorded and/or interactively raised to a human network administrator. Alert 595 may instigate immediate or deferred analysis of security concerns and implications. Alert 595 may automatically or indirectly cause security intervention that may impose, upon a party, application, or computer that is involved with the offending network flow, various counter measures such as auditing, increased monitoring, and/or suspension of permissions or capabilities.

In a streaming embodiment that incrementally (i.e. as each packet arrives) analyzes a network flow, threshold 590 may be crossed before the entire flow of packets is received or analyzed. For example, a subsequence of packets of a flow may be sufficient to detect an anomaly. Thus, a live counter measure may occur in real time, such as triggering deeper analysis or monitoring, such as deep packet inspection, or terminating a suspect network connection.

Alert 595 may contain details of about the anomaly, the offending packet, original sequence 510, or metadata about the suspect network flow. Alert 595 at least indicates an anomaly, which typically represents a network attack (e.g. intrusion). Depending on its sophistication (e.g. depth of layers), predictions made by RNN 570 may be divergent (i.e. anomalous) for various kinds or styles of attacks. In an embodiment, RNN 570 makes divergent predictions for one, some, or all kinds of attacks, including hypertext transfer protocol (HTTP) denial of service (DoS), brute-force secure shell (SSH), or simple network management protocol (SNMP) reflection amplification.

6.2 Future Proof

Due to unsupervised training for more or less generalized packet sequence prediction, RNN 570 may help reveal anomalies that arise during new kinds of attacks that might not have existed when RNN 570 was trained. Thus, RNN 570 may achieve a versatility that exceeds rival techniques based on supervised training or a rules base. Thus, RNN 570 may be more or less future proof, because of its natural tendency to show unfamiliar patterns as inherently surprising.

Because of RNN 570's versatility, RNN 570 can be used in a production environment to analyze network flows of somewhat opaque applications. For example, RNN 570 is effective even when an application that emits network traffic is a black box (i.e. opaque) application that lacks source code and/or documentation or is otherwise unfamiliar.

Also because of RNN 570's versatility, RNN 570 can be placed into various corners of a network topology. For example, RNN 570 can reside and/or analyze flows that occur outside of a firewall or inside a demilitarized zone (DMZ). RNN 570 may analyze flows between third parties in real time, such as for man-in-the-middle inspection by a carrier, perhaps with port mirroring or cable splitting.

Packets may be obtained using tools such as packet capture (pcap) and/or terminal based wireshark (TShark). Packet capture files may be emitted by tools such as transport control protocol dump (tcpdump). Files containing recorded packets from any of these tools may be analyzed according to techniques herein, such as for anomaly detection.

7.0 Alerting Process

Figure 6:
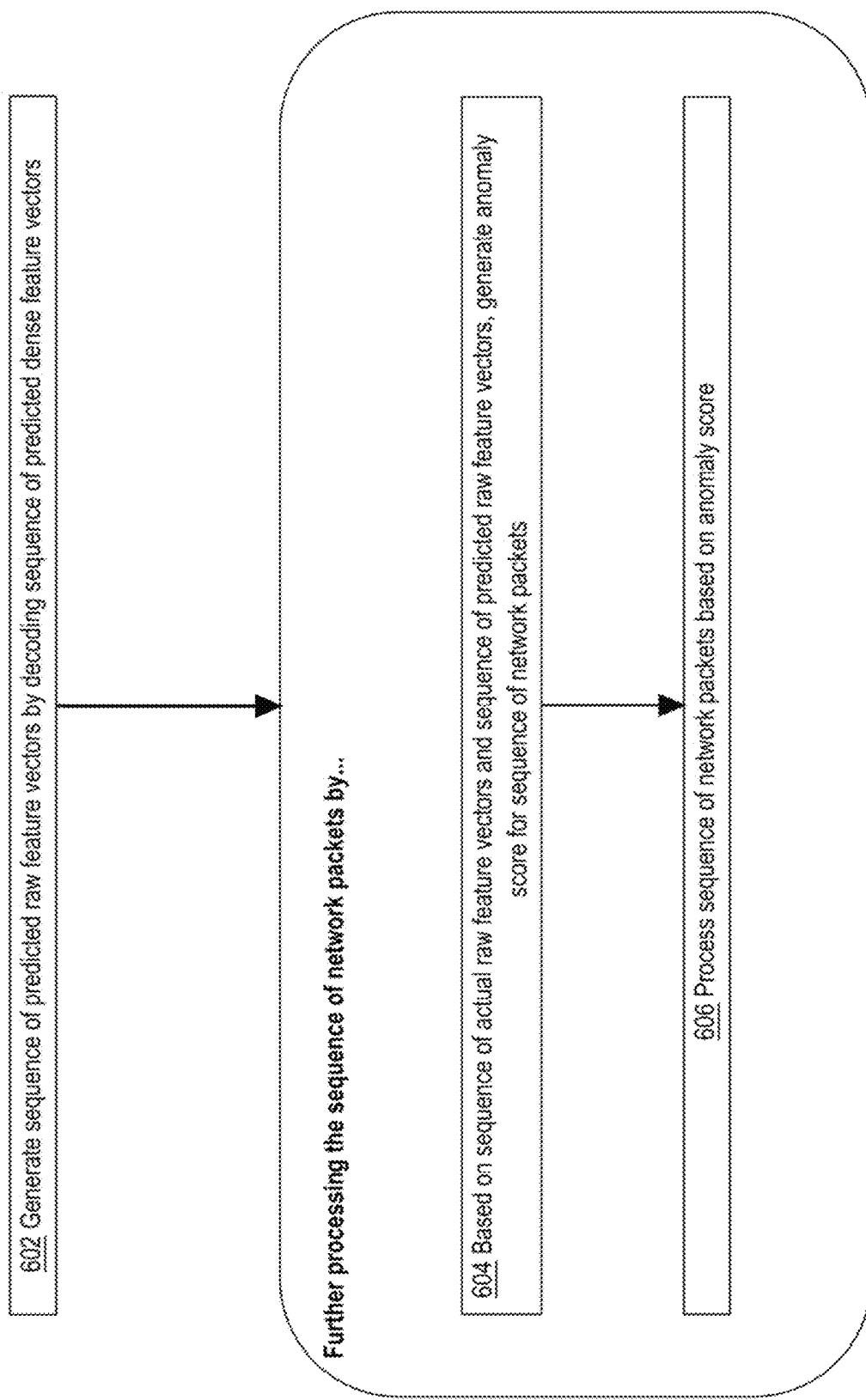
FIG. 6 is a flow diagram that depicts an example process for alerting an anomalous network flow, in an embodiment.

FIG. 6 is a flow diagram that depicts computer 500 alerting an anomalous network flow, in an embodiment. FIG. 6 is discussed with reference to FIG. 5.

Before or during step 602, RNN 570 generates predicted sequence 540 of predicted dense feature vectors 541-542 that represent original sequence 510 of network packets 511-512 as predicted. Step 602 generates a sequence of predicted raw feature vectors by decoding a sequence of predicted dense feature vectors. For example, decoder 562 may be an autodecoder (per autoencoders as discussed later herein) or other MLP that transcodes each dense feature vector 541-542 individually (i.e. one at a time) into respective predicted raw feature vector 551-552.

Based on a sequence of actual raw feature vectors and the sequence of predicted raw feature vectors, step 604 generates an anomaly score for a sequence of network packets. For example, computer 500 may compare expected sequence 550, as predicted, to intermediate sequence 520 as actually received. The difference in content between sequences 520 and 550 may be measured as anomaly score 580. Later herein are embodiments that individually compare each predicted raw feature vector to a corresponding actual raw feature vector, and that use techniques such as mean-squared error to calculate anomaly score 580.

Step 606 further processes the sequence of network packets based on the anomaly score. For example, an anomaly is detected when anomaly score 580 exceeds threshold 590, which may cause alert 595 to be raised. If original sequence 510 of network packets 511-512 is not anomalous, then original sequence 510 may be normally processed, such as by relaying sequence 510 to a downstream consumer.

8.0 Sequence Prediction

Figure 7:
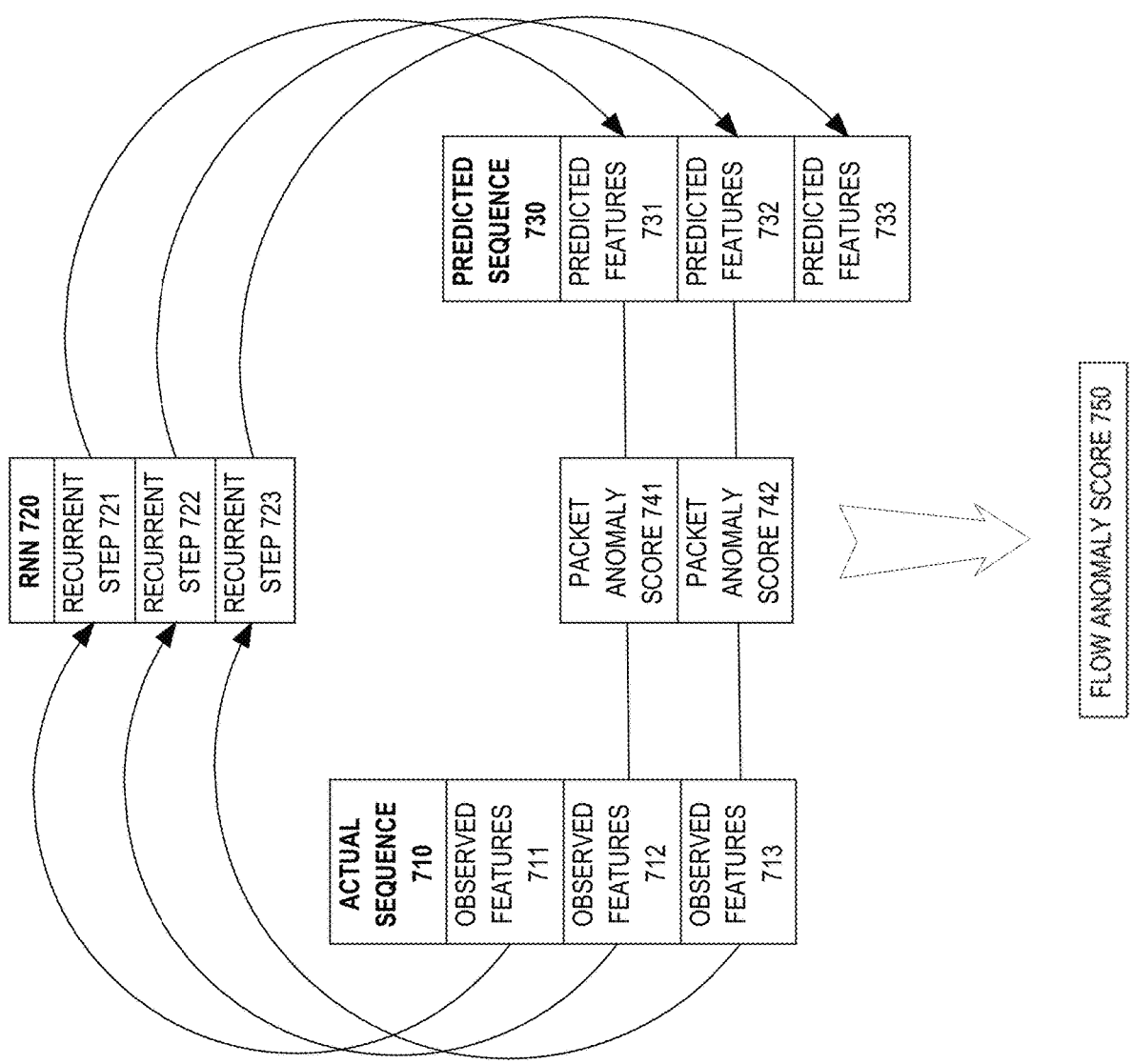
FIG. 7 is a block diagram that depicts an example computer that uses a recurrent topology of an RNN to generate packet anomaly scores from which a flow anomaly score may be synthesized, in an embodiment.

FIG. 7 is a block diagram that depicts an example computer 700, in an embodiment. Computer 700 uses a recurrent topology of an RNN to generate packet anomaly scores from which a flow anomaly score may be synthesized. Computer 700 may be an implementation of computer 100.

RNN 720 contains multiple recurrent steps, such as 721-723. Each recurrent step may contain an MLP with amounts of gated state (not shown), which are stateful neural arrangements that may latch or erase on demand, according to control gates. For example, gated state may be based on long short-term memory (LTSM). Each recurrent step 721-723 corresponds to a sequential time step, such as one for each packet of a network flow. In an embodiment, RNN 720 has as many recurrent steps as packets in a longest expected network flow, which typically has fewer than 100 packets.

RNN 720 is context (i.e. sequence) aware in two ways (not shown). First, gated state facilitates stateful (i.e. history sensitive) processing. Second, a previous recurrent step informs (i.e. activates) its contiguous next recurrent step, thereby accumulating and propagating history through logical time. For example, recurrent step 721 may have connections (not shown) that activate recurrent step 722. Thus, each recurrent step (except for first step 721 because it has no previous step) receives input from two sources: a) corresponding observed features, such as 712, and b) cross activation by the previous recurrent step.

Cross activation facilitates accumulating and propagating history potentially across all recurrent steps (e.g. an entire flow), such that processing a current (e.g. last) packet may be affected by some or all previous packets in the flow. RNN 720 is suited by various internal implementation topologies that achieve recurrence. In an embodiment, each recurrent step has its own MLP. In various embodiments, each step's MLP has: a) its own individualized connection weights, orb) copies of weights shared by all steps. In an embodiment, all steps share a same MLP, such that cross activation between steps requires back (i.e. reverse) edges that present cycles within the shared MLP.

Regardless of the internal topology of RNN 720, inputs and outputs to RNN 720, as a black box, operate as follows. Each observed feature 711-713 of actual sequence 710 comprises a dense feature vector that is applied as stimulus input into a respective recurrent step 721-723. For example, observed features 711 may represent a first packet (not shown) of a network flow. Likewise, recurrent step 721 may be a first recurrent step of RNN 720. Thus, observed features 711 is applied into recurrent step 721.

Actual sequence 710 may be a pair (not shown) of differently encoded parallel sequences, such as a sparse/raw sequence and a corresponding transcoded dense sequence. The dense feature vectors of the dense sequence are applied to recurrent steps 721-723.

Likewise, predicted sequence 730 may be a pair (not shown) of parallel sequences, such as a predicted dense sequence and a corresponding decoded sparse sequence. RNN 720 outputs the dense sequence. For example, recurrent step 721 outputs predicted features 731. A horizontal line correlates observed features 712 with predicted features 731, which suggests skew.

For example, predicted features 731 is a first vector in predicted sequence 730, whereas correlated observed features 712 is a second vector in actual sequence 710. That is because a first prediction (generated from a first packet) actually forecasts a next (i.e. second) packet. This skew is expressly depicted in FIG. 7, but may be implied (i.e. not shown) in other figures (e.g. FIG. 1) herein that show parallel sequences of input and output vectors without skew.

The horizontal line that correlates observed features 712 with predicted features 731 suggests that vectors 712 and 731 may be compared and should more or less match if not anomalous. Implications of skew are as follows. One vector of each sequence 710 and 730 is uncorrelated and not comparable to a corresponding vector. This includes the first vector 711 of the input sequence 710 and the last vector 733 of the output sequence 730. That is because RNN 720: a) does not predict a first packet, and b) outputs a last prediction that is entirely speculative (i.e. imaginary) because, for example, when a network flow ends, there is no actual next packet to receive.

8.1 Packet Anomaly Score

All other vectors are subject to correlation and comparison in pairs as the horizontal lines suggest. Each individual comparison entails a pair of opposite vectors, such as 712 compared to 731. The fitness (i.e. closeness) of each comparison, or lack of fitness, may be measured as a packet anomaly score such as 741-742, such as according to a prediction error calculation, such as mean squared. For example, if vectors 712 and 731 are mostly similar, and vectors 713 and 732 are divergent (i.e. discrepant), then packet anomaly score 742 would exceed packet anomaly score 741.

Individual packet anomaly scores need not have actionable security relevance, at an operational level, even though individual packet anomaly scores may clearly indicate which individual packets are more surprising. For actionable security, what matter is flow anomaly score 750 that integrates packet scores 741-742 into a total score that reflects how anomalous or not is an entire network flow. Different embodiments may use various mathematical integrations of packet anomaly scores 741-742 to derive flow anomaly score 750. For example, score 750 may be the maximum (or minimum) or arithmetic or geometric mean of scores 741-742.

9.0 Sequence Prediction Process

Figure 8:
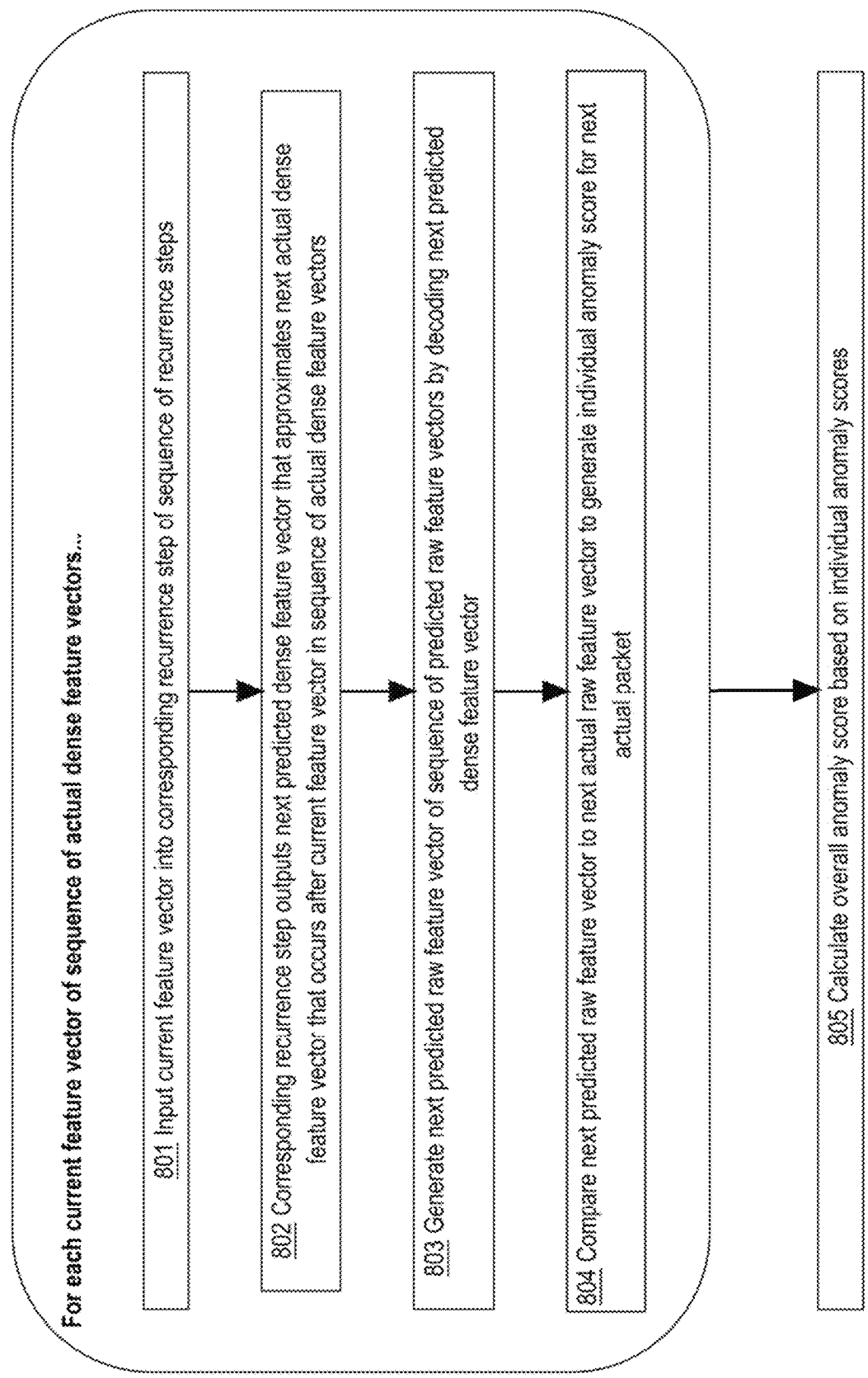
FIG. 8 is a flow diagram that depicts an example process for using a recurrent topology of an RNN to generate packet anomaly scores from which a flow anomaly score may be synthesized, in an embodiment.

FIG. 8 is a flow diagram that depicts computer 700 using a recurrent topology of an RNN to generate packet anomaly scores from which a flow anomaly score may be synthesized, in an embodiment. FIG. 8 is discussed with reference to FIG. 7.

Steps 801-804 are repeated for each feature vector of a sequence of actual dense feature vectors, such as actual sequence 710. Step 801 applies a current feature vector to a corresponding recurrence step of a sequence of recurrence steps. For example, observed features 711 is applied as stimulus input to recurrent step 721 of RNN 720. Because RNN 720 is stateful, recurrent steps 721-723 may receive their respective inputs at different times, such as sequentially and perhaps separated by various latencies.

In step 802, the corresponding recurrence step outputs a next predicted dense feature vector that approximates a next actual dense feature vector that occurs after the current feature vector in the sequence of actual dense feature vectors. In other words, RNN 720 predicts a next vector in a sequence, perhaps before the next vector is actually received. For example, recurrent step 721 generates predicted features 731 as an approximation of observed features 712 as expected, regardless of whether or not observed features 712 have actually yet been received.

An embodiment that compares an actual dense sequence to a predicted dense sequence may skip step 803, such as when sequences 710 and 730 are both dense. An embodiment (as shown in FIG. 8) that compares an actual raw/sparse sequence to a predicted raw/sparse sequence should not skip step 803, such as when sequences 710 and 730 are both raw/sparse. For example, what is shown as sequences 710 and 730 may each actually be a pair (not shown) of sequences, with one being raw/sparse and the other being dense, with one sequence of the pair being transcoded from the other sequence, as discussed elsewhere herein.

For example, RNN 720 may be the only component that accepts dense vectors as inputs and generates dense vectors as outputs. Whereas, the rest of computer 700 may expect raw/sparse vectors. Thus, step 803 generates a next predicted raw feature vector of the sequence of predicted raw feature vectors by decoding a next predicted dense feature vector. For example, decoding may occur between recurrent step 721 and predicted features 731. Likewise, encoding may occur between observed features 711 and recurrent step 721.

Step 804 compares the next predicted raw feature vector to a next actual raw feature vector to generate an individual anomaly score for a next actual packet. An embodiment might need to wait for the next actual raw feature vector to arrive before performing step 804. For example, predicted features 731 is compared to observed features 711 to generate packet anomaly score 741.

After step 804 is performed for each feature vector in a sequence, all of packet anomaly scores 741-742 for a given network flow have already been calculated. An embodiment may cease repeating steps 801-804 and skip step 805 if an individual score of packet anomaly scores 741-742 is excessive (i.e. clearly indicates an anomaly even though some of actual sequence 710 has not yet been received and/or some packet anomaly score(s) have not yet been calculated.

Step 805 calculates an overall anomaly score for the network flow based on the individual packet anomaly scores. For example, flow anomaly score 750 may be an arithmetic sum of packet anomaly scores 741-742. Although only two packet anomaly scores are shown, a flow may have many packets and packet scores.

If flow anomaly score 750 is incrementally calculated, such as when each packet anomaly score is calculated at different times, such as when packets arrive as a stream in real time and separated by various latencies, then an embodiment may maintain/update flow anomaly score 750 as a running total during a particular network flow. An embodiment may detect whether or not flow anomaly score 750 exceeds a threshold (not shown) during each update of flow anomaly score 750. Thus in an embodiment, actual sequence 710 may be detected as anomalous before all of actual sequence 710 has arrived.

10.0 Packet Anatomy

Figure 9:
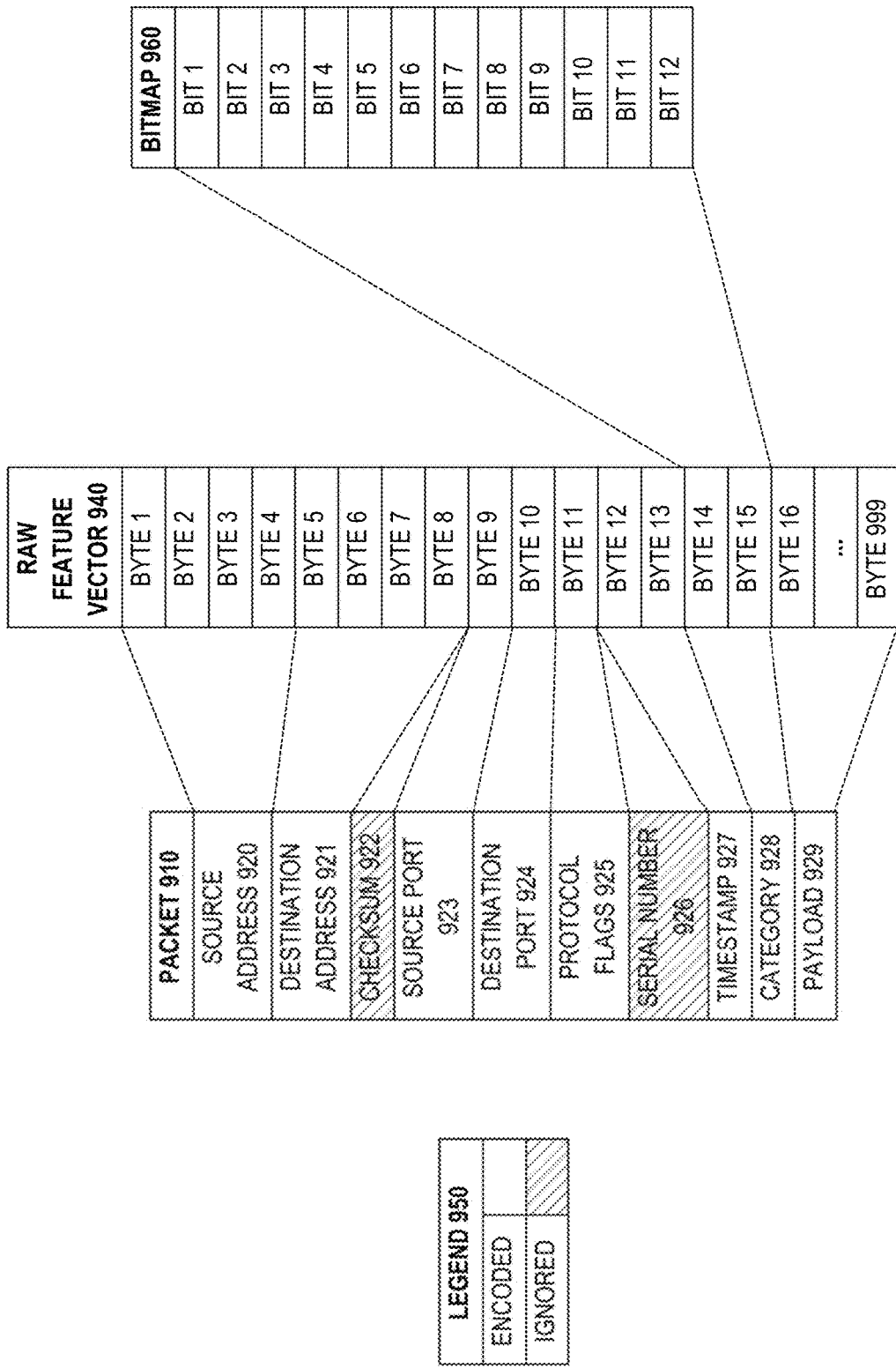
FIG. 9 is a block diagram that depicts an example computer that sparsely encodes features based on anatomy of a general packet of a given communication protocol, in an embodiment.

FIG. 9 is a block diagram that depicts an example computer 900, in an embodiment. Computer 900 sparsely encodes features based on anatomy of a general packet of a given communication protocol. Computer 900 may be an implementation of computer system 100.

Raw feature vector 940 is a more or less direct encoding of data from packet 910. Although shown as not conforming to any particular protocol, typically packet 910 is expected to conform to a given communication protocol. Various embodiments expect packet 910 to be a datagram of internet protocol (IP), transport control protocol (TCP), user datagram protocol (UDP), hypertext transfer protocol (HTTP), or simple network management protocol (SNMP).

In an embodiment not shown, raw feature vector 940 is populated by copying a single string of bits from packet 910. In an embodiment, the single string of copied bits begins at the first bit of packet 910. In an embodiment, raw feature vector 940 has a fixed size (i.e. amount of bits). In an embodiment, the single string of copied bits is padded or truncated to match the fixed size of raw feature vector 940.

In an embodiment that expects packets of a given protocol, packet 910 contains predefined fields, such as payload 929 and protocol metadata such as header fields 920-928. In an embodiment having a semantic mapping of features, particular fields of packet 910 are encoded into particular semantic features at particular offsets within raw feature vector 940.

Typically, a particular fixed subset of bits is reserved for each encoded feature in a raw/sparse feature vector. For example, packet 910 has destination address 921 as a packet header field that is directly copied into bytes 5-8 of sparse feature vector 940. In an embodiment, irrelevant fields are ignored (i.e. not encoded into raw feature vector 940) per legend 1950, such as checksum 922. Because of computer 900's ability to extract content from all of packet 910, as discrete fields or as a whole string of raw bytes, techniques presented herein can achieve, complement, or otherwise be used in conjunction with deep packet inspection, perhaps with port mirroring or cable splitting.

In an embodiment, a field of packet 910 is encoded into raw feature vector 940 according to a data conversion or data transformation instead of a direct copy, such as with numeric range normalization, such as a unit (i.e. 0-1) range, or a condensed year such as 1970 encoded as year zero. In an embodiment, packet 910 may contain categorical fields, such as 928, that have enumerated values. For example, category 928 may have a value range of string literals that may be encoded into raw feature vector 940 as dense integers or as sparse bitmaps, such as with one-hot encoding that reserves one bit per literal in the value range.

One-hot encoding is exemplified by bitmap 960 that encodes category 928 into bytes 14-15 of raw feature vector 940. For example if category 928 is a month and has a value of April (i.e. fourth month of year), then bit 4 of bitmap 960 is set and bits 1-3 and 5-12 are clear. A category that is naturally ordered (i.e. sortable), such as month on a calendar, should be encoded as an integer to preserve the ordering. For example, one of twelve months may be encoded as a nibble (i.e. 4-bit integer with 16 possible values). A category that is naturally unordered, such as colors of a palette, should be one-hot encoded.

10.1 Network Flow Demultiplexing

In an embodiment that untangles multiple interleaved network flows, a combination of header fields may identify a flow. For example, a flow may be identified by its pair of endpoints. For example, a combination of destination address 921 and destination port 924 may identify a destination endpoint, with other (e.g. similar) fields of packet 910 identifying a source endpoint. In an embodiment, endpoint identifiers are used by a transport layer of a network stack, such that the endpoint identifiers are unique within a network or internetwork. In an embodiment, packet header fields 920-921 and 923-924 identify link layer (i.e. current hop) endpoints. In an embodiment, packet header fields 920-921 and 923-924 identify transport layer endpoints that are original and final endpoints of a multi-hop (i.e. store and forward) route.

In an embodiment, a network flow is bidirectional between both endpoints, such that the packet sequences (not shown) and corresponding feature vector sequences that an RNN (not shown) consumes or emits for prediction include packets that flow in opposite directions, such as with network roundtrips, such as for request/response, such as for client/server, such as for HTTP, SSH, or telnet. An RNN, as stateful, well tolerates network latency that is inherent to roundtrips. Protocol metadata fields of a packet that may facilitate (e.g. bidirectional) flow demultiplexing include source IP address, destination IP address, source port, destination port, protocol flags, and/or timestamp.

11.0 Training

Figure 10:
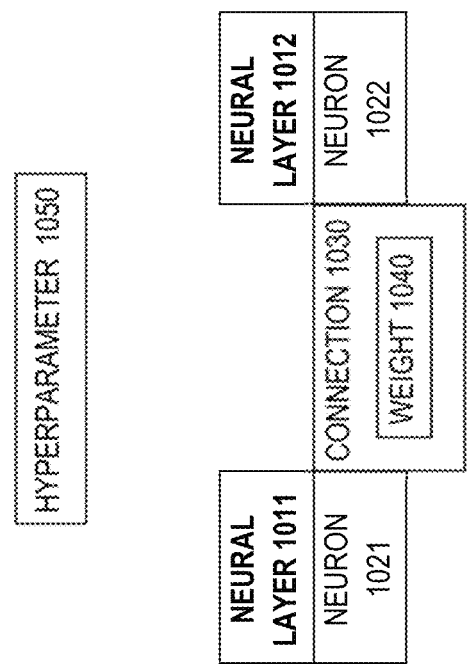
FIG. 10 is a block diagram that depicts an example RNN that is configured and trained by a computer, in an embodiment.

FIG. 10 is a block diagram that depicts an example RNN 1000, in an embodiment. RNN 1000 is configured and trained by a computer (not shown). RNN 1000 may be an implementation of RNN 170 of FIG. 1.

Prior to production deployment, RNN 1000 should be trained. RNN 1000 achieves deep learning with a stack of multiple neural layers, such as 1011-1012. Each neural layer contains many neurons. For example, neural layer 1011 contains neuron 1021. Although not shown, each neuron has an activation value that measures how excited (i.e. activated) is the neuron.

Adjacent layers are interconnected by many neural connections such as 1030. Each connection has a learned (i.e. during training) weight that indicates how important is the connection. For example, connection 1030 has weight 1040. Each connection unidirectionally conveys a numeric value from a neuron in one layer to a neuron in a next layer, based on the activation value of the source neuron and the weight of the connection.

For example, when the activation value of neuron 1021 is calculated, then connection 1030 scales that activation value according to weight 1040, and then delivers the scaled value to neuron 1022. Although not shown, adjacent layers are typically richly interconnected (e.g. fully connected) such that there are many connections into and out of each neuron, and a neuron's activation value is based on a summation of scaled values delivered to the neuron by connections that originate from neurons of the previous layer.

Configuration of RNN 1000 has two groups of attributes, which are weights such as 1040 and hyperparameters such as 1050. Weights are configured (i.e. learned) during training. Hyperparameters are configured before training. Examples of hyperparameters include a count of neural layers in RNN 1000, and a count of hidden units (i.e. neurons) per hidden (i.e. internal) layer. The size of RNN 1000 is proportional to the amount of layers or neurons in RNN 1000. Accuracy and training time are proportional to the size of RNN 1000.

RNN 1000 may have tens of hyperparameters, with each hyperparameters having few or millions of possible values, such that the combinatorics of hyperparameters and their values may be intractable. For example, optimizing hyperparameters for RNN 1000 may be nondeterministic polynomial (NP) hard, which is significant because suboptimal hyperparameter values may substantially increase training time or substantially decrease accuracy, and manual tuning of hyperparameters is a very slow process. Various third-party hyperparameter optimization libraries are available for hyperparameter auto-tuning, such as Bergstra's hyperopt for Python, with other libraries available from elsewhere for C++, Matlab, or Java.

During training, RNN 1000 is activated with sample network flows. Training need not be supervised, such as with some flows that are known to be anomalous and other flows that are known to be non-anomalous. Instead, training may be unsupervised, such that comparisons of a predicted next packet to an actual next packet of a flow is sufficient to calculate an error for training, even if it was never known whether or not the flow actually was anomalous. Errors during training cause connection weights, such as 1040, to be adjusted. Techniques for optimal adjustment include backpropagation and/or gradient descent, as discussed below in section "Deep Training Overview." The stateful (i.e. recurrent) topology of RNN 1000 may impede typical backpropagation, and specialized techniques such as backpropagation through time are better for training RNN 1000.

Training may finish when measured error falls below a threshold. After training, RNN 1000 may be more or less well represented essentially as a two dimensional matrix of learned connection weights. After training, RNN 1000 may be deployed into a production environment as part of a network anomaly detector, such as for intrusion detection.

12.0 Embedding Logged Features

As discussed above, network packet analysis provides a way to monitor computer system usage. However, network traffic does not encompass a full spectrum of computer system activities that may occur. For example, a computer virus may perform suspicious activities that are all local to an infected host computer and that do not emit network traffic. Whereas, the computer may record log messages that are various operational messages, such as diagnostic messages that are semantically rich, for forensics such as debugging and/or auditing of functions and/or security.

Each log message is a more or less detailed recording of a fine-grained computer activity amongst multiple activities that occurred to accomplish a coarse-grained action. For example, a shell command may perform a high level chore such as listing a filesystem directory. The listing command may retrieve metadata about each of multiple files in the directory and output each file's metadata on a separate line of text, which may be displayed in the command's display terminal.

Each line of text may be recorded as a log message. Log messages may be spooled (i.e. sequentially recorded) to a text file or stored as records in a relational database table. Log messages may be streamed, or buffered and flushed, to standard output (stdout) and thus are amenable to I/O redirection and/or interprocess pipes.

Figure 11:
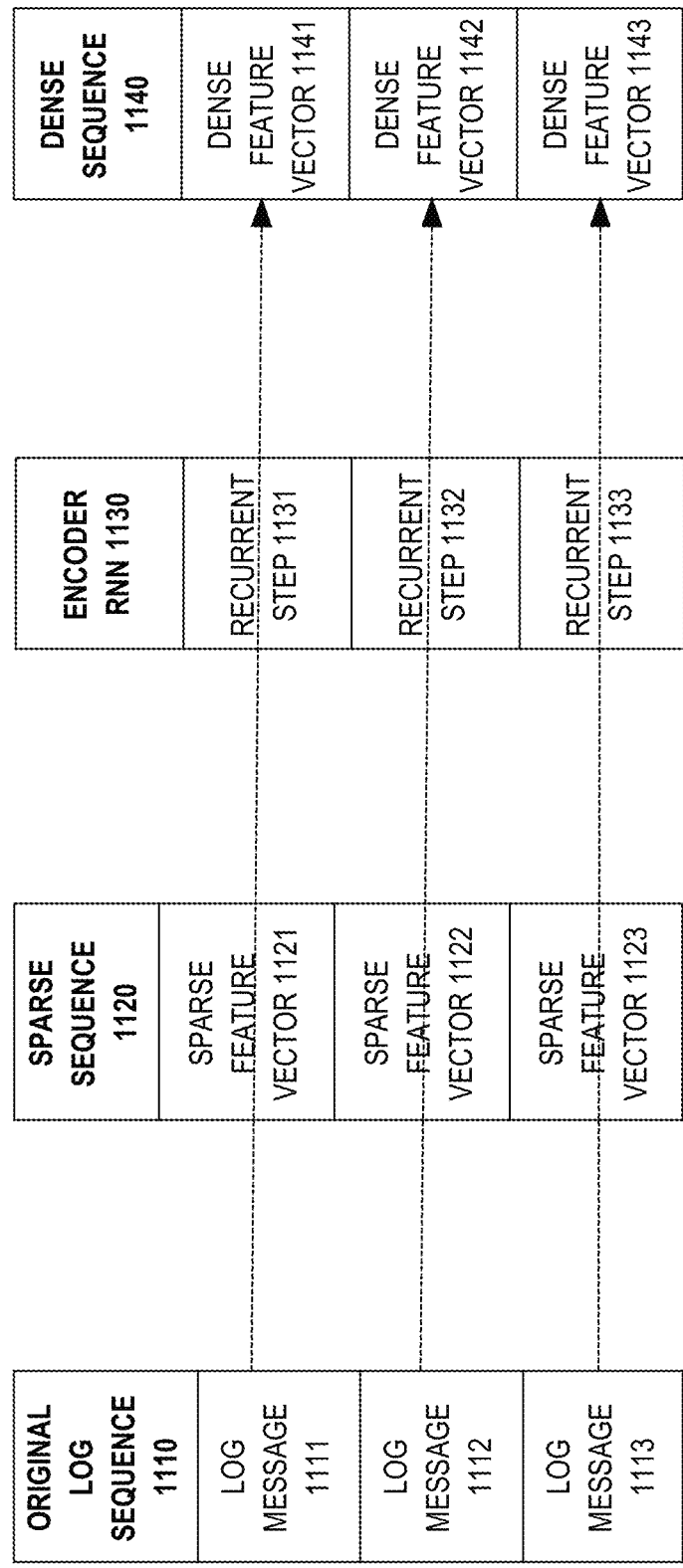
FIG. 11 is a block diagram that depicts an example computer that has an RNN that contextually transcodes sparse feature vectors that represent log messages into dense feature vectors that may be predictive or used to generate predictive vectors, in an embodiment.

FIG. 11 is a block diagram that depicts an example computer 1100, in an embodiment. Computer 1100 has an RNN that contextually transcodes sparse feature vectors that represent log messages into dense feature vectors that may be predictive or used to generate predictive vectors. Computer 1100 may be an implementation of computer 100.

FIG. 11 explores two additional concepts. First, is an insight that deep learning for dense feature encoding and prediction is applicable to console log messages instead of network packets. Second, is that transcoding from sparse vectors to dense vectors may include contextual state. Thus, dense encoding may be influenced by vector ordering and data dependencies between vectors, which was introduced earlier herein, and is discussed further as follows.

Computer 1100 processes log messages, such as 1111-1113, instead of network packets. Each log message is a more or less detailed recording of a fine-grained computer activity amongst multiple activities that occurred to accomplish a coarse-grained action. For example, a shell command may perform a high level chore such as listing a filesystem directory. The listing command may retrieve metadata about each of multiple files in the directory and output each file's metadata on a separate line of text, which may be displayed in the command's display terminal.

In some embodiments, each line of text may be recorded as a log message. In other embodiments, only the listing command is recorded as a log message, and the lines of text are not recorded. In an embodiment, log messages of original log sequence 1110 are spooled (i.e. sequentially recorded) to a text file. In an embodiment, log messages of original log sequence 1110 are stored as records in a relational database table. In an embodiment, original log sequence 1110 is flushed (i.e. streamed) to standard output (stdout) and amenable to I/O redirection and/or pipes.

Each horizontal dashed arrow depicts dataflow for one log message, as its data is transferred and transformed to achieve conversion from original log sequence 1110 into dense sequence 1140. The data of a log message may be dissected into features. For example, a log message may contain an identifier of a session or transaction, which may be one feature. As shown, first log message 1111 is encoded into sparse feature vector 1121 that is applied to recurrent step 1131 of encoder RNN 1130 that functions as a transcoder to generate dense feature vector 1141.

It is possible that log messages 1111-1112 are identical. Because sparse encoding is stateless (e.g. rule based), it does not matter that log message 1111 precedes log message 1112. Stateless sparse encoding causes identical messages to be identically sparse encoded, in which case, sparse feature vectors 1121-1122 would also be identical. For example, log message 1111 may be encoded as sparse feature vector 1121 by a neural encoder (not shown) that is not recurrent, such as with a feed forward MLP. In an embodiment, adjacent neural layers of the encoder MLP are fully connected.

However, transcoding from sparse sequence 1120 to dense sequence 1140 is stateful due to encoder RNN 1130. Thus, transcoding here is context sensitive because encoder RNN 1130 has stateful neural circuitry (e.g. LSTM), and because each recurrent step of encoder RNN 1130 cross activates the adjacent next recurrent step. For example, recurrent step 1132 receives activation from both of sparse feature vector 1122 and recurrent step 1131. In an embodiment, RNN 1130 has as many recurrent steps as there are log messages in a longest expected original log sequence 1110.

Results of contextual (i.e. stateful) transcoding may be counterintuitive. For example even though sparse feature vectors 1121-1122 may be identical, they may be transcoded differently. For example, their corresponding dense feature vectors 1141-1142 may differ.

Even if log messages 1111-1112 are almost identical instead of absolutely identical, dense sequence 1140 may still have a contextual encoding that other encoding techniques do not achieve. For example, log message 1111 may have default values (e.g. null, zero, negative one, empty string) for a few more features than does 1112. Important circumstantial (i.e. contextual) information may be encoded into dense sequence 1140, such as whether a log message comes before or after an almost identical message with more default values, or whether or not those two almost identical messages are adjacent or separated by other message(s).

Although not shown, dense sequence 1140 may be used as input into a predictive additional RNN (not shown) such as already discussed for earlier figures herein. That predictive additional RNN may achieve more accurate predictions than earlier examples herein, because the transcoded vectors of sequence 1140 are not only dense, but also contextual.

In an embodiment not shown, RNN 1130 is both the encoder RNN and the predictive RNN, and there is no additional RNN. For example with skew, dense vector 1141 may instead be a prediction of next log message 1112.

Original sequence 1110 is shown as composed of log messages. In an embodiment, original sequence 1110 instead contains network packets. The encoding, predicting, and anomaly detecting discussed herein is equally applicable to log messages and network packets. For example, sequence anomaly detection may be an important security technique in the separate practice domains of application logging and network communication.

13.0 Log Feature Embedding Process

Figure 12:
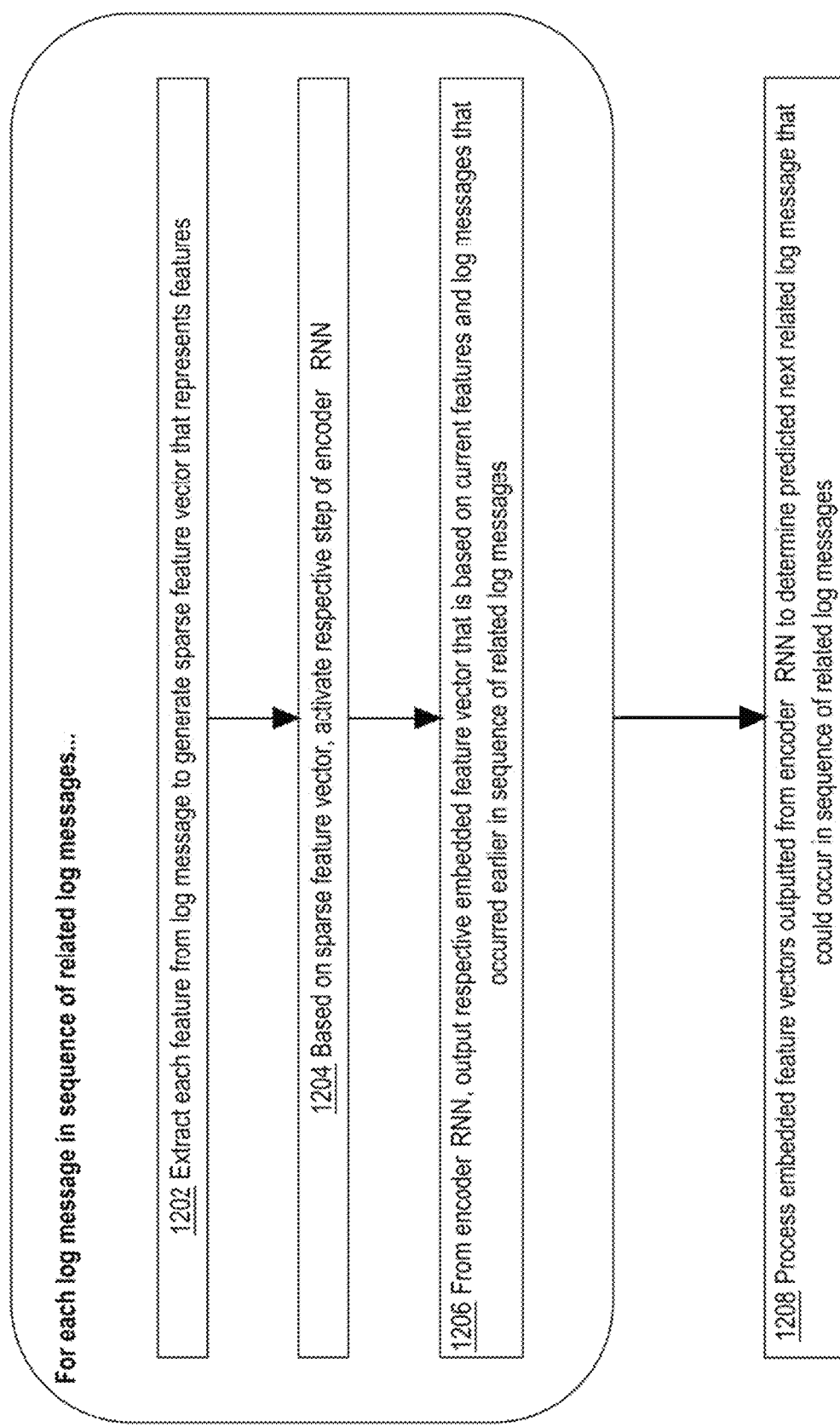
FIG. 12 is a flow diagram that depicts an example process for using an RNN to contextually transcode sparse feature vectors that represent log messages into dense feature vectors that are used to generate predictive vectors, in an embodiment.

FIG. 12 is a flow diagram that depicts computer 1100 using an RNN to contextually transcode sparse feature vectors that represent log messages into dense feature vectors that are used to generate predictive vectors, in an embodiment. FIG. 12 is discussed with reference to FIG. 11.

Steps 1202, 1204, and 1206 are repeated for each log message in a sequence of related log messages, such as original log sequence 1110. Step 1202 extracts each feature from a log message to generate a sparse feature vector that represents the features. For example, a third party log parser (not shown) such as Splunk, Scalyr, Loggly, or Microsoft Log Parser may extract raw values from each of log messages 1111-1113.

As discussed elsewhere herein, extracted features of a log message may be sparsely encoded into a sparse feature vector. For example, the features of log message 1111 are encoded into sparse feature vector 1121. Extracted categorical features may be one-hot encoded, such as discussed for FIG. 9.

Based on the sparse feature vector, step 1204 activates a respective step of an encoder RNN. For example, sparse feature vector 1121 is applied as stimulus input into recurrent step 1131 of encoder RNN 1130.

In step 1206, the encoder RNN outputs a respective embedded feature vector that is based on features of the current log message and log messages that occurred earlier in the sequence of related log messages. For example, recurrent step 1133 generates dense feature vector 1143 based on sparse feature vector 1123 as direct input to recurrent step 1133 and also based on cross activation by internal state from previous recurrent steps 1131-1132 that is based on previous sparse feature vectors 1121-1122. Thus, feature embedding into dense feature vector 1143 is contextually based on multiple log messages of original log sequence 1110.

After step 1206 is performed for each log message in original log sequence 1110, some of dense sequence 1140 has already been generated. Step 1208 may, in bulk or incrementally as already described elsewhere herein, process the dense/embedded feature vectors to determine a predicted next related log message that could occur in the sequence of related log messages. For example, dense sequence 1140 may be applied as stimulus input into a predictive RNN (not shown) to predict a next log message in the sequence. For example, dense feature vector 1141 may be applied to a first recurrent step of the predictive RNN to generate a next predicted dense feature vector (not shown) that is expected to match/approximate next dense feature vector 1142, which may be used to detect whether or not dense feature vector 1142 is contextually anomalous.

14.0 Contextual Encoding Implications

Figure 13:
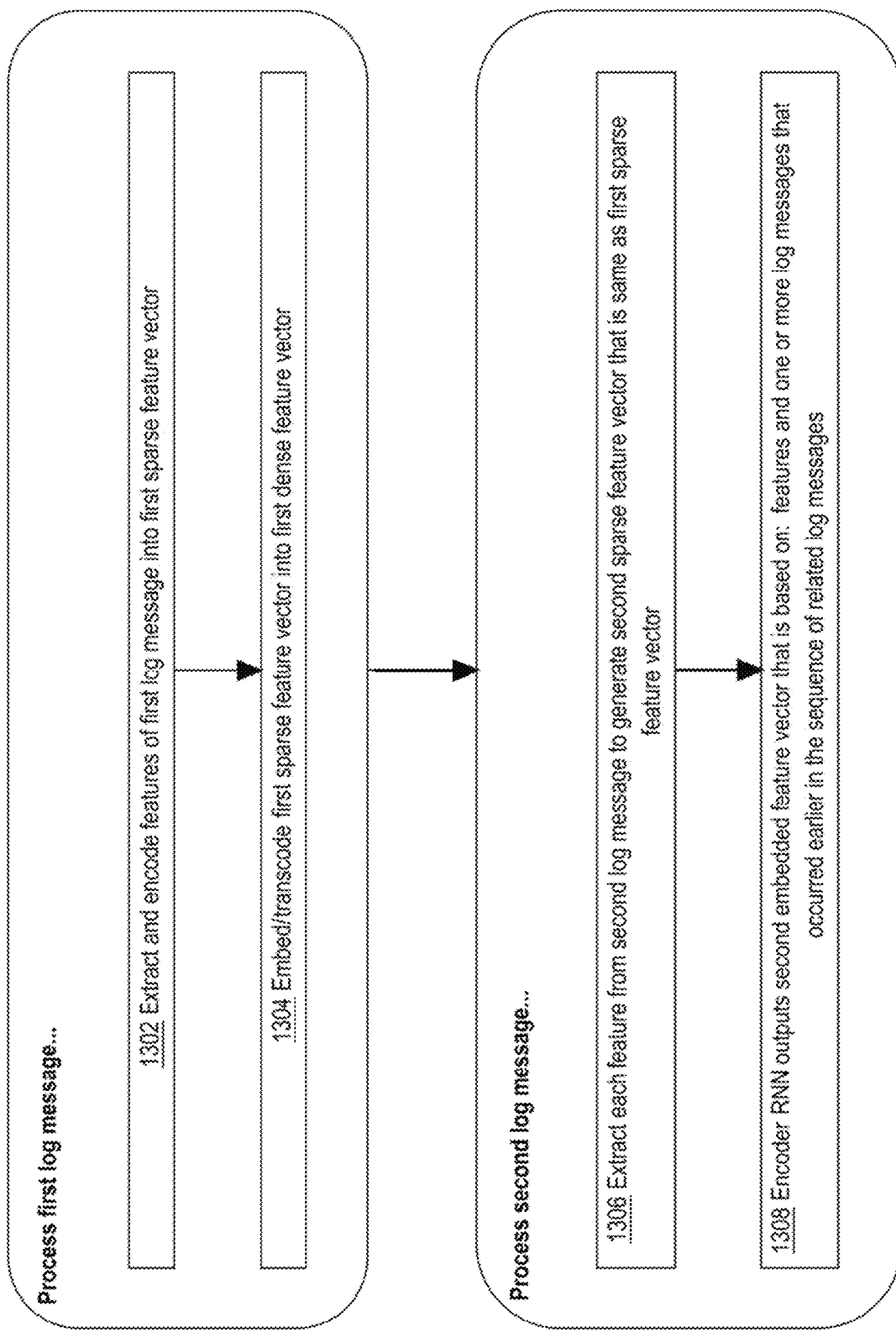
FIG. 13 is a flow diagram that depicts an example process for identical sparse feature vectors being densely encoded differently according to context, in an embodiment.

FIG. 13 is a flow diagram that depicts identical sparse feature vectors being densely encoded differently according to context, in an embodiment. FIG. 13 is discussed with reference to FIGS. 11-12.

FIG. 13 is an example of a particular scenario that is a specialization of the general scenario of FIG. 12. For example, a same process may perform the processing steps of FIGS. 12-13 for a same log message sequence.

Steps 1302 and 1304 process a first log message of a sequence. Steps 1306 and 1308 perform more or less the same processing of a second log message of the sequence. Thus steps 1202, 1204, and 1206 that are repeated (e.g. control loop) for each log message in FIG. 12 are instead shown as loop unrolled into separate steps for each of two adjacent log messages in FIG. 13.

In particular, step 1302 may be step 1202 for a first log message. Step 1304 may be steps 1204 and 1206 for the first log message. Step 1306 may again be step 1202 for a second log message. Step 1308 may again be steps 1204 and 1206 for the second log message.

The purpose of depicting the unrolled loop is to illustrate that more or less identical log messages may have different embeddings (i.e. contextual encodings) because they occur in different message sequences or different positions in a same sequence, perhaps adjacent to each other. Step 1302 extracts and encodes features of a first log message into a first sparse feature vector. For example, a parser may extract feature values from each of log messages 1111. The features of log message 1111 are encoded into sparse feature vector 1121.

Step 1304 embeds the first sparse feature vector into a first dense feature vector. Feature embedding is contextual, such that the message sequence and position within the sequence of a sparse feature vector affects the feature embedding. For example, how encoder RNN 1130 embeds sparse feature vector 1121 into dense feature vector 1141 depends on sparse feature vector 1121 being in sparse sequence 1120 and being the first vector in the sequence, in which case encoder RNN 1130 was recently reset and has not accumulated any internal state.

Step 1306 extracts each feature from a second log message to generate a second sparse feature vector. Because sparse encoding is not contextual, each log message may be sparse encoded in isolation (i.e. without regard to other log messages). For example, sparse encoding of log messages 1111-1112 independently occur. Because log message 1112 is the same as log message 1111 in this example, their sparse encodings are identical, even though log messages 1111-1112 were independently transcoded without awareness of each other. Thus, sparse feature vectors 1121-1122 are identical when log messages 1111-1112 are identical.

However, that identity is not present preserved with contextual encoding (i.e. feature embedding). In step 1308, the encoder RNN outputs a second embedded feature vector that is based on features and one or more log messages that occurred earlier in the sequence of related log messages. For example unlike log message 1111, log message 1112 is not first in a sequence, and encoder RNN 1130 has since accumulated some internal state that impacts feature embedding. Thus even though log messages 1111-1112 are identical and sparse feature vectors 1121-1122 are identical, dense feature vectors 1141-1142 are different.

15.0 Training Harness

Figure 14:
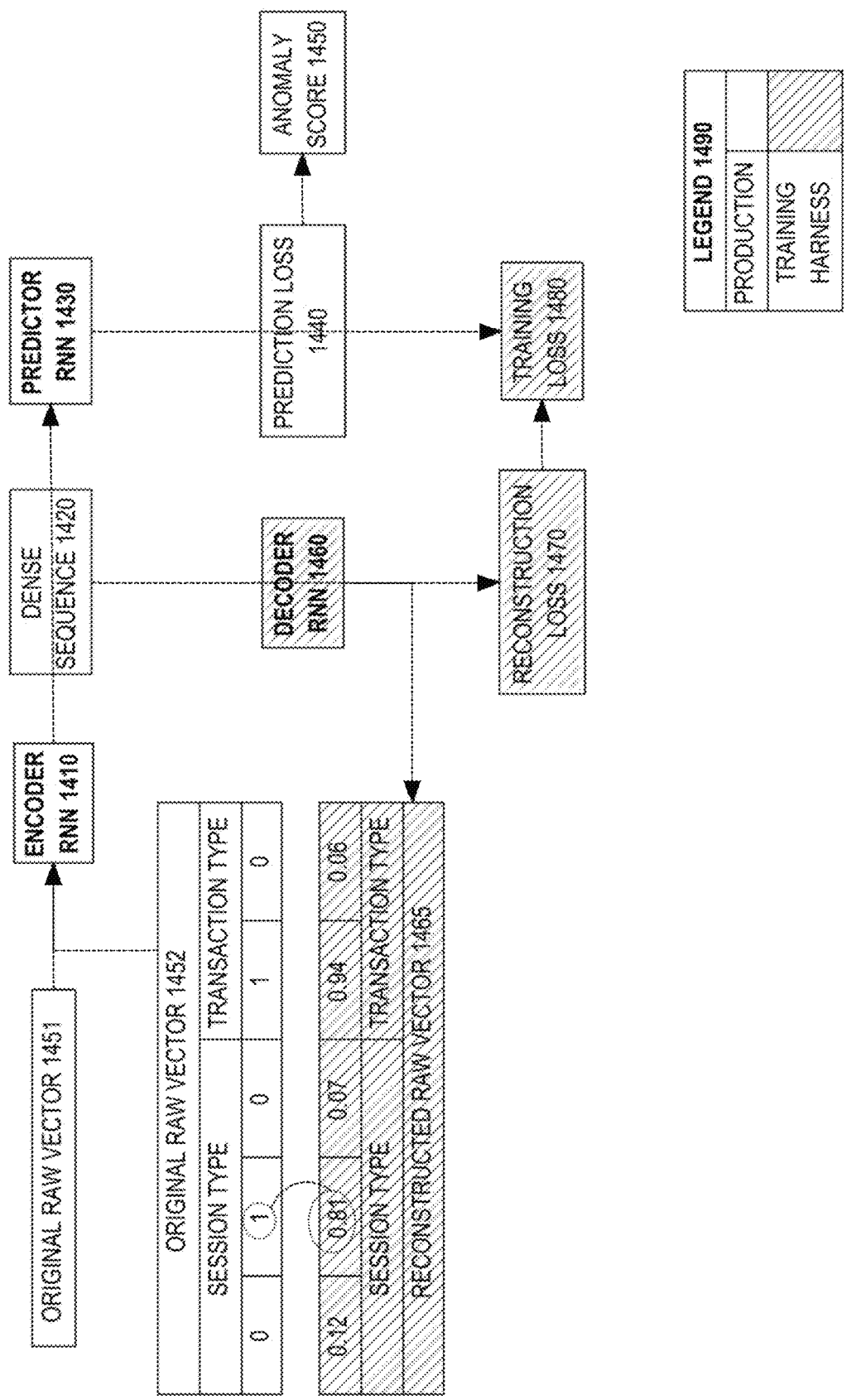
FIG. 14 is a block diagram that depicts an example computer that has a training harness to improve dense encoding, in an embodiment.

FIG. 14 is a block diagram that depicts an example computer 1400, in an embodiment. Computer 1400 has a training harness to improve dense encoding. Computer 1400 may be an implementation of computer 100.

As deployed in production, computer 1400 has a prediction pipeline (i.e. shown white boxes according to legend 1490) that more or less flows from left to right. That pipeline contains deep (i.e. many) trained layers of stacked RNNs 1410 and 1430 that respectively perform dense encoding and prediction to calculate anomaly score 1450. Encoder RNN 1410 may transcode sparse feature vectors (not shown) of log messages (not shown) into dense vectors (not shown) of dense sequence 1420 that is applied to predictor RNN 1430.

15.1 Decoding for Reconstruction

A potential impediment to training encoder RNN 1410 may be that backpropagation through time entails too many layers (RNNs 1410+1430) to make properly adjusted impressions. Training accuracy and acceleration, especially for encoder RNN 1410, may be increased with a training harness (i.e. shaded blocks) that contains decoder RNN 1460 that converts the dense vectors of dense sequence 1420 back into sparse vectors. The training harness need not be deployed into production.

Reconstructed raw (i.e. sparse) vectors, such as 1465, generated by decoder RNN 1460 may be compared to original raw vectors, such as 1451-1452, and consumed by encoder RNN 1410 to calculate reconstruction loss 1470 that measures the accuracy of RNN 1410 (and 1460). For example in the shown embodiment, original raw vector 1452 contains session type and transaction type as one-hot encoded categorical features. For example, session type is a categorical feature that has three mutually exclusive possible values of which, in original raw vector 1452 for example, the middle (shown circled) of the three values for session type is set.

15.2 Measured Error

During training, two pipelines (i.e. RNNs 1430 and 1460) consume dense sequence 1420. Each pipeline has its own error function, such that reconstruction loss 1470 measures encoding accuracy for a current log message, and prediction loss 1440 measures prediction accuracy for a next log message. Reconstruction loss 1470 may be calculated based on comparing original and reconstructed raw vectors for dense sequence 1420. For example, reconstructed raw vector 1465 may be compared to original raw vector 1452. In an embodiment, values within reconstructed raw vector 1465 are probabilistic, such that one original value of '1' is approximated by a probability approaching '1', such as '0.81' as shown in circles. Likewise, prediction loss 1440 may be calculated based on comparing original and predicted vectors for dense sequence 1420. Both or either of losses 1440 and 1470 may entail calculating and integrating (e.g. summing) individual losses of each vector in a sequence. For example, individual losses for raw/sparse or dense vectors may be measured by comparison between corresponding vectors of an original sequence versus a predicted sequence (not shown), such as discussed for FIG. 7.

Both of losses 1440 and 1470 may provide relevant feedback to the RNNs of the pipelines. In an embodiment, losses 1440 and 1470 are integrated into combined training loss 1480 that is used for backpropagation through a full stack of RNNs 1410, 1430, and 1460, which should increase the fitness of dense encoding for sequences such as 1420. Losses 1440 and 1470 may be summed or weighted averaged to calculate training loss 1480.

Anomaly score 1450 may indicate how strange (i.e. unexpected) is a given sequence of log messages, such as those from which dense sequence 1420 was generated. In production the training harness may be absent. Thus, anomaly score 1450 is based on prediction loss 1440. In an embodiment not shown, an individual message anomaly score is calculated for each actual log message of a sequence, and those scores are integrated (e.g. averaged) to calculate anomaly score 1450.

When anomaly score 1450 exceeds a threshold (not shown), an alert may be generated. For example, anomaly score 1450 may be used to detect and alert kinds of potential problems such as an online security intrusion, or an internet of things (IoT) fault. In the case of detecting an IoT fault, computer 1400 analyzes a central log of remote telemetry messages from potentially many IoT devices. Central logging may need untangling (i.e. demultiplexing) such that dense sequence 1420 contains feature vectors only for a particular IoT device. Dense sequence 1420 may be further limited to a particular subsequence of log messages, such as those that are related to a same (sub-)activity (e.g. trace), as discussed later herein.

16.0 Training with Reconstruction

Figure 15:
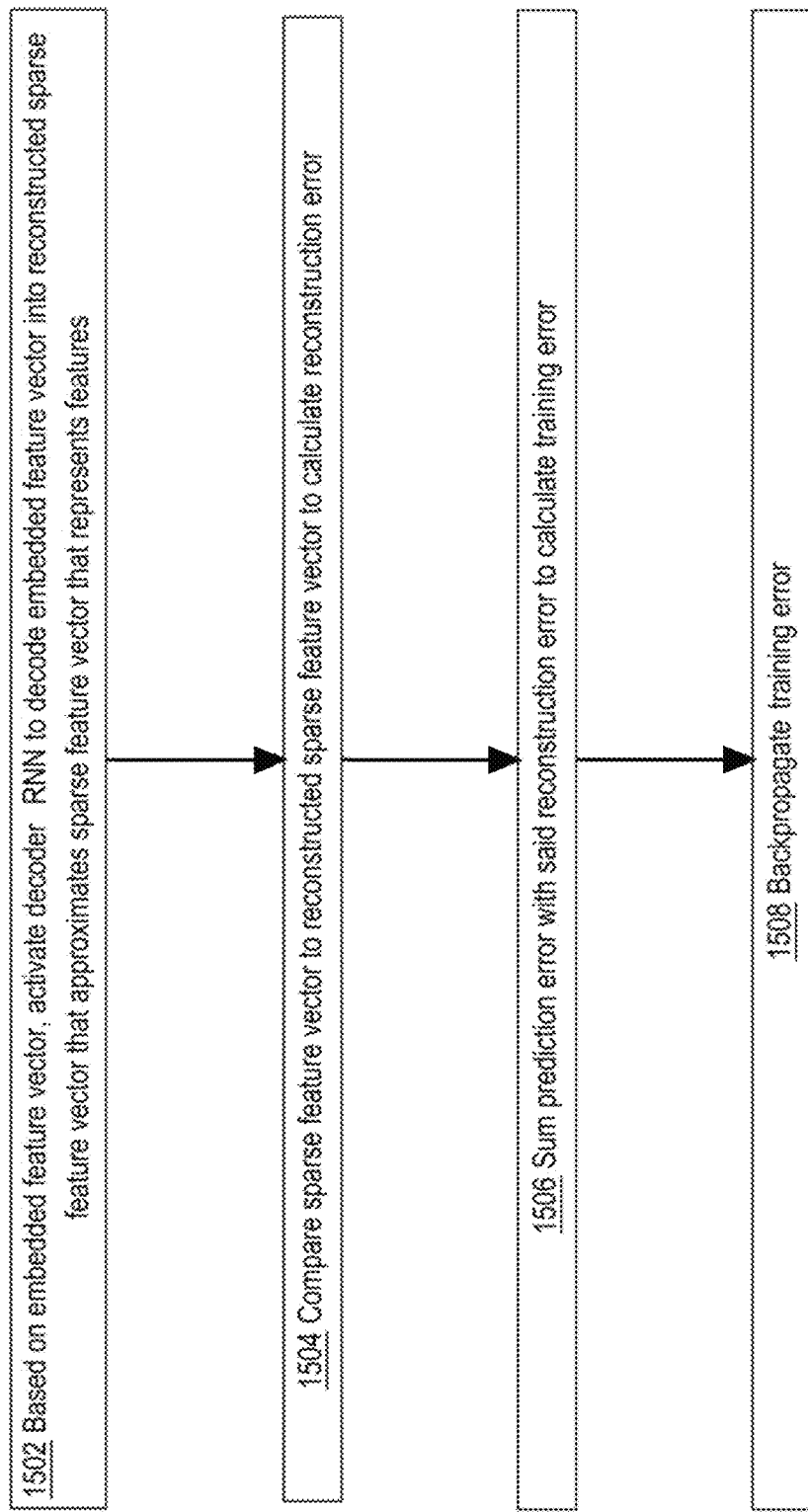
FIG. 15 is a flow diagram that depicts an example process for a training harness improving dense encoding, in an embodiment.

FIG. 15 is a flow diagram that depicts a training harness improving dense encoding, in an embodiment. FIG. 15 is discussed with reference to FIG. 14. FIG. 15 illustrates behaviors of training, some of which may or may not also occur in production. These behaviors include decoding, measuring reconstruction loss, and backpropagation.

Based on an embedded feature vector, step 1502 activates a decoder RNN to decode an embedded feature vector into a reconstructed sparse feature vector that approximates an original sparse feature vector that represents features of a log message. For example, dense sequence 1420 may have dense feature vectors as contextual embedding of log messages 1451-1452. Decoder RNN 1460 may decode the dense vectors of dense sequence 1420 back into reconstructed raw vectors such as 1465 that represents original raw vector 1452.

Step 1504 compares the original sparse feature vector to the reconstructed sparse feature vector to calculate a reconstruction loss. Ideally, the original and reconstructed sparse feature vectors are identical, in which case reconstruction loss 1479 is zero. For example, reconstruction loss 1470 may be a sum of absolute values of differences between corresponding numeric fields in the original and reconstructed sparse feature vectors.

Step 1506 sums a prediction error with the reconstruction error to calculate a training error. For example, predictor RNN 1430 may output a predicted sequence that differs from actual dense sequence 1420, which is measured as prediction loss 1440. Likewise, reconstruction loss 1470 is a comparable measurement of loss observed elsewhere within the neural topology for the same log message sequence. Losses 1440 and 1470 are arithmetically summed to calculate total training loss 1480 that indicates overall accuracy.

Step 1508 backpropagates the training error. Backpropagation through time may be used to penetrate deep neural layers to affect deep learning. In an embodiment, convergence is achieved and training ceases when training loss 1480 fall beneath a threshold or fails to improve (i.e. decline) by at least a threshold amount.

17.0 Activity Graph

Figure 16:
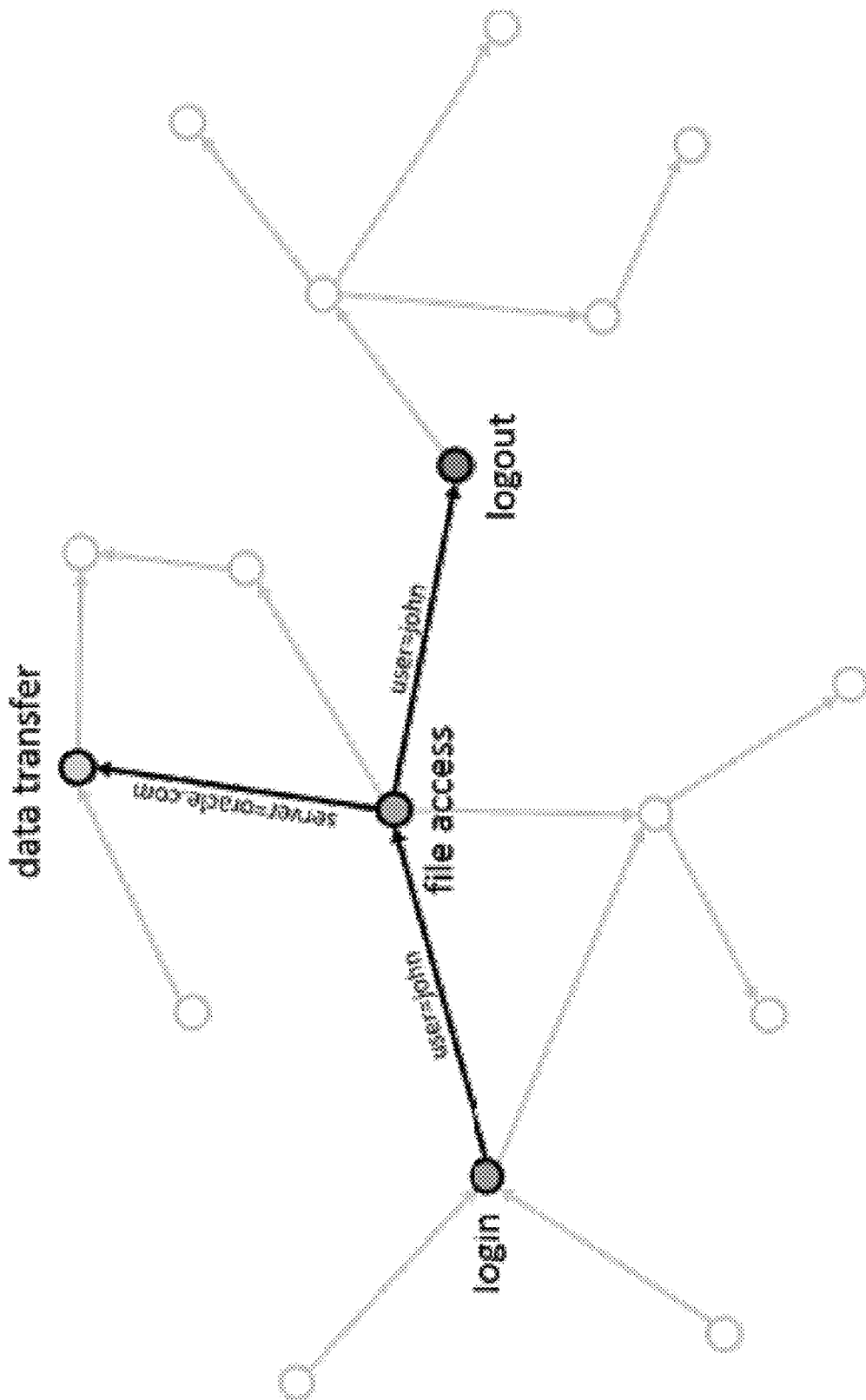
FIG. 16 is a diagram that depicts an example activity graph that represents computer system activities that occurred on one or more interoperating computers, in an embodiment.

FIG. 16 is a diagram that depicts an example activity graph 1600, in an embodiment. Activity graph 1600 represents computer system activities that occurred on one or more interoperating computers.

Each vertex in activity graph 1600 represents a log trace. A log trace is a closely related subsequence of log messages that were generated during and regarding a same action. For example, during an observed action, a flurry of log messages, may be appended to a message log, such as a console log file. A message log may be directly generated by a software application or delegated by the application to a structured logging framework such as system logger (syslog) or audit demon (auditd) for Unix.

For example, auditd may sometimes emit ten log messages for one login by a user, which may be one trace. Trace detection (i.e. forensically correlating multiple log messages into a single trace) is discussed and may be orthogonal concern to an activity graph later herein. For example, some embodiments may analyze activities, but not traces, or vice versa. In this example, each vertex in activity graph 1600 may represent multiple log messages, but only one log trace.

A logging framework may aggregate logs from multiple processes, applications, and/or computers. A logging framework may insert semantic features into log messages and suppress recording or adjust formatting of some messages according to a tunable verbosity, message features, or additional criteria. Some telemetry frameworks, such as Orbitz's Graphite, may function as a remote log spooling (i.e. telemetry and archiving) framework. A logging framework may provide more or less support for trace detection, such as with some form of explicit (e.g. text decoration) demarcation.

Each log message may contain values for multiple semantic features. Likewise, each log trace may contain values for multiple semantic features that may be extracted or otherwise derived from features of log messages of the trace. Traces may be interrelated according to coincidence of their feature value(s).

For example, traces may be interrelated, such as when a suspicious script performs a sequence of actions (i.e. traces) to achieve a malicious goal. Traces may be related by computer, network address such as IP address, session, transaction, connection, application, web browser, shell, login, account, principal, end user, or other abstraction of agency within a computer or computer network. Such agents may be generalized as network identities, each having a network identifier, which may be used to coalesce related log messages into log traces, as discussed later herein.

As shown, a connection between two vertices (i.e. traces) represents that the two traces are related, such as by coincidence of feature values. As shown, a connection may be labelled to reveal which coincident feature(s) underlie the connection and what value is coincidental. For example, the login, file access, and logout vertices of activity graph 1600 are interconnected by edges (i.e. connections) that coincide on (i.e. are related by) a same user, John, as a same value for a same feature. Whereas, the file access and data transfer vertices are related by a different kind of feature.

Indeed, with verbosely decorated log messages that bear many features, traces may become intricately interrelated, such that the traces together form an activity graph 1600 that is more or less connected. Edges between traces provide rich topological context that may be exploited to achieve a contextual feature encoding of each trace from activity graph 1600. For example, a login by itself might not be suspicious, in which case any feature vector that encodes the login also would not be suspicious in isolation. However, a login within the context of some pattern of related traces may actually be suspicious (i.e. anomalous).

A potential problem is that many edges may be more or less contextually irrelevant, despite topological connectivity. For example, given a particular vertex such as the file access trace (shown in center of activity graph 1600), much or most (i.e. the unlabeled edges and vertices) of activity graph 1600 is more or less irrelevant (i.e. noise). What is actually relevant (with regards to the file access trace) is only the subgraph of labeled edges and vertices. Thus, the file access trace may be embedded into a highly relevant subgraph, which is the essence of graph embedding as a preface to contextual encoding of features (e.g. of traces).

Defining the extent of the relevant subgraph may entail drastically pruning activity graph 1600 by selecting edges that satisfy relevance criteria, such as bearing particular features and/or values. Another relevance criterion may entail a traversal horizon (i.e. a maximum radius of traversal paths of multiple edges that starts at the file access vertex).

18.0 Graph Embedding

Figure 17:
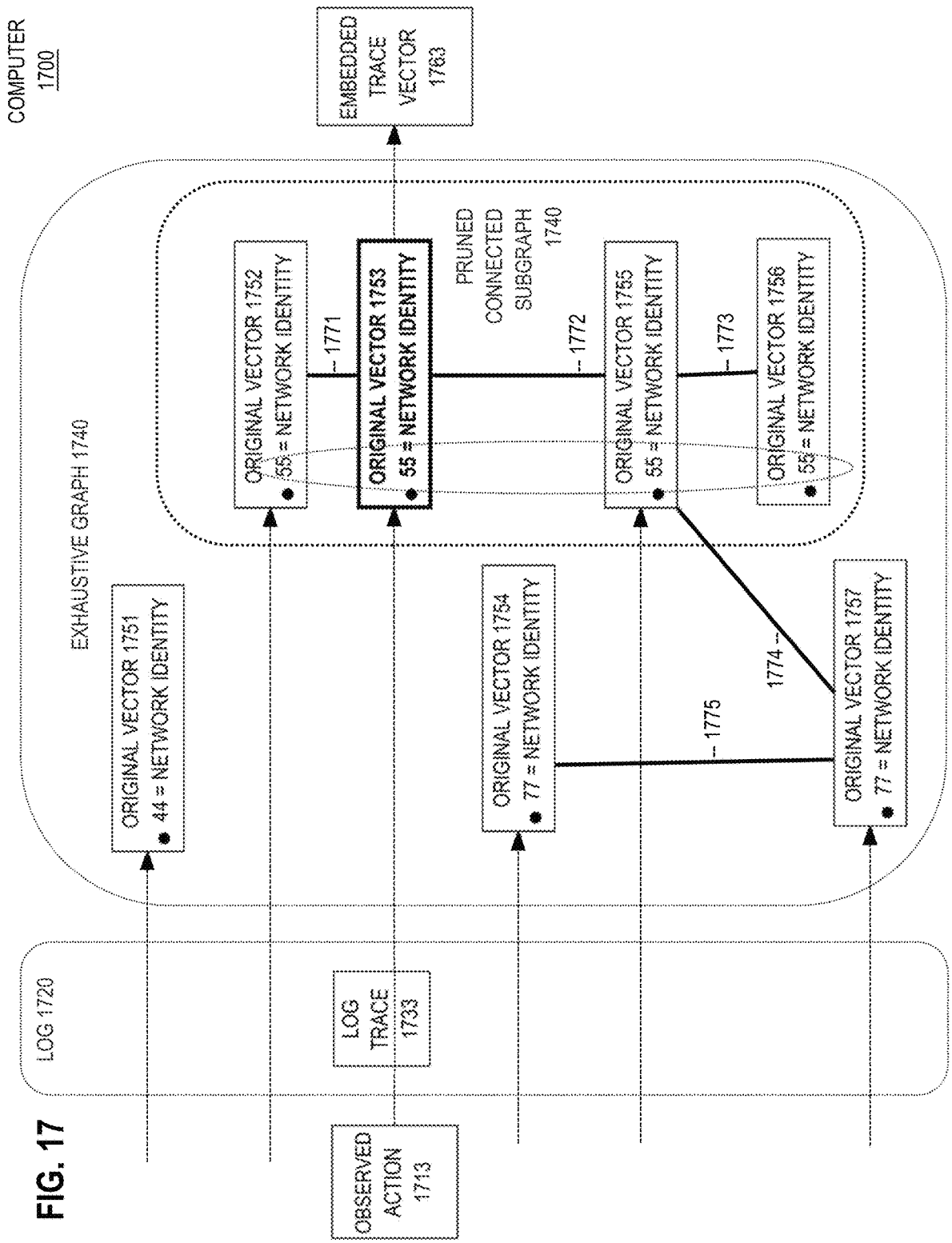
FIG. 17 is a block diagram that depicts an example computer that uses graph embedding to improve feature embedding of log traces, in an embodiment.

FIG. 17 is a block diagram that depicts an example computer 1700, in an embodiment. Computer 1700 uses graph embedding to improve feature embedding of log traces. Computer 1700 may be an implementation of computer 100.

A log trace is a closely related subsequence of log messages that were generated during a same action. For example, during observed action 1713 a flurry of log messages, shown as log trace 1733, were appended to log 1720 that may be a console log file.

Every log trace in log 1720 may be sparsely or densely encoded as an original trace feature vector, such as 1751-1757. Each original vector 1751-1757 contains encoded values of features, such as network identity. Trace 1733 represents log messages for one activity. The horizontal arrow that passes through log trace 1733 depicts data flow, including transformations and transfers, from trace 1733 to original vector 1753 to embedded trace vector 1763, all of which represent recordings or encodings of observed action 1713.

Parallel to the horizontal arrow through trace 1733 are other horizontal arrows that represent somewhat similar data flows by other log traces. Even though not shown, each horizontal arrow has its own observed action that causes its own log trace in log 1720. Thus, log 1720 has many traces, each possibly having multiple log messages. Depending on the embodiment, and although log 1720 is shown as containing discrete traces (e.g. 1733), log 1720 may instead contain only log messages from which traces must be inferred. Trace detection is further discussed later herein.

A suspicious process, script, or interactive session may perform many activities, such as 1713, that are more or less related. Related traces may be recognized when their values for a same feature or set of features match. For example, original vectors 1752-1753 and 1755-1756 are related because they have 55 as a same network identity. For example, network identity may include field(s) such as: a user name, a computer hostname, an internet protocol (IP) address, or an identifier of a session or a transaction.

Each original vector 1751-1757 may be a vertex in exhaustive logical graph 1740 that may or may not be actually constructed (e.g. in RAM of computer 1700). Related original vectors are shown as connected by an edge. For example, edge 1771 connects original vectors 1752-1753 that are related by a same network identity, 55. Original vectors may be related by other kinds of features. For example, edge 1774 connects original vector 1755 and 1757 that are related by a feature (not shown) that is not network identity.

18.1 Pruning

Graph embedding is the construction of subgraph 1740 as context for a given trace, such as represented by original vector 1753. Subgraph 1740 is connected, such that all vertices 1752-1753 and 1755-1756 are directly or indirectly (i.e. by multi-edge path) reachable from each other. Although not necessarily fully connected (i.e. all vertices of subgraph 1740 may be immediate neighbors of each other), connected means that all vertices of subgraph 1740 have some traversal path to a vertex of current focus (i.e. the vertex currently being contextually encoded), such as 1753. Graph embedding and trace detection may be orthogonal concerns. Some embodiments may perform trace detection without graph embedding or vice versa.

Subgraph 1740 is pruned, such that edges that do not satisfy trace detection criteria are excluded from subgraph 1740. For example, original vectors 1755 and 1757 share a same trace feature value that does not satisfy trace detection criteria, such that edge 1774 is excluded (i.e. pruned) from subgraph 1740. An identifier or other value may be too common to be useful. For example, the same trace feature value may be a very common value that occurs in many (e.g. most) traces, which would define a subgraph that is (e.g. nearly) as big as exhaustive graph 1740, which is too big to be relevant to contextual encoding. In an embodiment, common identifiers are excluded from causing edges.

18.2 Log Trace

Although not shown, a trainable algorithm (e.g. deep learning algorithm, such as an RNN or an unsupervised artificial neural network) may contextually encode original trace vector 1753 into embedded trace vector 1763 based also on original vectors 1752 and 1755-1756 of traces that occur in subgraph 1740 (i.e. traces related to trace 1733). For example, each of original vectors 1752-1753 and 1755-1756 may be applied to a respective step of the RNN to cause the RNN to generate embedded trace vector 1763.

Traces within log 1720 may overlap, such as when their constituent log messages are interleaved. Interleaving typically arises from concurrency, such as from multithreading, symmetric or other multiprocessing (SMP) such as multicore, or distributed computers streaming log messages to a same consolidated (i.e. aggregated) log 1720. Thus, trace detection may entail untangling (i.e. demultiplexing) log messages into separate traces.

A consequence of overlapping traces is that multiple traces may be ongoing (e.g. live) at a same point within log 1720. Thus, logic for trace detection should either detect multiple traces, or have multiple concurrent trace detection logic instances (e.g. compute threads) that each detect a different trace. For example, subgraph 1740 may be one of multiple subgraphs being constructed and/or processed at a same time from graph 1740.

In an embodiment, a log message may only be part of one trace, and subgraphs do not overlap (i.e. share some vertices/traces). In such an embodiment, each step (i.e. fold) of the context encoder RNN (not shown) may generate a separate embedded trace vector for each respective original vector in the subgraph. For example, the RNN not only generates embedded trace vector 1763 from subgraph 1740, but also concurrently generates separate embedded trace vectors for respective original vectors 1752 and 1755-1756 from respective steps of the RNN.

In an embodiment, computer 1700 uses a third party Python tool for graph embedding (i.e. subgraph definition and contextual feature encoding) such as DeepWalk, Node2Vec, or GraphSAGE for TensorFlow. DeepWalk horizontally scales. TensorFlow can accelerate with GPUs and is also available in JavaScript for deployment in web pages.

19.0 Graph Embedding Process

Figure 18:
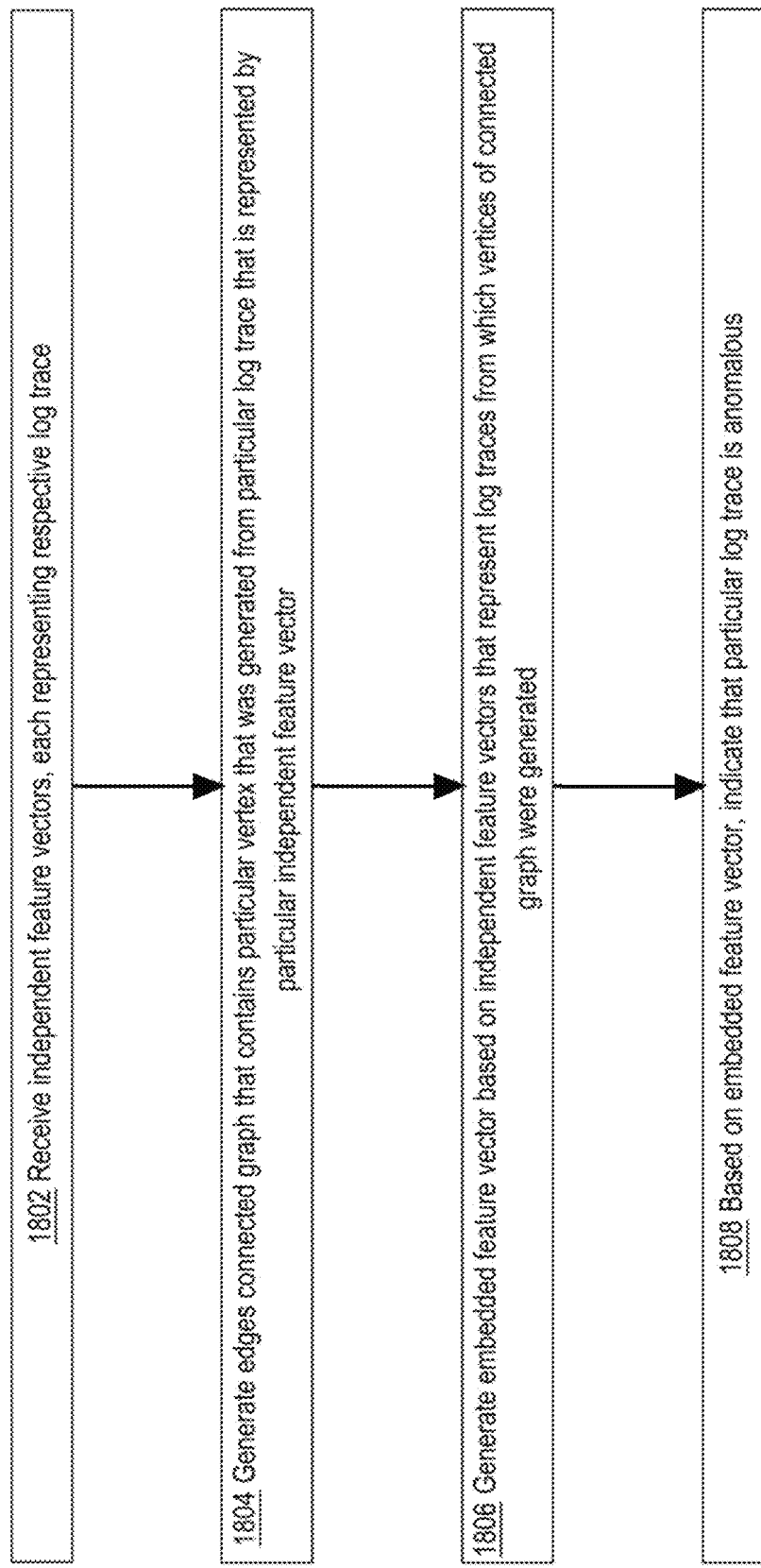
FIG. 18 is a flow diagram that depicts an example process for graph embedding to improve feature embedding of log traces, in an embodiment.

FIG. 18 is a flow diagram that depicts graph embedding to improve feature embedding of log traces, in an embodiment. FIG. 18 is discussed with reference to FIG. 17.

Step 1802 receives independent feature vectors, each representing a respective log trace. For example, log 1720 has traces, such as 1733, that are encoded into original feature vectors 1751-1757. In an embodiment, original feature vectors 1751-1757 are sparsely encoded, which maintains discrete fields (i.e. features) so that original vectors may be related according to a matching value of a particular field.

Step 1804 generates edges of a connected graph that contains a particular vertex that was generated from a particular log trace that is represented by a particular independent feature vector. For example, original vector 1753 may be a feature vector that is the current focus of graph embedding. Other original vectors may be directly or indirectly related to original vector 1753 according to matching values of particular field(s).

Filtration criteria may specify which fields should match for inclusion of original vectors in pruned connected subgraph 1740. For example, edges 1771-1773 that define pruned connected subgraph 1740 may be created based on matching according to filtration criteria. Thus, pruned connected subgraph 1740 is a graph embedding of original vector 1753.

Step 1806 generates an embedded feature vector based on the independent feature vectors that represent the log traces from which vertices of the connected graph were generated. For example, original vector 1753 may be transcoded into embedded trace vector 1763 based on pruned connected subgraph 1740. Thus, embedded trace vector 1763 is a graph embedding (i.e. contextual encoding) and dense transcoding of original vector 1753.

Thus, embedded trace vector 1763 likely contains more information than original vector 1753, and certainly more relevant information. For example, extra information (i.e. context) in embedded trace vector 1763 that is not in original vector 1753 may make the difference between an accurate alert and a false negative. Contextual relevance may be maximized by embedding by a trained graph embedder (not shown), such as an MLP or RNN as discussed herein.

Step 1808 depicts possible further processing after graph embedding. Embodiments not shown may instead perform alternate processing at step 1808. Based on the embedded feature vector, step 1808 indicates that the particular log trace is anomalous.

For example, computer 1700 may generate other pruned connected subgraphs, besides 1740, as graph embeddings of other subsets of traces from log 1720. Sequences of these graph embeddings may activate a predictive RNN (not shown) that outputs a predicted sequence that can be compared to an original sequence to detect an anomaly. Multiple pruned connected subgraphs of log 1720, such as subgraph 1740, may overlap such that they share vertices (original vectors).

In an embodiment, each original vector within pruned connected subgraph 1740 is a central vertex within a respective separate subgraph. For example, original vector 1752 may be the central vertex of a different pruned connected subgraph (not shown) that somewhat overlaps subgraph 1740.

In an embodiment, pruned connected subgraphs do not overlap, and each original vector occurs in exactly one pruned connected subgraph. For example, each of original vectors 1752-1753 and 1755-1756 occur only in pruned connected subgraph 1740. Pruned connected subgraph 1740 may operate as a graph embedding for all of original vectors 1752-1753 and 1755-1756, in which case, additional embedded trace vectors (not shown), besides embedded trace vector 1763, are generated from pruned connected subgraph 1740.

20.0 Trace Aggregation

Figure 19:
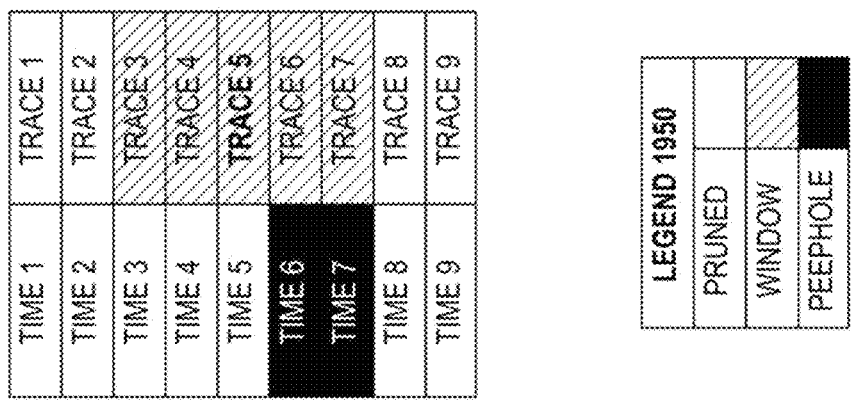
FIG. 19 is a block diagram that depicts an example log that contains related traces from which temporally pruned subgraphs may be created, in an embodiment.

FIG. 19 is a block diagram that depicts an example log 1900, in an embodiment. A computer creates temporally pruned subgraphs from related traces in log 1900. Although log 1900 is shown as storing traces 1-9, temporal pruning techniques described herein for FIG. 19 may be applied to sequences of log messages or network packets, instead of traces.

Graph pruning aims to increase feature relevance by narrowing the context (i.e. related traces) of a trace to include only semantically close traces (i.e. subgraph). Besides pruning content (i.e. semantics), a subgraph may be temporally pruned. For example, traces 1-9 may be time series events, such that contents of log 1900 are temporally sorted (e.g. naturally as spooled), such that contents of log 1900 may be sequenced along a timeline in the shown ordering of traces 1-9.

For example, trace 1 occurs first, and trace 9 occurs last. In an embodiment, a trace may have a timestamp, such as time 1-9, such as a timestamp of a first or last log message (not shown) of each trace. As shown, traces 1-9 are ordered, but not necessarily equally spaced in time. For example, the duration between times 1-2 may differ from the duration between times 2-3. For example, times 1-2 may occur at a same time.

A temporal window of a fixed amount of time or traces may be imposed during subgraph pruning. For example according to legend 1950, only traces 3-7 are currently considered for inclusion in a same subgraph. Each subgraph may have its own temporal window.

In the shown embodiment, if trace 3 is recognized as starting a new subgraph (e.g. when trace 3 is received), and all temporal windows are sized to include five units of time or traces, then the subgraph's window is created to encompass times 3-7 or traces 3-7. In an embodiment, the temporal window spans at least a full day, which may be resource intensive because the temporal window may also more or less operate as a retention window for buffering live traces and/or log messages.

In an embodiment having a temporal window measured in traces instead of time, the maximum amount of traces in a subgraph does not exceed the size of the window. No matter how a window is measured, trace feature semantics may provide additional subgraph inclusion criteria, such that only some of traces 3-7 in the subgraph's window qualify to actually be included in the subgraph (not shown).

In a different embodiment (also shown), a temporal window may stretch (i.e. expand in time or traces) to accommodate larger subgraphs. According to legend 1950, the window may be a small peephole at the end of the subgraph so far, such that the peephole slides (i.e. shifts) whenever another trace is added to the subgraph, which is similar to max_gap as described later herein. For example as shown, trace 5 may be received, and the peephole that is two units of time or traces in size covers traces 6-7 that should occur next after trace 5 and that might not yet have been received.

For example (not shown), if trace 6 is received and satisfies semantic criteria to be included in a same subgraph as trace 5, then 2-unit window may slide from time/traces 6-7 to time/traces 7-8. If the sliding window elapses (i.e. without any of its covered trace(s) qualifying for subgraph inclusion), then population of the current subgraph closes (i.e. completes), and the traces currently covered by the window are included in other subgraph(s).

21.0 Trainable Anomaly Detection

Figure 20:
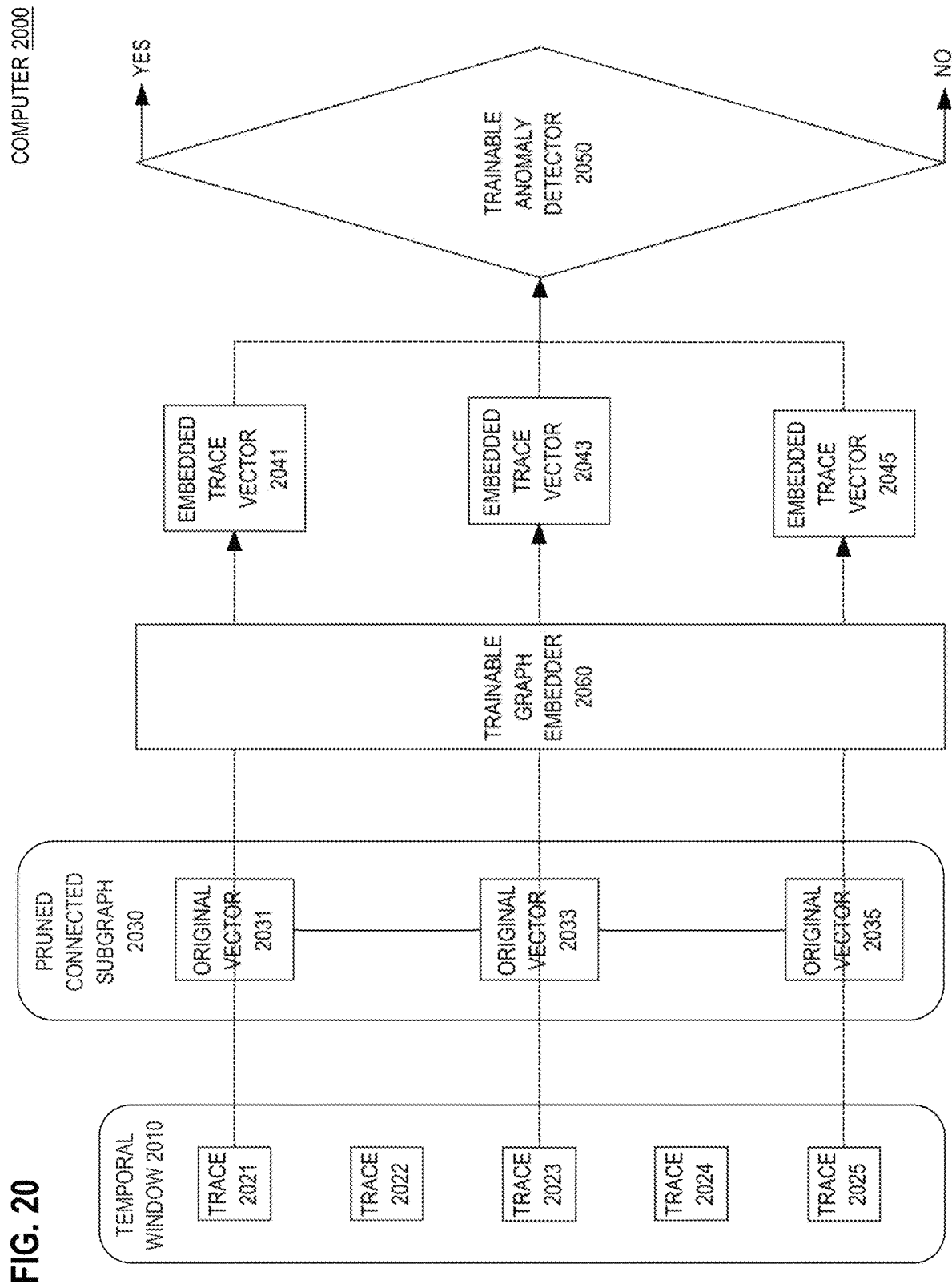
FIG. 20 is a block diagram that depicts an example computer that has a trainable graph embedder, which generates contextual feature vectors, and a trainable anomaly detector that consumes the contextual feature vectors, in an embodiment.

FIG. 20 is a block diagram that depicts an example computer 2000, in an embodiment. Computer 2000 has a trainable graph embedder, which generates contextual feature vectors, and a trainable anomaly detector that consumes the contextual feature vectors. Computer 2000 may be an implementation of computer 1700. Although temporal window 2010 shows traces 2021-2025, anomaly detection techniques described herein for FIG. 20 may be applied to sequences of log messages or network packets, instead of traces.

A subset of traces 2021-2025 in temporal window 2010 satisfy semantic relevance criteria, including traces 2021, 2023, and 2025 that are initially encoded as respective original vectors 2031, 2033, and 2035 that trainable graph embedder 2060 transcodes into respective embedded trace vectors 2041, 2043, and 2045. Trainable graph embedder 2060 may comprise a deep learning algorithm, such as an RNN or an unsupervised artificial neural network, such as discussed for FIG. 17.

Trainable anomaly detector 2050 learns how to decide, yes or no as shown, whether a sequence of embedded trace vectors 2041, 2043, and 2045 is anomalous. Depending on the embodiment, embedded trace vectors 2041, 2043, and 2045 are incrementally (i.e. sequentially) or, more or less, simultaneously applied to trainable anomaly detector 2050. For example, embedded trace vectors 2041, 2043, and 2045 may be concatenated to create a combined feature vector that is applied to trainable anomaly detector 2050.

In an embodiment, trainable anomaly detector 2050 comprises at least one non-neural algorithm of: principle component analysis (PCA), isolation forest (iForest), or one-class support vector machine (OCSVM). PCA is popular for its ease of configuration and use and its predictable (i.e. stable) performance. iForest operates efficiently with optimized computation based on subsampling and avoidance of computationally expensive mathematics such as distance or density. OCSVM is fast, tolerates noise, and has unsupervised training. Example neural and non-neural implementations based on trainable artificial intelligence (AI) are discussed below in section "Machine Learning Overview."

Trainable anomaly detector 2050 may comprise a deep learning algorithm, such as an RNN or an unsupervised artificial neural network, such as discussed for FIG. 17. In an embodiment, trainable anomaly detector 2050 is an autoencoder with unsupervised training, as discussed for FIG. 3.

22.0 Trace Composition

Figure 21:
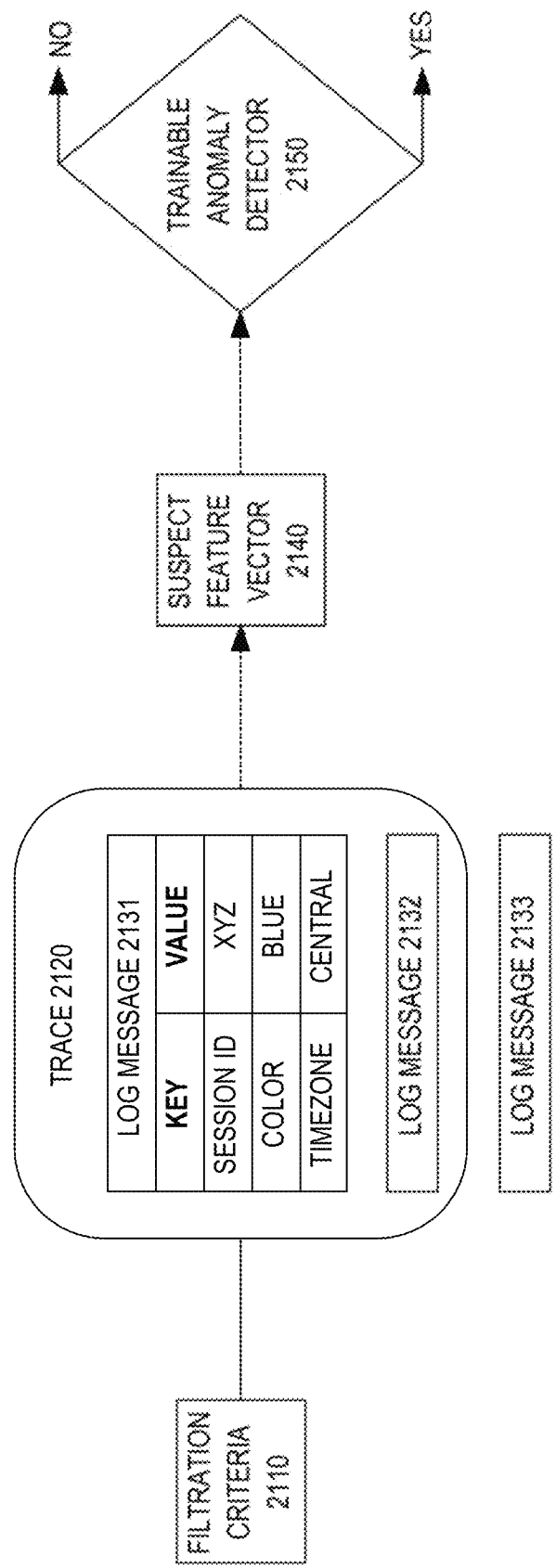
FIG. 21 is a block diagram that depicts an example computer that detects and feature-encodes independent traces from related log messages, in an embodiment.
Figure 22:
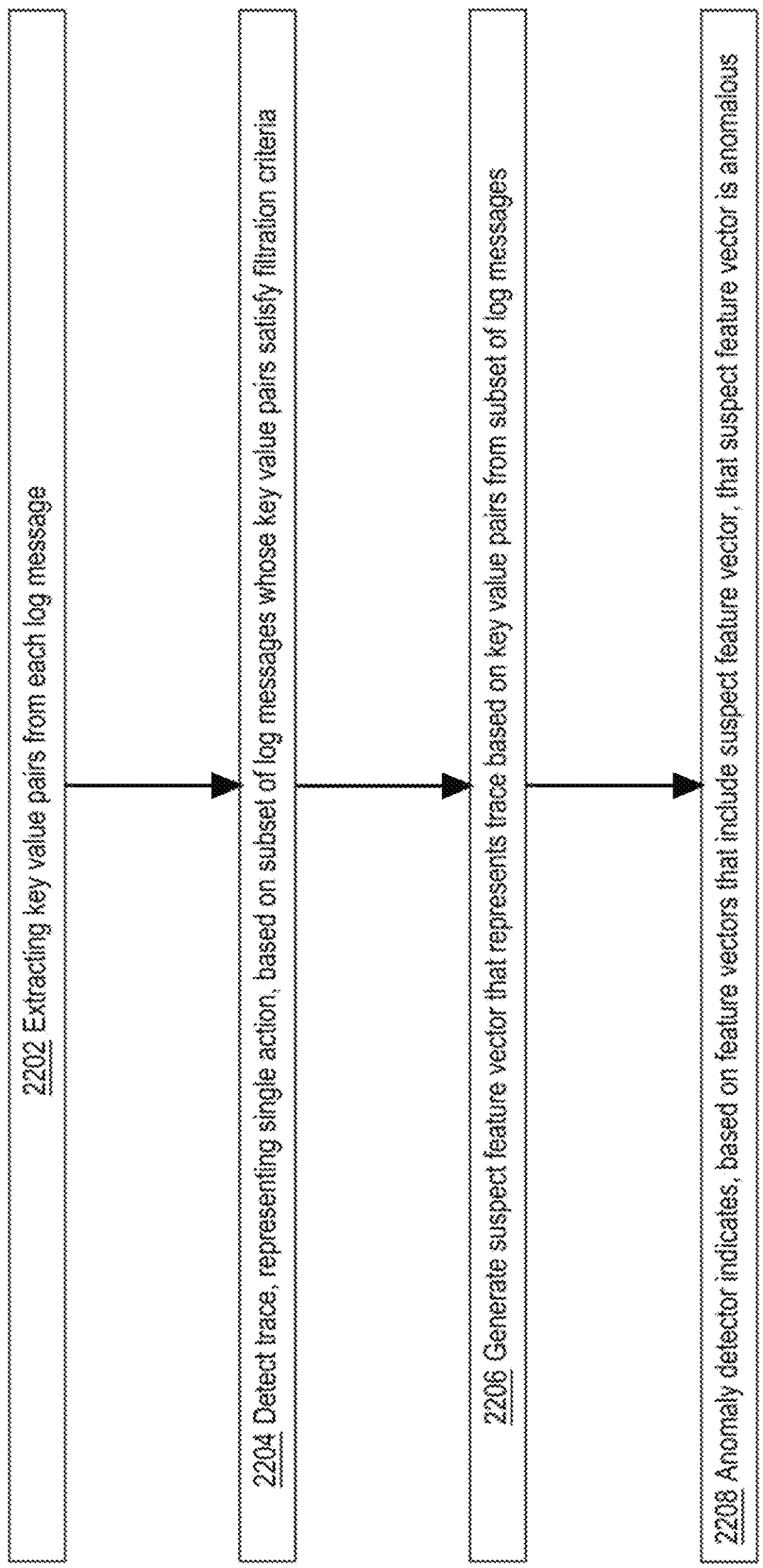
FIG. 22 is a flow diagram that depicts an example process for detection and feature-encoding of independent traces from related log messages, in an embodiment.

FIG. 21 is a block diagram that depicts an example computer 2100, in an embodiment. Computer 2100 detects and feature-encodes independent traces from related log messages. Earlier herein, event aggregation based on feature coincidence and a temporal window was discussed for coalescing multiple log traces into a subgraph for FIGS. 19-20. FIGS. 21-23 have a finer granularity of raw input, such that multiple log messages are coalesced into a log trace, and criteria for temporal and semantic coalescing are discussed in greater detail.

In an embodiment, computer 2100 may generate trace vectors that computer 2000 consumes as input for graph embedding. For example, suspect feature vector 2140 of FIG. 21 may be subsequently used as original vector 2031 of FIG. 20.

A log (not shown) may contain many log messages, such as 2131-2133. Features are extracted from log messages by parsing each message into key-value pairs. For example, log message 2131 has a key value pair with session ID as a key and XYZ as a value.

Computer 2100 may use a third party log parser (not shown) such as Splunk to parse log messages 2131-2133 and extract key value pairs. In an embodiment, the log parser encodes and outputs key-value pairs in a serialization format such as: extensible markup language (XML), comma separated values (CSV), JavaScript object notation (JSON), YAML, or Java object serialization.

22.1 Composition Criteria

Filtration criteria 2110 specifies one or more scenarios in which a subset of log messages 2131-2133 may be coalesced into one trace, such as 2120. Each specified scenario identifies one or more features whose actual values should match for all of log messages in the trace. For example, log messages 2131-2132 may be coalesced into trace 2120 because filtration criteria 2110 specifies a scenario that identifies session ID and timezone as features for which all log messages in a same trace should share a same value. In that case and although not shown, log message 2132 has same session ID and timezone values as log message 2131 has. Whereas, log message 2133 may have a different value for session ID and/or timezone, or may be missing one or both of those keys, such that log message 2133 is not coalesced into trace 2120.

Filtration criteria 2110 may specify other scenarios, such as coalescing log messages that have a same color. Log messages 2131-2132 may be coalesced into trace 2120 even though log messages 2131-2132 do not share a same color, so long as log messages 2131-2132 satisfy a different scenario of filtration criteria 2110.

Based on techniques herein, trace 2120 may be densely or sparsely encoded as suspect feature vector 2140. Trainable anomaly detector 2150 may analyze suspect feature vector 2140 to decide whether or not trace 2120 is anomalous. In an embodiment, trainable anomaly detector 2150 analyzes feature vectors of additional traces (not shown) to decide whether suspect feature vector 2140 is anomalous, such as per contextual techniques herein. Trace detection according to filtration criteria 2110 is discussed in more detail for FIGS. 22-23.

23.0 Trace Detection Process

FIG. 22 is a flow diagram that depicts detection and feature-encoding of independent traces from related log messages, in an embodiment. FIG. 22 is discussed with reference to FIG. 21.

Step 1802 extracts key value pairs from each log message. For example, each of log messages 2131-2133 may be independently parsed into various key value pairs. Key value pairs may be stored in memory in one or more of various formats such as a hashtable or other associative data structure and/or a sparse feature vector.

Step 1804 detects a log trace, which represents a single action, based on a subset of log messages whose key value pairs satisfy filtration criteria. In other words, a group (i.e. trace) of (not necessarily adjacent) log messages are recognized as related to performing a single observed action (not shown). Thus a log trace, such as 2120, has a coarser granularity than individual log messages, which facilitates contextual encoding. Thus a log that originated as a sequence of log messages may be abstracted into a more meaningful plurality of traces, with each trace composed of one or more log messages.

Traces do not overlap and do not share log messages. Thus, a log message belongs to exactly one trace. Thus, there is a fairly rigid containment (i.e. nesting) hierarchy of log messages within a trace and traces within a log (not shown).

Step 1806 generates a suspect feature vector that represents the log trace based on key value pairs from the trace's subset of log messages. For example, log messages 2131-3132 of trace 2120 may be embedded (i.e. contextually encoded) as dense suspect feature vector 2140.

Based on feature vectors that include suspect feature vector, an anomaly detector indicates that the suspect feature vector is anomalous in step 2208. For example, trainable anomaly detector 2150 may contextually analyze a sequence of embedded/dense feature vectors of related traces, including trace 2120, to detect whether or not suspect feature vector 2140 is anomalous. For example, a predictive RNN (not shown) may predict a sequence of feature vectors, including a corresponding predicted feature vector that does or does not match suspect feature vector 2140. Trainable anomaly detector 2150 may decide, yes or no, that suspect feature vector 2140 has or has not been approximately predicted with a threshold amount of accuracy.

24.0 Declarative Trace Detection

FIG. 23 is a block diagram that depicts an example log 2300, in an embodiment. Log 2300 contains semi-structured operational (e.g. diagnostic) data from which log messages and their features may be parsed and extracted. Log 2300 may be a live data stream, a log file, a spreadsheet, or a database table that contains a (e.g. temporal) sequence of log messages that were originally output to one or more consoles of one or more software applications that reside on one or more host computers.

Log 2300 is depicted as tabular, with each row representing a log message and each column representing a field (i.e. a feature). The trace and offset columns on the left side of log 2300 are demonstrative and not actually present in log 2300. The offset column uniquely identifies each log message and may be a text line number into a file or stream, a database record/row number, or a byte offset into a file or stream (in which case the offsets increase monotonically but may be discontinuous, unlike as shown).

Features (i.e. columns) may have application specific semantics (e.g. price), or may represent metadata that expressly appeared in log message(s). For example, the host field may indicate which server computer generated a log message, or which client computer caused the server computer to generate the log message. Log 2300 may consolidate log messages that are generated by many server computers.

The trace column indicates which log messages will be coalesced into a same trace. For example, trace A is composed of log messages 0-2. Traces may overlap (i.e. have interleaved log messages). For example, log message 12 belongs to trace D even though adjacent log messages 11 and 13 belong to trace C.

24.1 Declarative Rules

Various logic rules are applied to decide which log messages are coalesced into which traces, such as follows. If a rule applies in an interesting coalescing scenario discussed herein, the relevant feature value of the relevant log message that satisfied the rule is depicted on a dark box. Log messages 0-31 coalesce into traces A-I according to rules as follows.

Each feature (i.e. same key for key-value pairs) presents a dimension (i.e. degree of freedom) that may be used to coalesce log messages into a trace. The rules (e.g. filtration criteria 2110 on FIG. 21) may specify a filter for arbitrary (e.g. application specific) features or particular kinds of features that are predefined and reusable (i.e. across multiple applications). An example set of filtration rules may be:

node_filter: "node="
entity_filter: "*pid="
time_window_filter: (min_duration: 10 s, max_duration: 60 s, max_gap: 10 s)
exclude_filter: "exclude="
nomatch_heuristic: "closest active trace"

Each kind of filter in the above example has predefined semantics and configurable attribute(s). For example, the node filter is predefined to recognize that multiple log messages regard a same server (or client) computer. The node filter is configurable to use the node feature (that incidentally occurs in the host field) of log 2300 for detecting a host computer of a log message. For example, log messages 10-11 regard different host computers and so are not coalesced into a same trace.

The entity filter is predefined to recognize that multiple log messages regard a same operational entity, such as a same user, principal, client, account, or session. Feature names may be wildcarded, such as with an asterisk or a regular expression. Furthermore, a same feature may appear in multiple fields. For example, *pid may match pid in field X of log message 4, and also match spid in field Z of log message 8.

The time_window_filter is predefined to recognize that multiple log messages are contemporaneous. The time_window_filter has various configurable attributes. The min_duration attribute is configurable to ordinarily prevent adjacent log messages from being isolated into separate traces if a trace currently being coalesced does not yet contain first and last log messages that are temporally separated by at least min_duration. Thus, ordinary traces are at least min_duration long.

The max_duration attribute limits how much temporal separation may be between first and last log messages of a trace. Thus, ordinary traces do not exceed max_duration.

Even within the range of min_duration and max_duration, a temporal constraint may cause isolating log messages into separate traces. For example, the max_gap attribute specifies a longest time between any two adjacent log messages within a trace. Thus, max_gap is the longest that a trace detector can wait for another log message to append to a current trace.

Filtration rules may have priorities, such that only one rule may actually be applied even though a log message may satisfy multiple rules. The exclude_filter is predefined to preempt all other rules when satisfied. Based on the above example set of filtration rules, log 2300 may be interpreted as follows, including the exclude_filter operating as follows.

24.2 Example Operation

Log messages 0-2 are marked as excluded in field X, which is a column of log 2300. Field X may naturally occur in log messages as they are originally generated. In an embodiment, field X is synthetic, such that a log parser inserts field X into some or all log messages that did not originally contain field X. Log messages may be selected for decoration (i.e. synthetic field insertion) according to various criteria. For example, keep-alive heartbeats may be logged and then subsequently marked as excluded. In the shown embodiment, adjacent excluded log messages are coalesced into a same isolated trace, such as A.

In an embodiment not shown, adjacent excluded log messages are isolated (i.e. excluded from adjacent traces), and are coalesced into a same trace only if their exclude values match. For example, each of log messages 0-2 has a different exclude value and, thus, each of log messages 0-2 would have its own trace (i.e. three separate traces for three excluded log messages).

Log message 3 does not match the entity filter or does not match any filter (i.e. filtration rule). In an embodiment, there is a bias against traces with only one message. Because no trace (except excluded trace A) is active for host 1, log message 3 is stored in a temporary trace (not shown) for unmatched messages until a matching log message occurs or time_window_filter is satisfied. In an embodiment, an unmatched message in a temporary trace may eventually be reassigned to a preceding or subsequent adjacent trace, which may be configured with the nomatch predefined rule as shown in the above example rules. For example, log message 4 arrives in time to make trace B for message 4. Log message 3 is moved into trace B from a temporary trace.

Almost any trace may be temporary in this example. For example because of the entity filter, messages 5-6 are initially put in a different trace (not shown) than message 4 that has a different pid in field Y. However, message 8 soon arrives, and its fields Y-Z indicate that pids 10 and 20 belong in a same trace. Thus, messages 5-6 are moved from their temporary trace to trace B. Entity matching may be transitive. For example, the combination of messages 8-9 indicate that pids 10 and 30 match, even though no individual log message suggests that. Thus, messages 3-10 belong in trace B.

The correlation between pids 10, 20, and 30 is remembered and used when generating traces C-I from log messages 11-31. In an embodiment, each correlation of a pair of pids may expire after a duration. For example, pids may eventually be reused for unrelated entities. Likewise, the max_gap criterion may prevent some adjacent messages from being coalesced into a same trace. For example despite having adjacent messages 23-24, traces G-H are separated by more than a second, as indicated in milliseconds in the timestamp field, which is too long to be coalesced into a same trace according to max_gap.

25.0 Machine Learning Model

A machine learning model is trained using a particular machine learning algorithm. Once trained, input is applied to the machine learning model to make a prediction, which may also be referred to herein as a predicated output or output.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, executed, and/or as generating an output or predication, a computer system process executing a machine learning algorithm applies the model artifact against the input to generate a predicted output. A computer system process executes a machine learning algorithm by executing software configured to cause execution of the algorithm.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of best of breed machine learning algorithms may be found in open source libraries such as Google's TensorFlow for Python and C++ or Georgia Institute of Technology's MLPack for C++. Shogun is an open source C++ ML library with adapters for several programming languages including C #, Ruby, Lua, Java, MatLab, R, and Python.

25.1 Artificial Neural Networks

An artificial neural network (ANN) is a machine learning model that at a high level models a system of neurons interconnected by directed edges. An overview of neural networks is described within the context of a layered feed-forward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input node, the activation value is simply an input value for the input. For an activation neuron, the activation value is the output of the respective activation function of the activation neuron.

Each edge from a particular node to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation node, the activation function of the neuron is applied to the weighted activation values and the bias.

25.2 Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of nodes in layer L−1 and L is N[L−1] and N[L], respectively, the dimensions of matrix W of N[L−1] columns and N[L−1] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input node. The particular input may be stored as vector. Training data comprises multiple inputs, each being referred to as sample in a set of samples. Each sample includes a value for each input node. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every node in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of nodes and/or edges determines the size of matrices needed to implement a neural network. The smaller the number of nodes and edges in a neural network, the smaller matrices and amount of memory needed to store matrices. In addition, a smaller number of nodes and edges reduces the amount of computation needed to apply or train a neural network. Less nodes means less activation values need be computed, and/or less derivative values need be computed during training.

Properties of matrices used to implement a neural network correspond neurons and edges. A cell in a matrix W represents a particular edge from a node in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e. amount of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

25.3 Backpropagation

An ANN's output may be more or less correct. For example, an ANN that recognizes letters may mistake a I as an L because those letters have similar features. Correct output may have particular value(s), while actual output may have somewhat different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e. ceases to reduce) or vanishes beneath a threshold (i.e. approaches zero). Example mathematical formulae and techniques for feedforward multilayer perceptrons (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e. correct) output is already known for each example in a training set. The training set is configured in advance by (e.g. a human expert) assigning a categorization label to each example. For example, the training set for optical character recognition may have blurry photographs of individual letters, and an expert may label each photo in advance according to which letter is shown. Error calculation and backpropagation occurs as explained above.

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings. Autoencoder implementation and integration techniques are taught in related U.S. patent application Ser. No. 14/558,700, entitled "AUTO-ENCODER ENHANCED SELF-DIAGNOSTIC COMPONENTS FOR MODEL MONITORING". That patent application elevates a supervised or unsupervised ANN model as a first class object that is amenable to management techniques such as monitoring and governance during model development such as during training.

25.4 Deep Context Overview

As described above, an ANN may be stateless such that timing of activation is more or less irrelevant to ANN behavior. For example, recognizing a particular letter may occur in isolation and without context. More complicated classifications may be more or less dependent upon additional contextual information. For example, the information content (i.e. complexity) of a momentary input may be less than the information content of the surrounding context. Thus, semantics may occur based on context, such as a temporal sequence across inputs or an extended pattern (e.g. compound geometry) within an input example. Various techniques have emerged that make deep learning be contextual. One general strategy is contextual encoding, which packs a stimulus input and its context (i.e. surrounding/related details) into a same (e.g. densely) encoded unit that may be applied to an ANN for analysis. One form of contextual encoding is graph embedding, which constructs and prunes (i.e. limits the extent of) a logical graph of (e.g. temporally or semantically) related events or records. The graph embedding may be used as a contextual encoding and input stimulus to an ANN.

Hidden state (i.e. memory) is a powerful ANN enhancement for (especially temporal) sequence processing. Sequencing may facilitate prediction and operational anomaly detection, which can be important techniques. A recurrent neural network (RNN) is a stateful MLP that is arranged in topological steps that may operate more or less as stages of a processing pipeline. In a folded/rolled embodiment, all of the steps have identical connection weights and may share a single one dimensional weight vector for all steps. In a recursive embodiment, there is only one step that recycles some of its output back into the one step to recursively achieve sequencing. In an unrolled/unfolded embodiment, each step may have distinct connection weights. For example, the weights of each step may occur in a respective column of a two dimensional weight matrix.

A sequence of inputs may be simultaneously or sequentially applied to respective steps of an RNN to cause analysis of the whole sequence. For each input in the sequence, the RNN predicts a next sequential input based on all previous inputs in the sequence. An RNN may predict or otherwise output almost all of the input sequence already received and also a next sequential input not yet received. Prediction of a next input by itself may be valuable. Comparison of a predicted sequence to an actually received (and applied) sequence may facilitate anomaly detection. For example, an RNN based spelling model may predict that a U follows a Q while reading a word letter by letter. If a letter actually following the Q is not a U as expected, then an anomaly is detected.

Unlike a neural layer that is composed of individual neurons, each recurrence step of an RNN may be an MLP that is composed of cells, with each cell containing a few specially arranged neurons. An RNN cell operates as a unit of memory. An RNN cell may be implemented by a long short term memory (LSTM) cell. The way LSTM arranges neurons is different from how transistors are arranged in a flip flop, but a same theme of a few control gates that are specially arranged to be stateful is a goal shared by LSTM and digital logic. For example, a neural memory cell may have an input gate, an output gate, and a forget (i.e. reset) gate. Unlike a binary circuit, the input and output gates may conduct an (e.g. unit normalized) numeric value that is retained by the cell, also as a numeric value.

An RNN has two major internal enhancements over other MLPs. The first is localized memory cells such as LSTM, which involves microscopic details. The other is cross activation of recurrence steps, which is macroscopic (i.e. gross topology). Each step receives two inputs and outputs two outputs. One input is external activation from an item in an input sequence. The other input is an output of the adjacent previous step that may embed details from some or all previous steps, which achieves sequential history (i.e. temporal context). The other output is a predicted next item in the sequence. Example mathematical formulae and techniques for RNNs and LSTM are taught in related U.S. patent application Ser. No. 15/347,501, entitled "MEMORY CELL UNIT AND RECURRENT NEURAL NETWORK INCLUDING MULTIPLE MEMORY CELL UNITS."

Sophisticated analysis may be achieved by a so-called stack of MLPs. An example stack may sandwich an RNN between an upstream encoder ANN and a downstream decoder ANN, either or both of which may be an autoencoder. The stack may have fan-in and/or fan-out between MLPs. For example, an RNN may directly activate two downstream ANNs, such as an anomaly detector and an autodecoder. The autodecoder might be present only during model training for purposes such as visibility for monitoring training or in a feedback loop for unsupervised training. RNN model training may use backpropagation through time, which is a technique that may achieve higher accuracy for an RNN model than with ordinary backpropagation. Example mathematical formulae, pseudocode, and techniques for training RNN models using backpropagation through time are taught in related W.I.P.O. patent application No. PCT/US2017/033698, entitled "MEMORY-EFFICIENT BACK-PROPAGATION THROUGH TIME".

26.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 24:
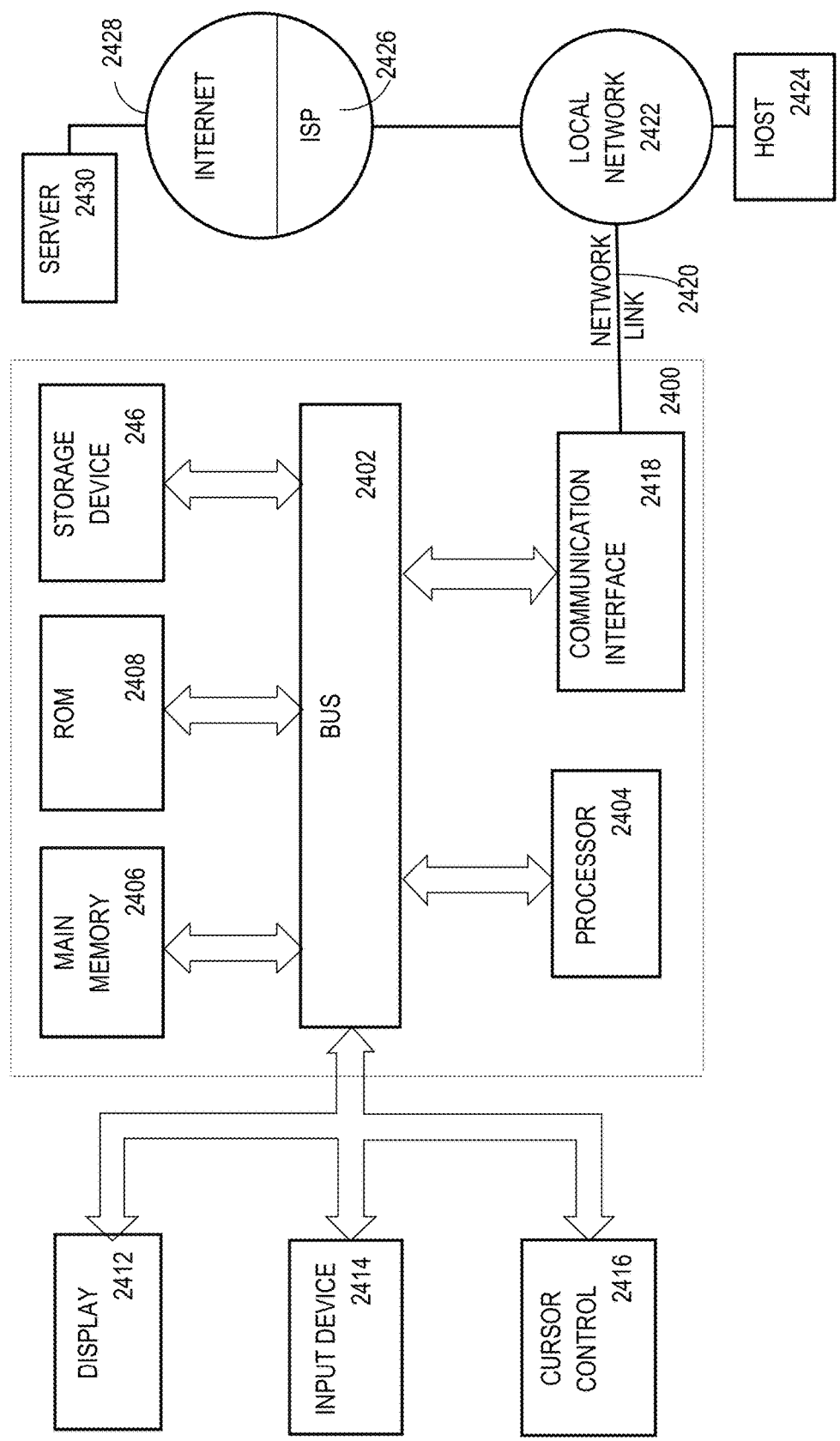
FIG. 24 is a block diagram that illustrates a computer system upon which an embodiment of the invention may be implemented.

For example, FIG. 24 is a block diagram that illustrates a computer system 2400 upon which an embodiment of the invention may be implemented. Computer system 2400 includes a bus 2402 or other communication mechanism for communicating information, and a hardware processor 2404 coupled with bus 2402 for processing information. Hardware processor 2404 may be, for example, a general purpose microprocessor.

Computer system 2400 also includes a main memory 2406, such as a random access memory (RAM) or other dynamic storage device, coupled to bus 2402 for storing information and instructions to be executed by processor 2404. Main memory 2406 also may be used for storing temporary variables or other intermediate information during execution of instructions to be executed by processor 2404. Such instructions, when stored in non-transitory storage media accessible to processor 2404, render computer system 2400 into a special-purpose machine that is customized to perform the operations specified in the instructions.

Computer system 2400 further includes a read only memory (ROM) 2408 or other static storage device coupled to bus 2402 for storing static information and instructions for processor 2404. A storage device 246, such as a magnetic disk or optical disk, is provided and coupled to bus 2402 for storing information and instructions.

Computer system 2400 may be coupled via bus 2402 to a display 2412, such as a cathode ray tube (CRT), for displaying information to a computer user. An input device 2414, including alphanumeric and other keys, is coupled to bus 2402 for communicating information and command selections to processor 2404. Another type of user input device is cursor control 2416, such as a mouse, a trackball, or cursor direction keys for communicating direction information and command selections to processor 2404 and for controlling cursor movement on display 2412. This input device typically has two degrees of freedom in two axes, a first axis (e.g., x) and a second axis (e.g., y), that allows the device to specify positions in a plane.

Computer system 2400 may implement the techniques described herein using customized hard-wired logic, one or more ASICs or FPGAs, firmware and/or program logic which in combination with the computer system causes or programs computer system 2400 to be a special-purpose machine. According to one embodiment, the techniques herein are performed by computer system 2400 in response to processor 2404 executing one or more sequences of one or more instructions contained in main memory 2406. Such instructions may be read into main memory 2406 from another storage medium, such as storage device 246. Execution of the sequences of instructions contained in main memory 2406 causes processor 2404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 246. Volatile media includes dynamic memory, such as main memory 2406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 2402. Transmission media can also take the form of acoustic or light waves, such as those generated during radio-wave and infra-red data communications.

Various forms of media may be involved in carrying one or more sequences of one or more instructions to processor 2404 for execution. For example, the instructions may initially be carried on a magnetic disk or solid state drive of a remote computer. The remote computer can load the instructions into its dynamic memory and send the instructions over a telephone line using a modem. A modem local to computer system 2400 can receive the data on the telephone line and use an infra-red transmitter to convert the data to an infra-red signal. An infra-red detector can receive the data carried in the infra-red signal and appropriate circuitry can place the data on bus 2402. Bus 2402 carries the data to main memory 2406, from which processor 2404 retrieves and executes the instructions. The instructions received by main memory 2406 may optionally be stored on storage device 246 either before or after execution by processor 2404.

Computer system 2400 also includes a communication interface 2418 coupled to bus 2402. Communication interface 2418 provides a two-way data communication coupling to a network link 2420 that is connected to a local network 2422. For example, communication interface 2418 may be an integrated services digital network (ISDN) card, cable modem, satellite modem, or a modem to provide a data communication connection to a corresponding type of telephone line. As another example, communication interface 2418 may be a local area network (LAN) card to provide a data communication connection to a compatible LAN. Wireless links may also be implemented. In any such implementation, communication interface 2418 sends and receives electrical, electromagnetic or optical signals that carry digital data streams representing various types of information.

Network link 2420 typically provides data communication through one or more networks to other data devices. For example, network link 2420 may provide a connection through local network 2422 to a host computer 2424 or to data equipment operated by an Internet Service Provider (ISP) 2426. ISP 2426 in turn provides data communication services through the world wide packet data communication network now commonly referred to as the "Internet" 2428. Local network 2422 and Internet 2428 both use electrical, electromagnetic or optical signals that carry digital data streams. The signals through the various networks and the signals on network link 2420 and through communication interface 2418, which carry the digital data to and from computer system 2400, are example forms of transmission media.

Computer system 2400 can send messages and receive data, including program code, through the network(s), network link 2420 and communication interface 2418. In the Internet example, a server 2430 might transmit a requested code for an application program through Internet 2428, ISP 2426, local network 2422 and communication interface 2418.

The received code may be executed by processor 2404 as it is received, and/or stored in storage device 246, or other non-volatile storage for later execution.

27.0 Software Overview

FIG. 25 is a block diagram of a basic software system 2500 that may be employed for controlling the operation of computing system 2400. Software system 2500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 2500 is provided for directing the operation of computing system 2400. Software system 2500, which may be stored in system memory (RAM) 2406 and on fixed storage (e.g., hard disk or flash memory) 246, includes a kernel or operating system (OS) 2510.

The OS 2510 manages low-level aspects of computer operation, including managing execution of processes, memory allocation, file input and output (I/O), and device I/O. One or more application programs, represented as 2502A, 2502B, 2502C . . . 2502N, may be "loaded" (e.g., transferred from fixed storage 246 into memory 2406) for execution by the system 2500. The applications or other software intended for use on computer system 2400 may also be stored as a set of downloadable computer-executable instructions, for example, for downloading and installation from an Internet location (e.g., a Web server, an app store, or other online service).

Software system 2500 includes a graphical user interface (GUI) 2515, for receiving user commands and data in a graphical (e.g., "point-and-click" or "touch gesture") fashion. These inputs, in turn, may be acted upon by the system 2500 in accordance with instructions from operating system 2510 and/or application(s) 2502. The GUI 2515 also serves to display the results of operation from the OS 2510 and application(s) 2502, whereupon the user may supply additional inputs or terminate the session (e.g., log off).

OS 2510 can execute directly on the bare hardware 2520 (e.g., processor(s) 2404) of computer system 2400. Alternatively, a hypervisor or virtual machine monitor (VMM) 2530 may be interposed between the bare hardware 2520 and the OS 2510. In this configuration, VMM 2530 acts as a software "cushion" or virtualization layer between the OS 2510 and the bare hardware 2520 of the computer system 2400.

VMM 2530 instantiates and runs one or more virtual machine instances ("guest machines"). Each guest machine comprises a "guest" operating system, such as OS 2510, and one or more applications, such as application(s) 2502, designed to execute on the guest operating system. The VMM 2530 presents the guest operating systems with a virtual operating platform and manages the execution of the guest operating systems.

In some instances, the VMM 2530 may allow a guest operating system to run as if it is running on the bare hardware 2520 of computer system 2500 directly. In these instances, the same version of the guest operating system configured to execute on the bare hardware 2520 directly may also execute on VMM 2530 without modification or reconfiguration. In other words, VMM 2530 may provide full hardware and CPU virtualization to a guest operating system in some instances.

In other instances, a guest operating system may be specially designed or configured to execute on VMM 2530 for efficiency. In these instances, the guest operating system is "aware" that it executes on a virtual machine monitor. In other words, VMM 2530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

28.0 Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   unsupervised learning by a recurrent neural network (RNN);
   generating a sequence of actual dense feature vectors that corresponds to a sequence of network packets, wherein each feature vector of the sequence of actual dense feature vectors represents a respective network packet of the sequence of network packets;
   the RNN generating, based on the sequence of actual dense feature vectors, a sequence of predicted dense feature vectors that represent the sequence of network packets;
   processing the sequence of network packets based on the sequence of predicted dense feature vectors.

2. The method of claim 1 wherein the RNN comprises a long short-term memory (LSTM) network.

3. The method of claim 1 wherein the sequence of network packets conform to simple network management protocol (SNMP).

4. The method of claim 1 wherein each packet of the sequence of network packets comprises an Ethernet frame.

5. The method of claim 1 wherein the sequence of network packets contains network packets that flowed in opposite directions for a network roundtrip.

6. The method of claim 1 further comprising extracting the sequence of network packets from network traffic based on identifying a particular pair of transport-layer endpoint computers.

7. The method of claim 6 wherein extracting the sequence of network packets is further based on identifying a particular pair of network ports for the particular pair of transport-layer endpoint computers.

8. The method of claim 1 wherein:
   the RNN comprises weights of connections between neurons;
   the method further comprises gradient descending to optimize said weights of connections during training.

9. A method comprising:
   generating a sequence of actual dense feature vectors that corresponds to a sequence of network packets, wherein:
   a) each feature vector of the sequence of actual dense feature vectors represents a respective network packet of the sequence of network packets;
   b) the generating the sequence of actual dense feature vectors comprises:
      generating a sequence of actual raw feature vectors that corresponds to the sequence of network packets, and
      encoding the sequence of actual raw feature vectors into the sequence of actual dense feature vectors;
   c) each feature vector of the sequence of actual raw feature vectors has more bits than the corresponding feature vector of the sequence of actual dense feature vectors;
   a recurrent neural network (RNN) generating, based on the sequence of actual dense feature vectors, a sequence of predicted dense feature vectors that represent the sequence of network packets;

processing the sequence of network packets based on the sequence of predicted dense feature vectors.

10. The method of claim 9 wherein encoding the sequence of actual raw feature vectors comprises processing by at least a first neural layer of an artificial neural network (ANN) that is fully connected to a second neural layer of said ANN.

11. The method of claim 10 wherein the ANN comprises an autoencoder.

12. The method of claim 9 wherein:
the method further comprises generating a sequence of predicted raw feature vectors by decoding the sequence of predicted dense feature vectors;
each feature vector of the sequence of predicted raw feature vectors has more bits than the corresponding feature vector of the sequence of predicted dense feature vectors;
said processing the sequence of network packets comprises:
generating, based on the sequence of actual raw feature vectors and the sequence of predicted raw feature vectors, an anomaly score for the sequence of network packets;
processing the sequence of network packets based on the anomaly score.

13. The method of claim 12 wherein generating the anomaly score for the sequence of network packets comprises comparing the sequence of actual raw feature vectors to the sequence of predicted raw feature vectors.

14. The method of claim 12 wherein:
the RNN comprises a sequence of recurrence steps;
the RNN generating the sequence of predicted dense feature vectors comprises, for each current feature vector of the sequence of actual dense feature vectors:
inputting the current feature vector into a corresponding recurrence step of the sequence of recurrence steps;
generating, by the corresponding recurrence step, a next predicted dense feature vector that approximates a next actual dense feature vector that occurs after the current feature vector in the sequence of actual dense feature vectors;
generating a next predicted raw feature vector of said sequence of predicted raw feature vectors by decoding said next predicted dense feature vector; and
comparing the next predicted raw feature vector to a next actual raw feature vector of said sequence of actual raw feature vectors to generate an individual anomaly score for a next actual packet of the sequence of network packets;
the anomaly score for the sequence of network packets is based on individual anomaly scores that were generated for the sequence of actual raw feature vectors.

15. The method of claim 12 wherein the anomaly score for the sequence of network packets is based on at least one statistic of: minimum, maximum, or arithmetic or geometric mean.

16. The method of claim 12 wherein said processing the sequence of network packets based on the anomaly score comprises alerting a network attack.

17. The method of claim 16 wherein alerting the network attack comprises detecting that the anomaly score exceeds a threshold.

18. The method of claim 16 wherein the network attack comprises at least one of: HTTP denial of service, brute-force secure shell (SSH), or SNMP reflection amplification.

19. The method of claim 9 wherein each feature vector of the sequence of actual raw feature vectors consists essentially of a fixed amount of bits.

20. The method of claim 19 wherein the fixed amount of bits are copied from the respective network packet of the sequence of network packets that is represented by said feature vector.

21. The method of claim 9 wherein each feature vector of the sequence of actual raw feature vectors comprises a plurality of semantic features obtained from the respective network packet of the sequence of network packets that the feature vector represents.

22. The method of claim 21 wherein the plurality of semantic features comprises protocol metadata of said respective network packet.

23. The method of claim 22 wherein the protocol metadata comprises at least one of: source IP address, destination IP address, source port, destination port, protocol flags, or timestamp.

24. A method comprising:
configuring a recurrent neural network (RNN) according to hyperparameters before training;
auto-tuning the hyperparameters before configuring the RNN;
generating a sequence of actual dense feature vectors that corresponds to a sequence of network packets, wherein each feature vector of the sequence of actual dense feature vectors represents a respective network packet of the sequence of network packets;
the RNN generating, based on the sequence of actual dense feature vectors, a sequence of predicted dense feature vectors that represent the sequence of network packets;
processing the sequence of network packets based on the sequence of predicted dense feature vectors.

25. The method of claim 24 wherein:
the RNN comprises a plurality of neural layers;
said hyperparameters include at least one of: a count of layers in said plurality of neural layers, or count of hidden units per layer.

26. One or more non-transitory computer readable media storing instructions that, when executed by one or more processors, cause:
unsupervised learning by a recurrent neural network (RNN);
generating a sequence of actual dense feature vectors that corresponds to a sequence of network packets, wherein each feature vector of the sequence of actual dense feature vectors represents a respective network packet of the sequence of network packets;
the RNN generating, based on the sequence of actual dense feature vectors, a sequence of predicted dense feature vectors that represent the sequence of network packets;
processing the sequence of network packets based on the sequence of predicted dense feature vectors.

27. The one or more non-transitory computer readable media of claim 26 wherein the sequence of network packets conform to simple network management protocol (SNMP).

28. The one or more non-transitory computer readable media of claim 26 wherein the sequence of network packets contains network packets that flowed in opposite directions for a network roundtrip.

29. One or more non-transitory computer readable media storing instructions that, when executed by one or more processors, cause:

generating a sequence of actual dense feature vectors that corresponds to a sequence of network packets, wherein:
   a) each feature vector of the sequence of actual dense feature vectors represents a respective network packet of the sequence of network packets;
   b) the generating the sequence of actual dense feature vectors comprises:
      generating a sequence of actual raw feature vectors that corresponds to the sequence of network packets, and
      encoding the sequence of actual raw feature vectors into the sequence of actual dense feature vectors;
   c) each feature vector of the sequence of actual raw feature vectors has more bits than the corresponding feature vector of the sequence of actual dense feature vectors;
a recurrent neural network (RNN) generating, based on the sequence of actual dense feature vectors, a sequence of predicted dense feature vectors that represent the sequence of network packets;
processing the sequence of network packets based on the sequence of predicted dense feature vectors.

30. The one or more non-transitory computer readable claim 29 wherein:
the instructions further cause generating a sequence of predicted raw feature vectors by decoding the sequence of predicted dense feature vectors;
each feature vector of the sequence of predicted raw feature vectors has more bits than the corresponding feature vector of the sequence of predicted dense feature vectors;
said processing the sequence of network packets comprises:
   generating, based on the sequence of actual raw feature vectors and the sequence of predicted raw feature vectors, an anomaly score for the sequence of network packets;
   processing the sequence of network packets based on the anomaly score.

31. The one or more non-transitory computer readable media of claim 30 wherein said processing the sequence of network packets based on the anomaly score comprises alerting a network attack.

32. The one or more non-transitory computer readable media of claim 29 wherein each feature vector of the sequence of actual raw feature vectors comprises a plurality of semantic features obtained from the respective network packet of the sequence of network packets that the feature vector represents.

33. One or more non-transitory computer readable media storing instructions that, when executed by one or more processors, cause:
configuring a recurrent neural network (RNN) according to hyperparameters before training;
auto-tuning the hyperparameters before configuring the RNN;
generating a sequence of actual dense feature vectors that corresponds to a sequence of network packets, wherein each feature vector of the sequence of actual dense feature vectors represents a respective network packet of the sequence of network packets;
the RNN generating, based on the sequence of actual dense feature vectors, a sequence of predicted dense feature vectors that represent the sequence of network packets;
processing the sequence of network packets based on the sequence of predicted dense feature vectors.

* * * * *

UNITED STATES PATENT AND TRADEMARK OFFICE
CERTIFICATE OF CORRECTION

PATENT NO. : 11,451,565 B2
APPLICATION NO. : 16/122664
DATED : September 20, 2022
INVENTOR(S) : Zhou et al.

It is certified that error appears in the above-identified patent and that said Letters Patent is hereby corrected as shown below:

On the Title Page

On page 2, Column 2, under Item (56) Other Publications, Line 53, delete "Machinelearning," and insert -- Machine learning, --, therefor.

On page 2, Column 2, under Item (56) Other Publications, Line 72, delete "fro" and insert -- for --, therefor.

On page 3, Column 1, under Item (56) Other Publications, Line 37, delete "Diffucult"," and insert -- Difficult", --, therefor.

On page 3, Column 1, under Item (56) Other Publications, Line 44, delete "Sequwnrial" and insert -- Sequential --, therefor.

On page 3, Column 1, under Item (56) Other Publications, Line 45, delete "Communicaitons" and insert -- Communications --, therefor.

On page 3, Column 1, under Item (56) Other Publications, Line 50, delete "OSCVM" and insert -- OCSVM --, therefor.

On page 3, Column 2, under Item (56) Other Publications, Line 12, delete "Problemd" and insert -- Problems --, therefor.

On page 3, Column 2, under Item (56) Other Publications, Line 34, delete "Nural" and insert -- Neural --, therefor.

On page 3, Column 2, under Item (56) Other Publications, Line 45, delete "pages,." and insert -- pages. --, therefor.

Signed and Sealed this
Fourteenth Day of February, 2023

Katherine Kelly Vidal
*Director of the United States Patent and Trademark Office*

CERTIFICATE OF CORRECTION (continued)
U.S. Pat. No. 11,451,565 B2

On page 3, Column 2, under Item (56) Other Publications, Line 67, delete "Applicationsm" and insert -- Applications --, therefor.

On page 4, Column 2, under Item (56) Other Publications, Line 38, delete "31 st" and insert -- 31st --, therefor.

On page 4, Column 2, under Item (56) Other Publications, Line 45, delete ""Unupervised" and insert -- "Unsupervised --, therefor.

In the Drawings

On sheet 25 of 25, in FIG. 25, under Reference Numeral 2530, Line 1, delete "( VMM)" and insert -- (VMM) --, therefor.

In the Specification

In Column 1, Line 36, delete "494501." and insert -- 494-501. --, therefor.

In Column 13, Line 54, delete "(LTSM)." and insert -- (LSTM). --, therefor.

In Column 36, Line 32, delete "and or" and insert -- and/or --, therefor.

In the Claims

In Column 47, Line 25, in Claim 30, before "claim" insert -- media of --, therefor.